(12) United States Patent
Higgins et al.

(10) Patent No.: US 6,866,912 B2
(45) Date of Patent: Mar. 15, 2005

(54) TEXTILE CONSTRUCTIONS WITH STABILIZED PRIMARY BACKINGS AND RELATED METHODS

(75) Inventors: Kenneth B Higgins, LaGrange, GA (US); Brian G Morin, Greer, SC (US); Martin E Cowan, Moore, SC (US)

(73) Assignee: Milliken & Company, Spartanburg, SC (US)

(*) Notice: Subject to any disclaimer, the term of this patent is extended or adjusted under 35 U.S.C. 154(b) by 106 days.

(21) Appl. No.: 10/098,053

(22) Filed: Mar. 13, 2002

(65) Prior Publication Data

US 2003/0175474 A1 Sep. 18, 2003

(51) Int. Cl.[7] .................. B32B 33/00; D05C 17/02
(52) U.S. Cl. ................................................. 428/95
(58) Field of Search ........................................ 428/95

(56) References Cited

U.S. PATENT DOCUMENTS

| | | | |
|---|---|---|---|
| 4,016,118 A | 4/1977 | Hamada et al. | 260/17.4 |
| 4,053,668 A * | 10/1977 | Kimmel et al. | 428/95 |
| 4,069,361 A | 1/1978 | Kumar | 428/95 |
| 4,123,577 A | 10/1978 | Port et al. | 428/95 |
| 4,132,817 A | 1/1979 | Tillotson | 427/244 |
| 4,140,071 A * | 2/1979 | Gee et al. | 112/475.23 |
| 4,171,395 A | 10/1979 | Tillotson | 428/95 |
| 4,242,394 A * | 12/1980 | Leib et al. | 428/95 |
| 4,384,018 A | 5/1983 | Caswell et al. | 428/95 |
| 4,426,415 A * | 1/1984 | Avery | 428/17 |
| 4,439,476 A | 3/1984 | Guild | 428/96 |
| 4,512,831 A | 4/1985 | Tillotson | 156/78 |
| 4,522,857 A * | 6/1985 | Higgins | 428/95 |
| 4,556,602 A | 12/1985 | Williams | 428/259 |
| 4,560,734 A * | 12/1985 | Fujishita et al. | 526/142 |
| 4,705,706 A * | 11/1987 | Avery | 428/17 |
| 4,915,999 A | 4/1990 | Tillotson | 428/95 |
| 5,114,787 A | 5/1992 | Chaplin et al. | 428/284 |
| 5,182,162 A | 1/1993 | Andrusko | 428/219 |
| 5,458,944 A * | 10/1995 | Austin | 428/95 |
| 5,470,648 A * | 11/1995 | Pearlman et al. | 442/26 |
| 5,494,724 A | 2/1996 | Lang | 428/95 |
| 5,540,968 A * | 7/1996 | Higgins | 428/95 |
| 5,545,276 A * | 8/1996 | Higgins | 156/79 |
| 5,610,207 A * | 3/1997 | de Simone et al. | 523/218 |
| 5,725,705 A | 3/1998 | Nagahama et al. | 156/148 |
| 5,798,167 A | 8/1998 | Connor et al. | 428/171 |
| 5,811,045 A | 9/1998 | Pike | 264/168 |
| 5,948,500 A | 9/1999 | Higgins | 428/95 |
| 5,962,101 A * | 10/1999 | Irwin et al. | 428/92 |
| 6,203,881 B1 | 3/2001 | Higgins | 428/95 |
| 6,207,599 B1 | 3/2001 | Coolen et al. | 442/242 |
| 6,280,818 B1 | 8/2001 | Smith et al. | 428/95 |
| 6,435,220 B1 | 8/2002 | Smith et al. | 139/383 |
| 6,468,621 B1 * | 10/2002 | Landau | 428/89 |
| 6,468,623 B1 | 10/2002 | Higgins | 428/95 |
| 6,475,592 B1 * | 11/2002 | Irwin | 428/95 |
| 6,479,125 B1 * | 11/2002 | Irwin, Sr. | 428/95 |
| 6,510,872 B1 | 1/2003 | Smith et al. | 139/383 |
| 6,541,554 B2 * | 4/2003 | Morin et al. | 524/387 |
| 6,740,385 B2 * | 5/2004 | Gardner et al. | 428/85 |
| 2002/0172795 A1 * | 11/2002 | Gardner et al. | 428/85 |
| 2003/0084955 A1 | 5/2003 | Smith et al. | 139/420 |

FOREIGN PATENT DOCUMENTS

JP           2001081628 A  *  3/2001  .......... D01F/6/46

* cited by examiner

*Primary Examiner*—Cheryl A. Juska
(74) *Attorney, Agent, or Firm*—Terry T. Moyer; Daniel R. Alexander

(57) ABSTRACT

A pile fabric suitable for use as a primary carpet fabric within a carpet construction or composite such as a cushioned carpet or tile. The primary carpet fabric includes a plurality of pile-forming yarns tufted through or adhered to a primary backing of integral dimensionally stable character. A cushioning layer of foam, felt, fabric, or other suitable cushioning material may be disposed at a position below the primary carpet fabric.

29 Claims, 60 Drawing Sheets

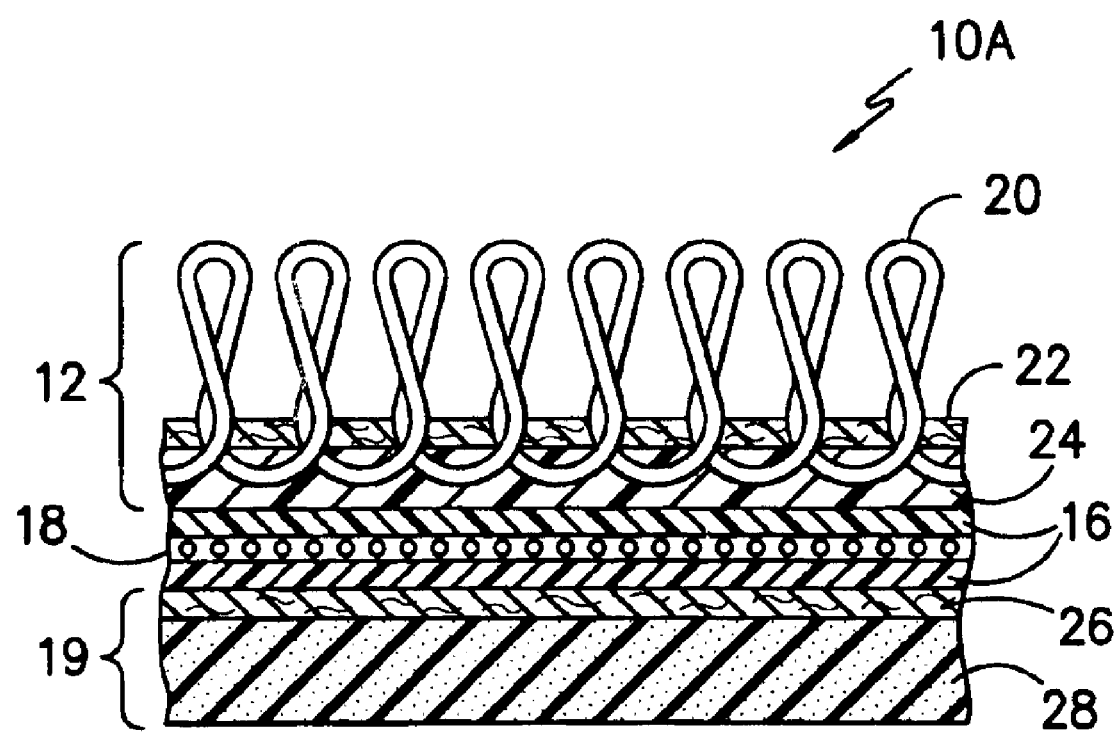
FIG. -1-
PRIOR ART

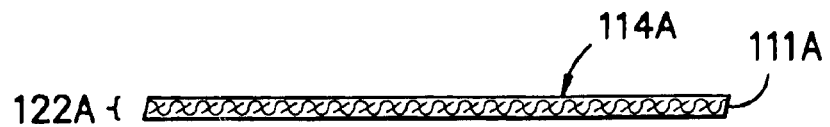
FIG. —2A—
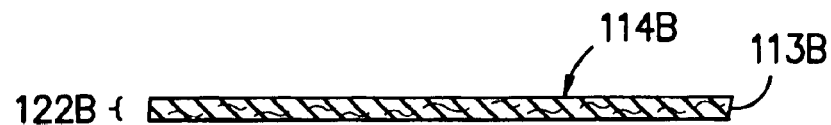
FIG. —2B—
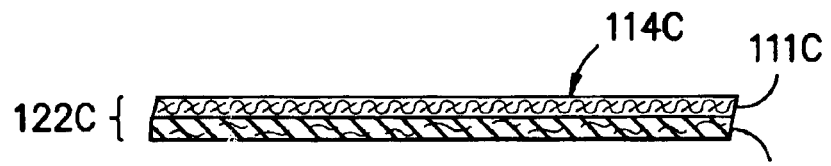
FIG. —2C—
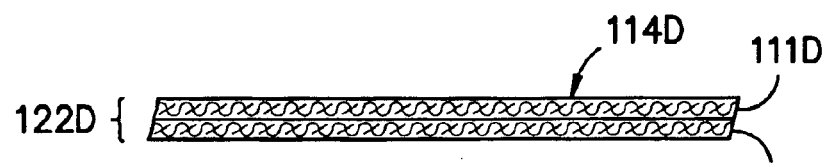
FIG. —2D—
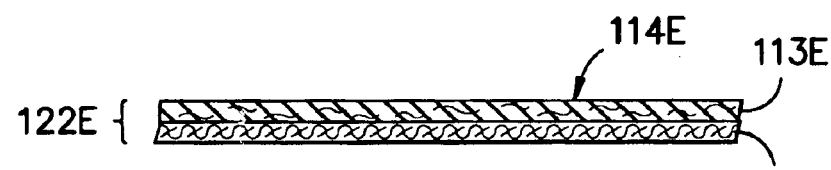
FIG. —2E—
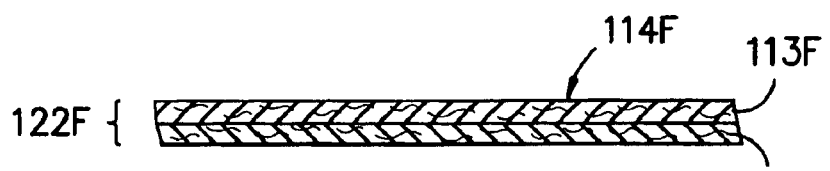
FIG. —2F—

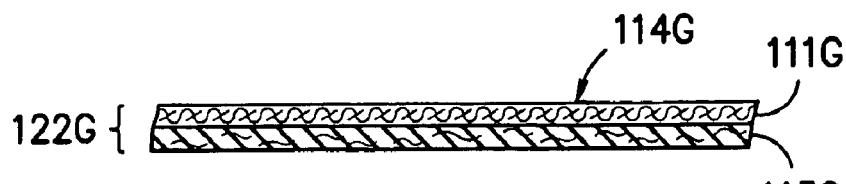
FIG. -2G-
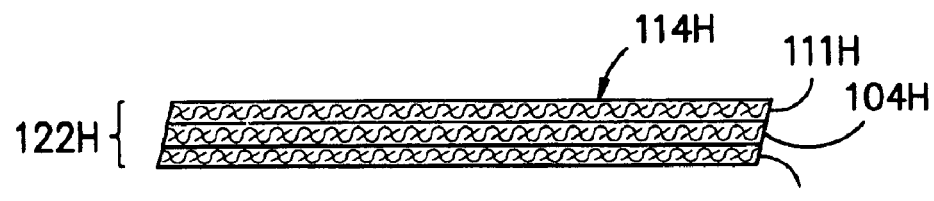
FIG. -2H-
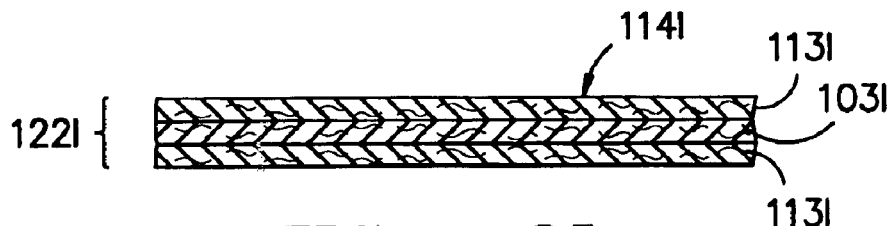
FIG. -2I-
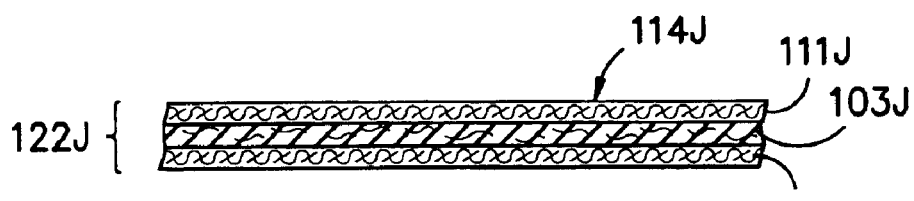
FIG. -2J-
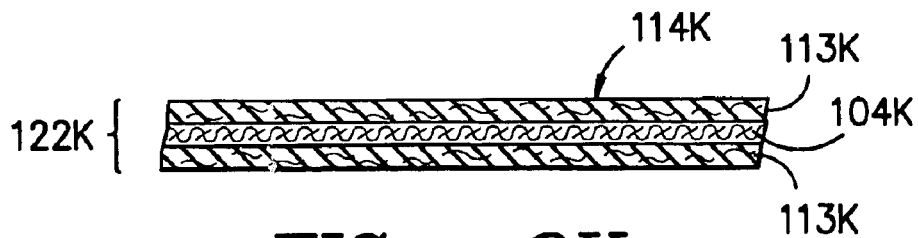
FIG. -2K-

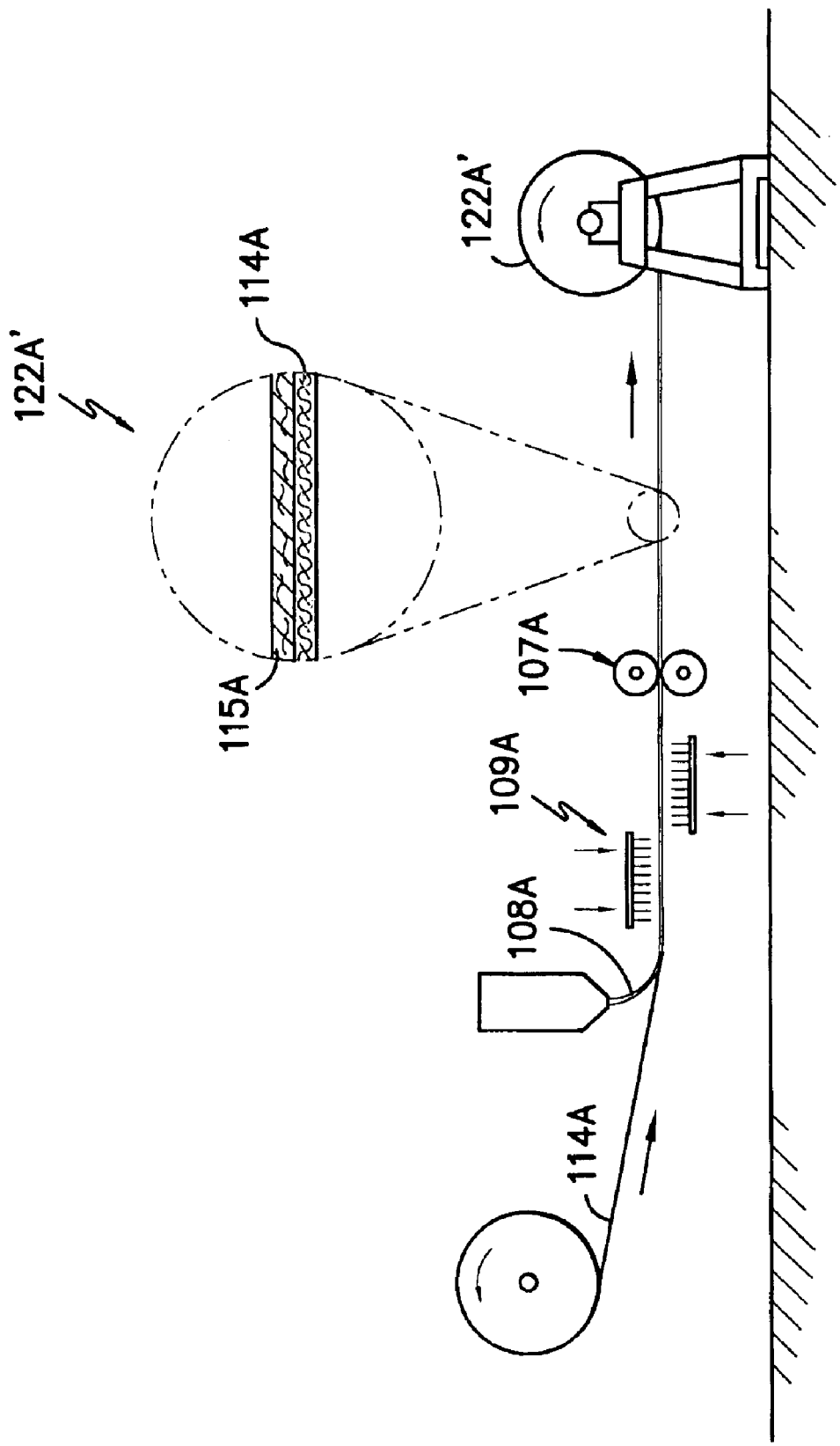
FIG. -3A-

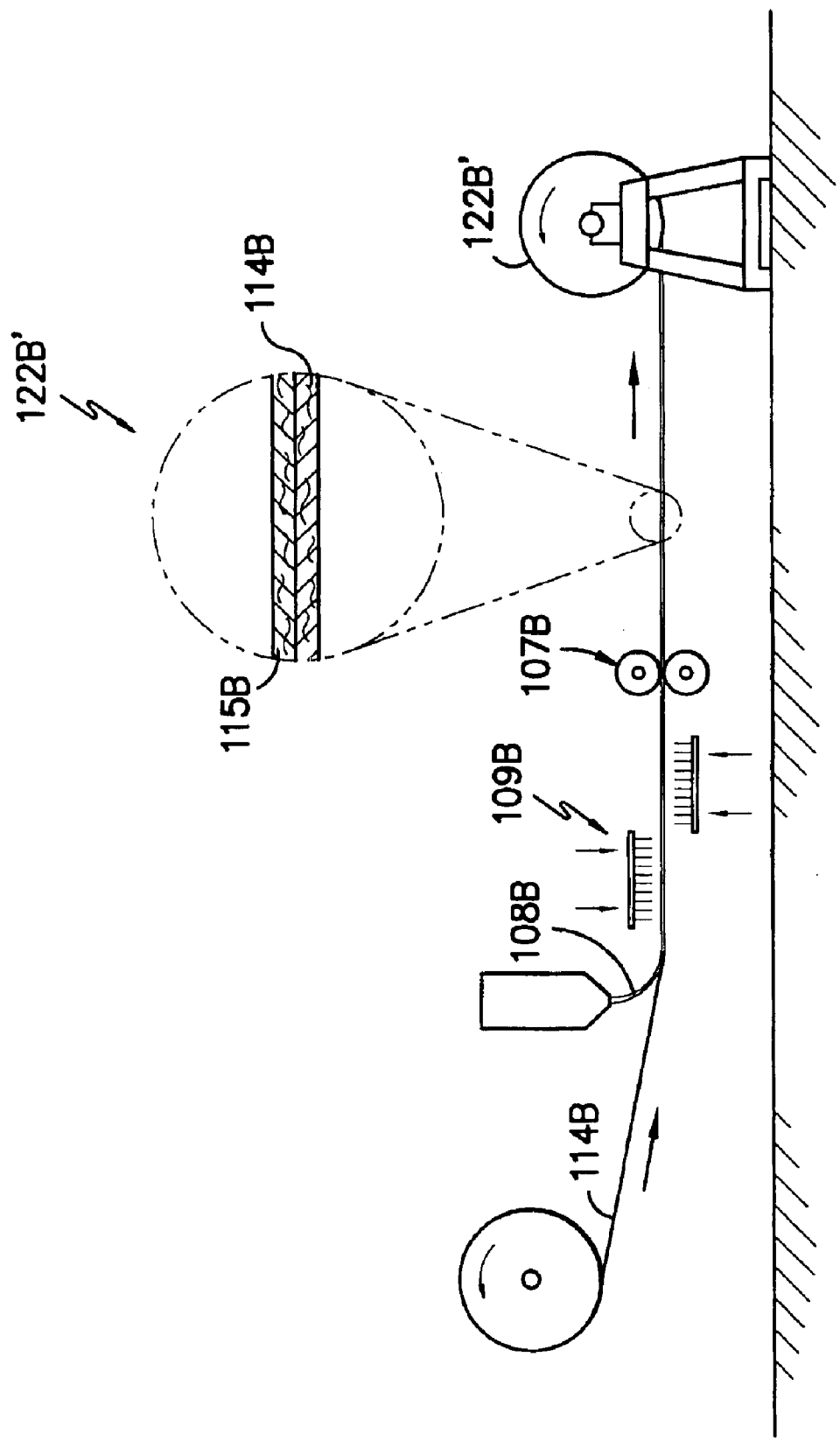
FIG. -3B-

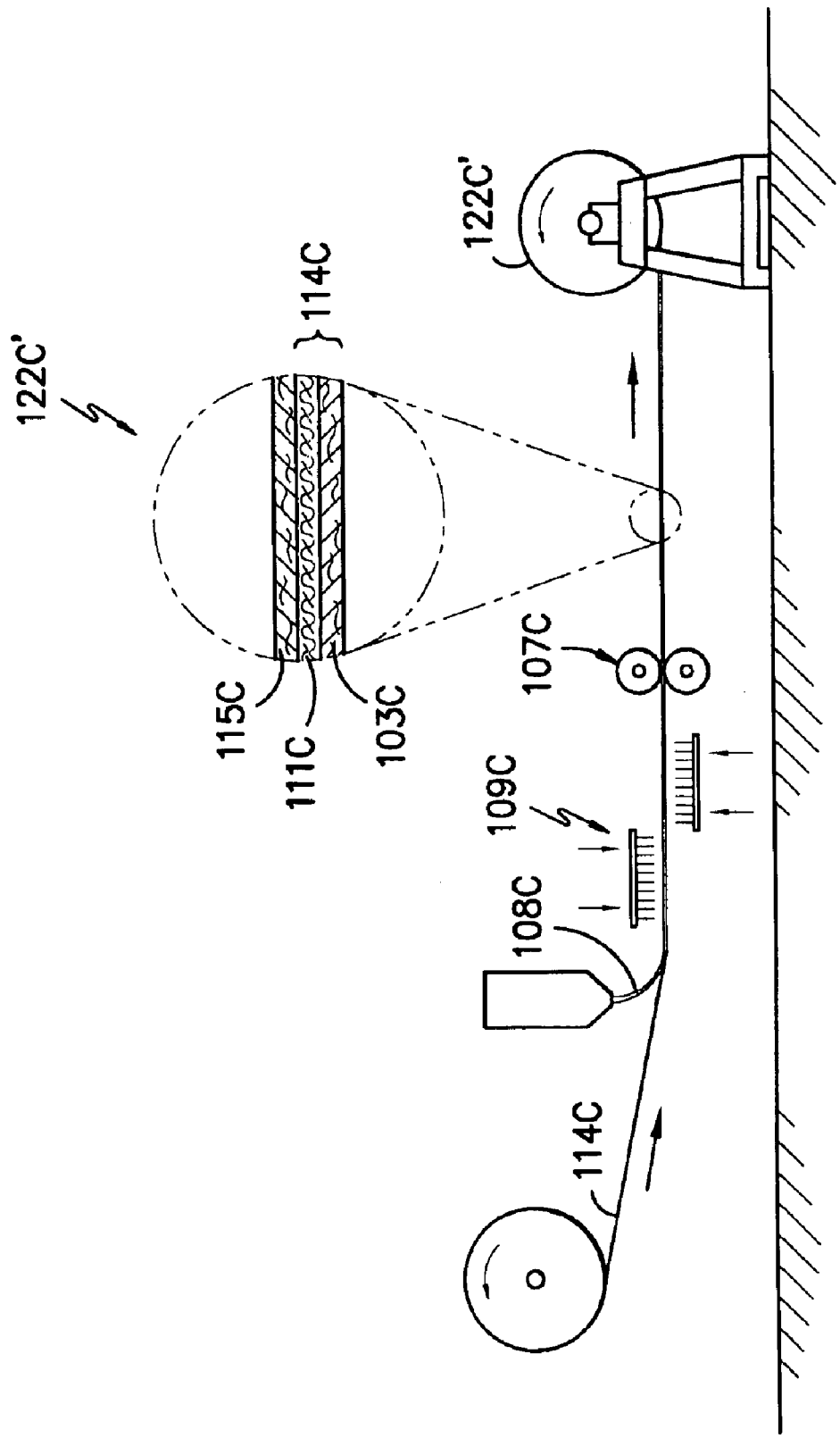
FIG. -3C-

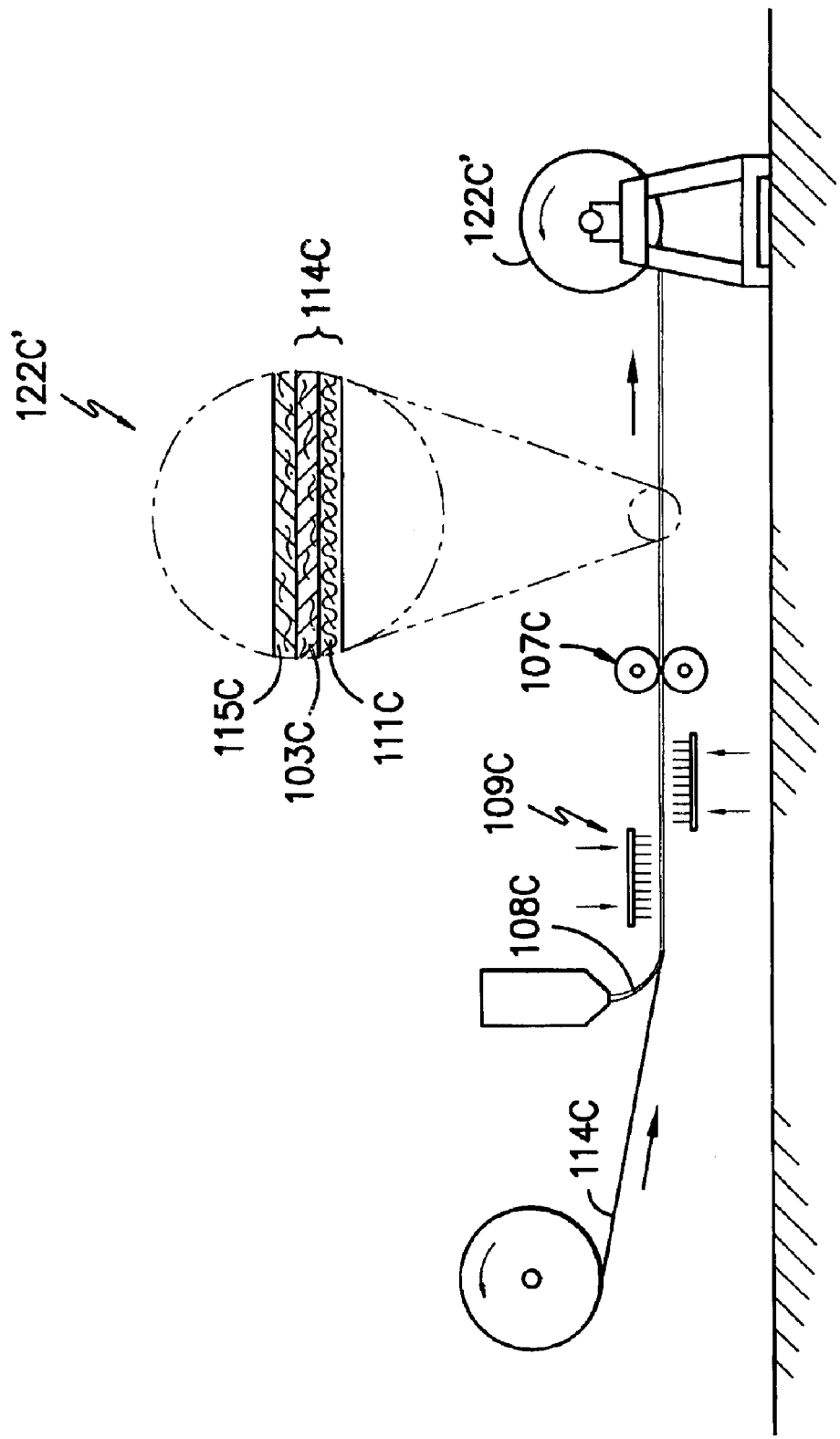
FIG. —3C'—

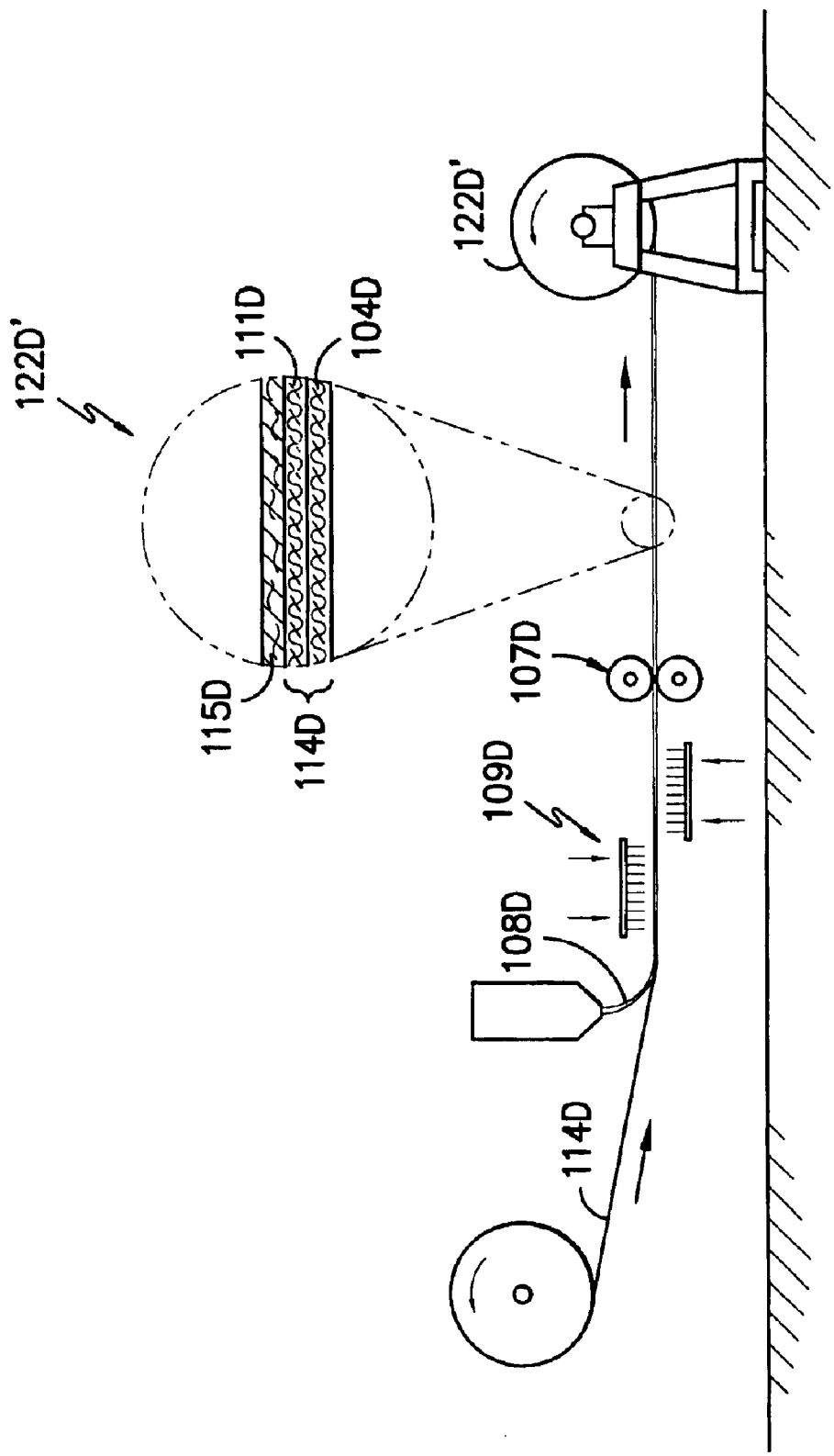
FIG. -3D-

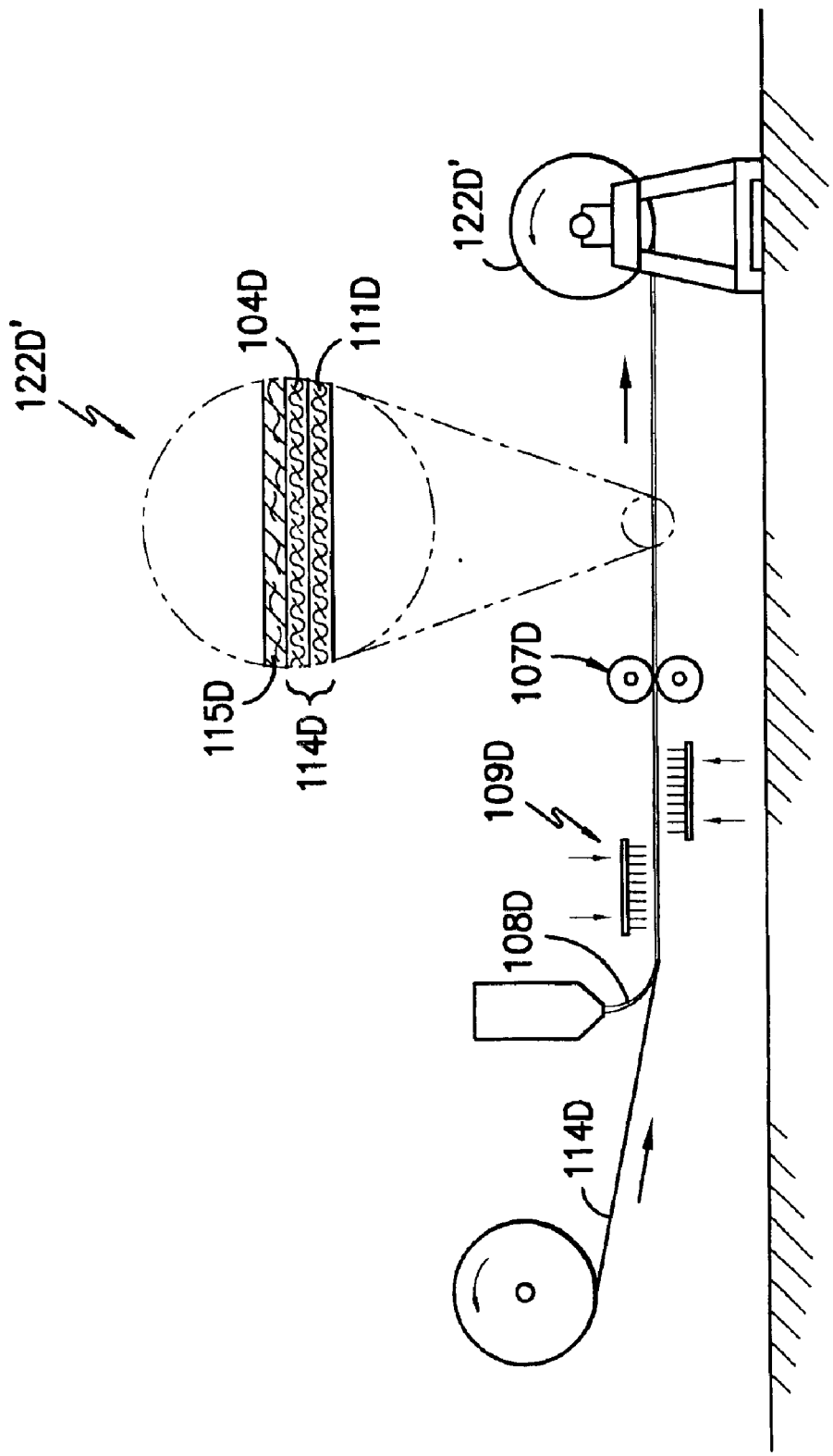

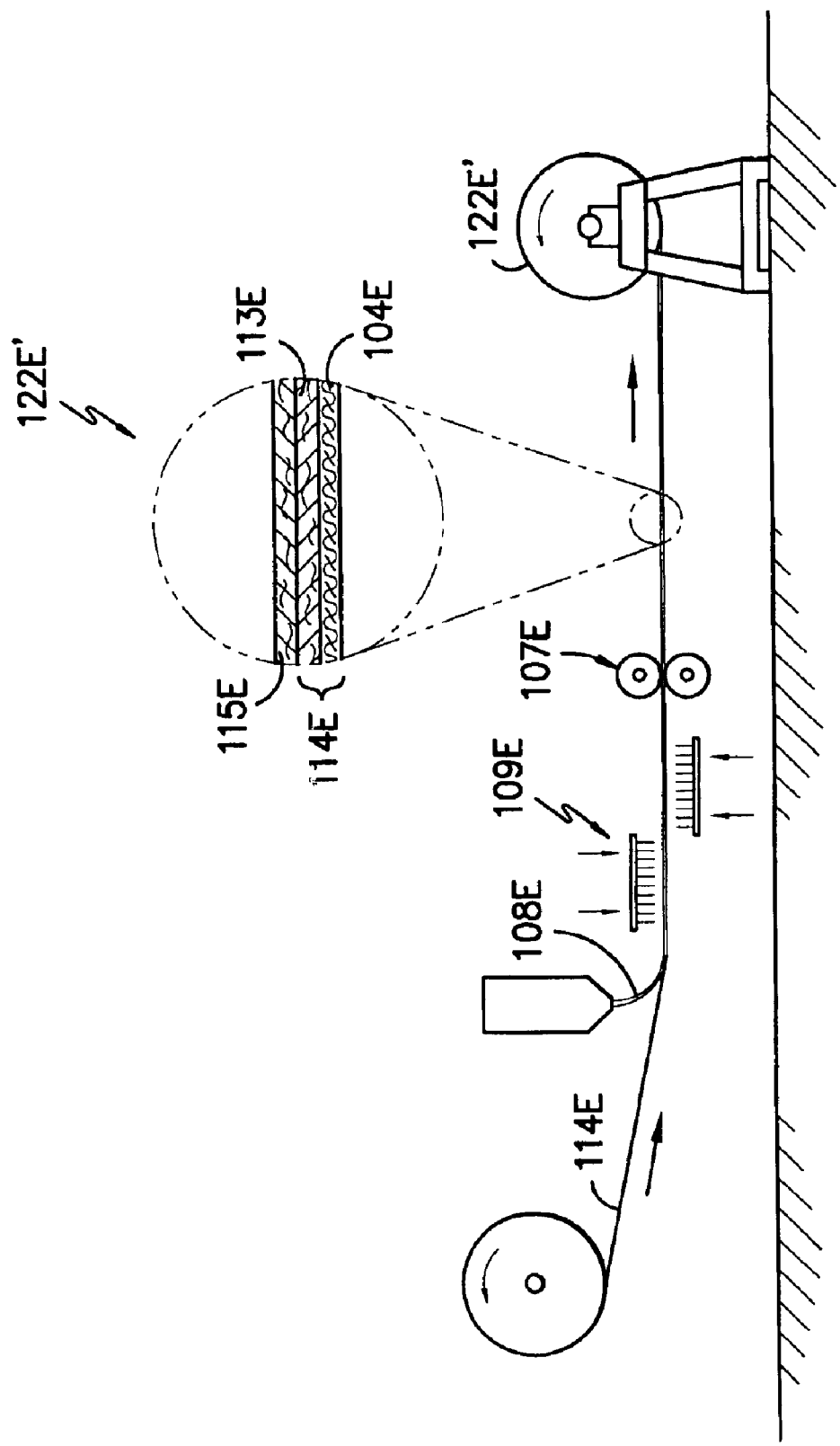
FIG. -3E-

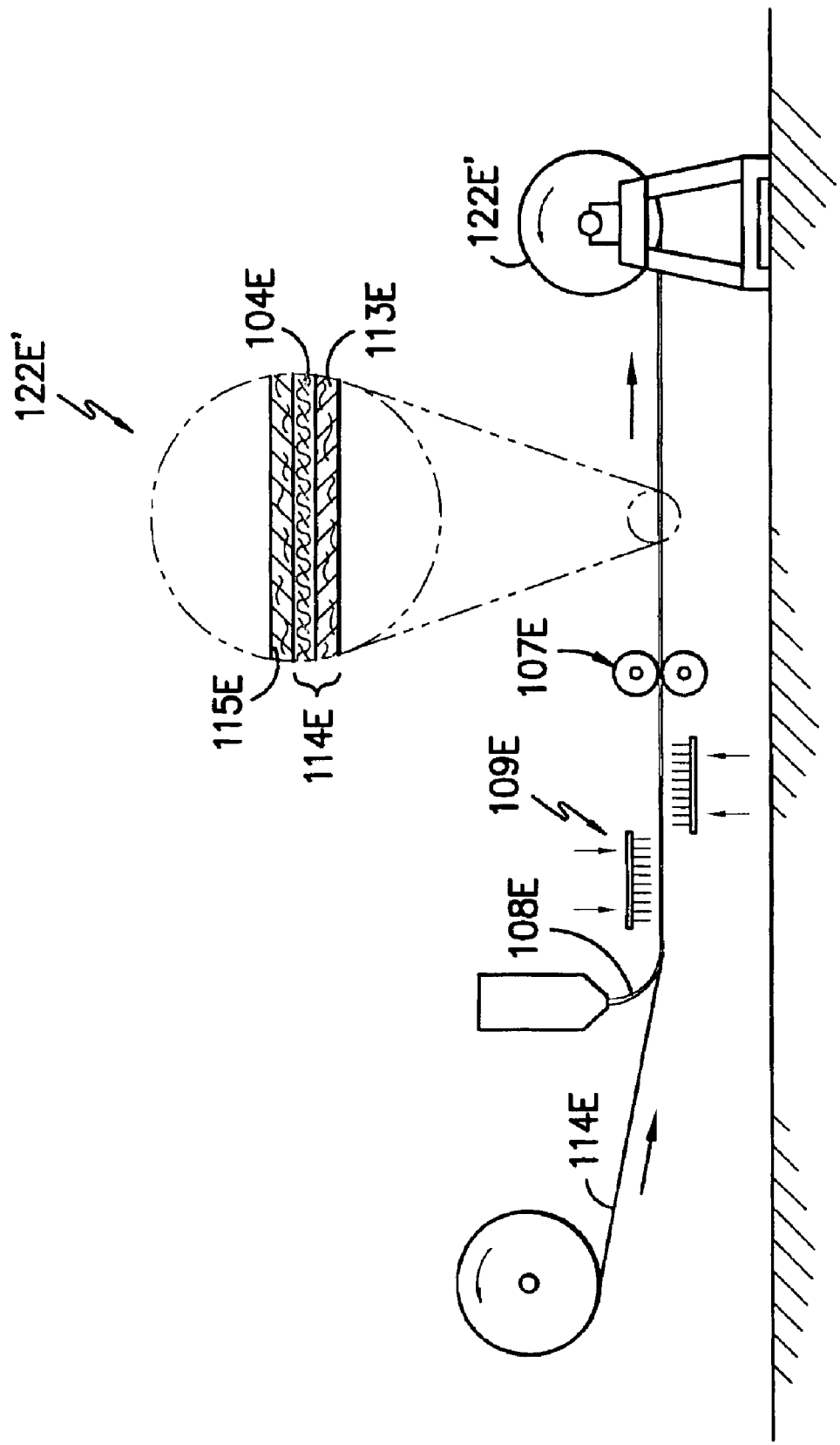
FIG. -3E'-

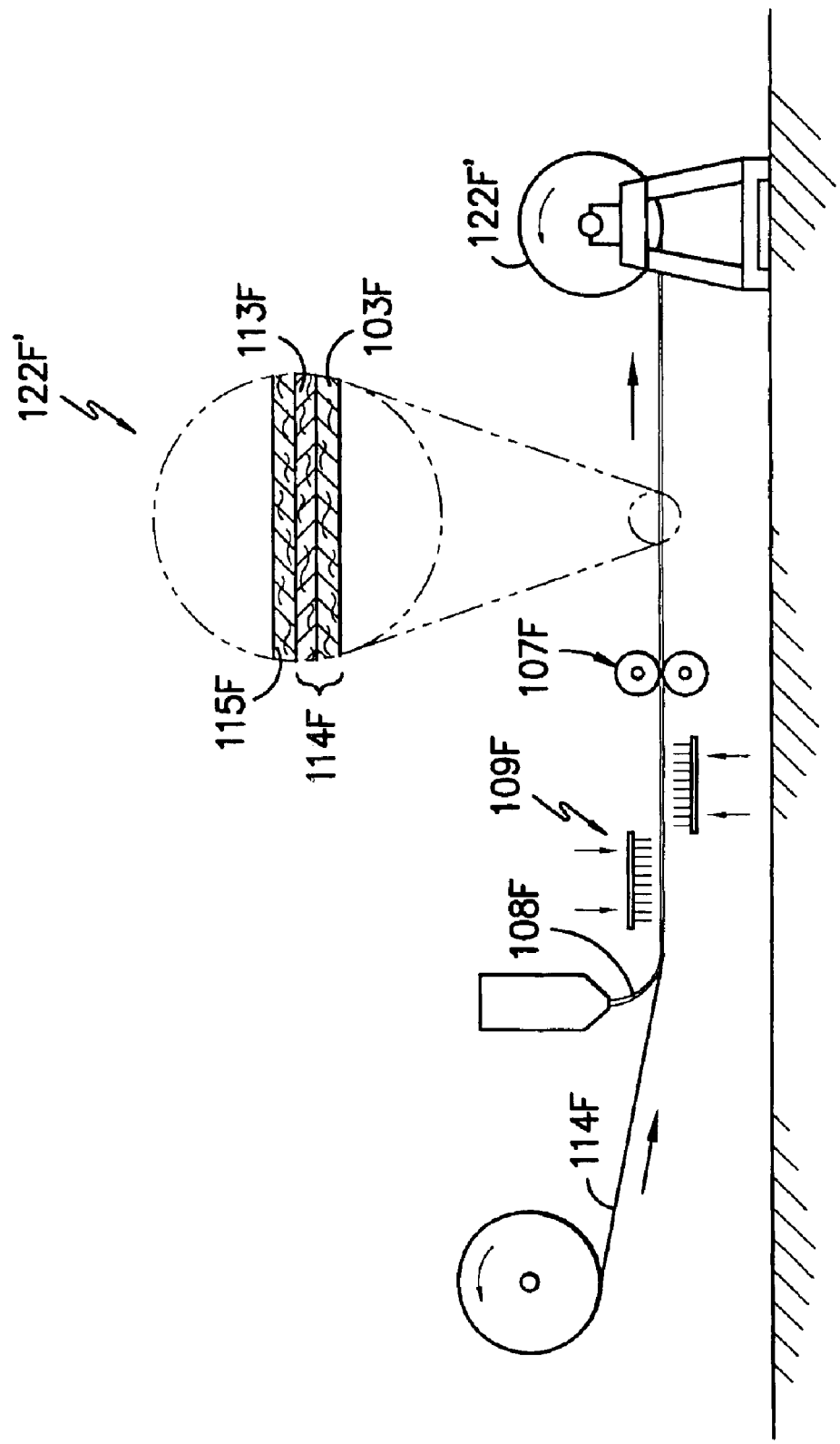
FIG. -3F-

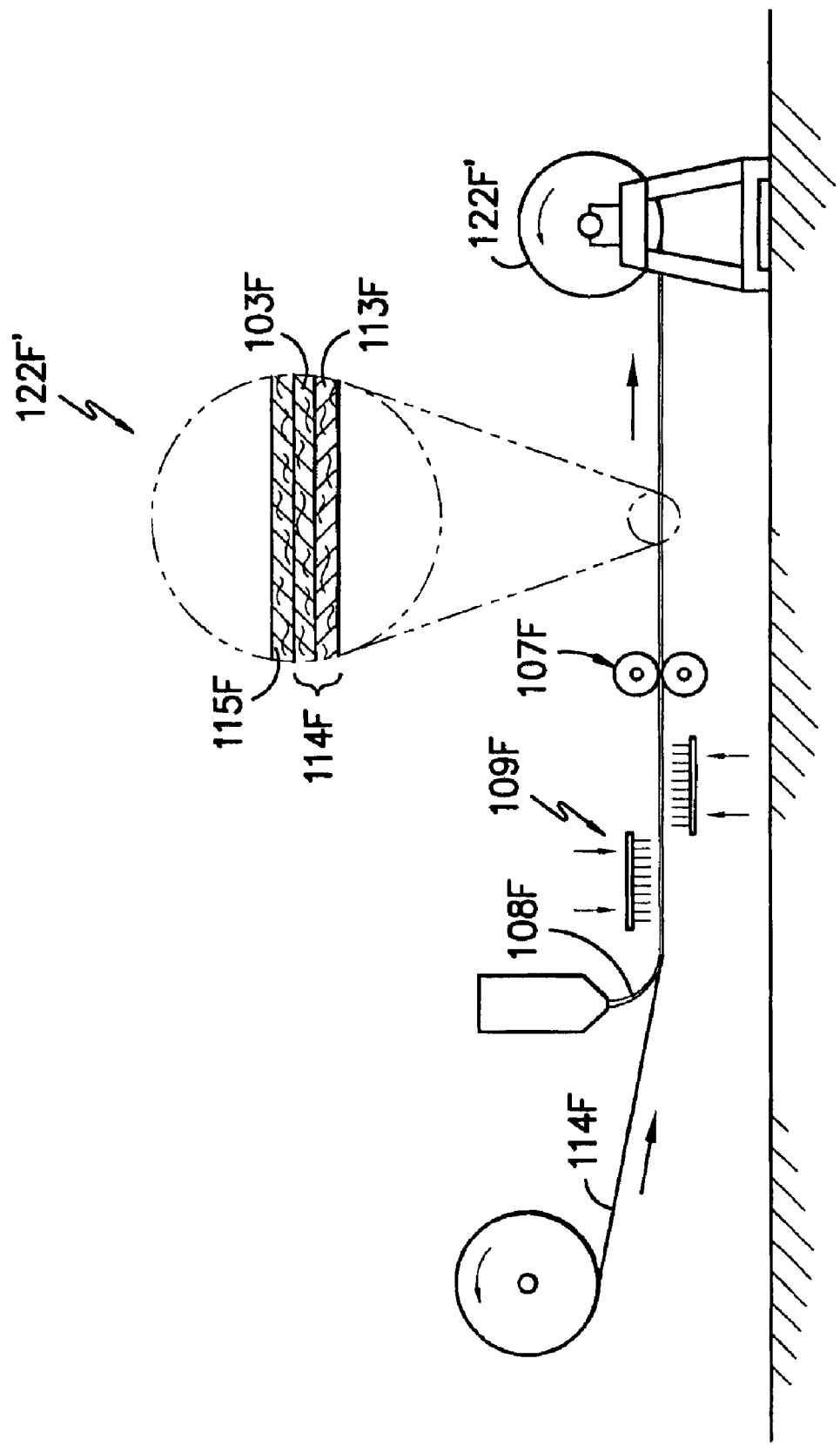
FIG. -3F'-

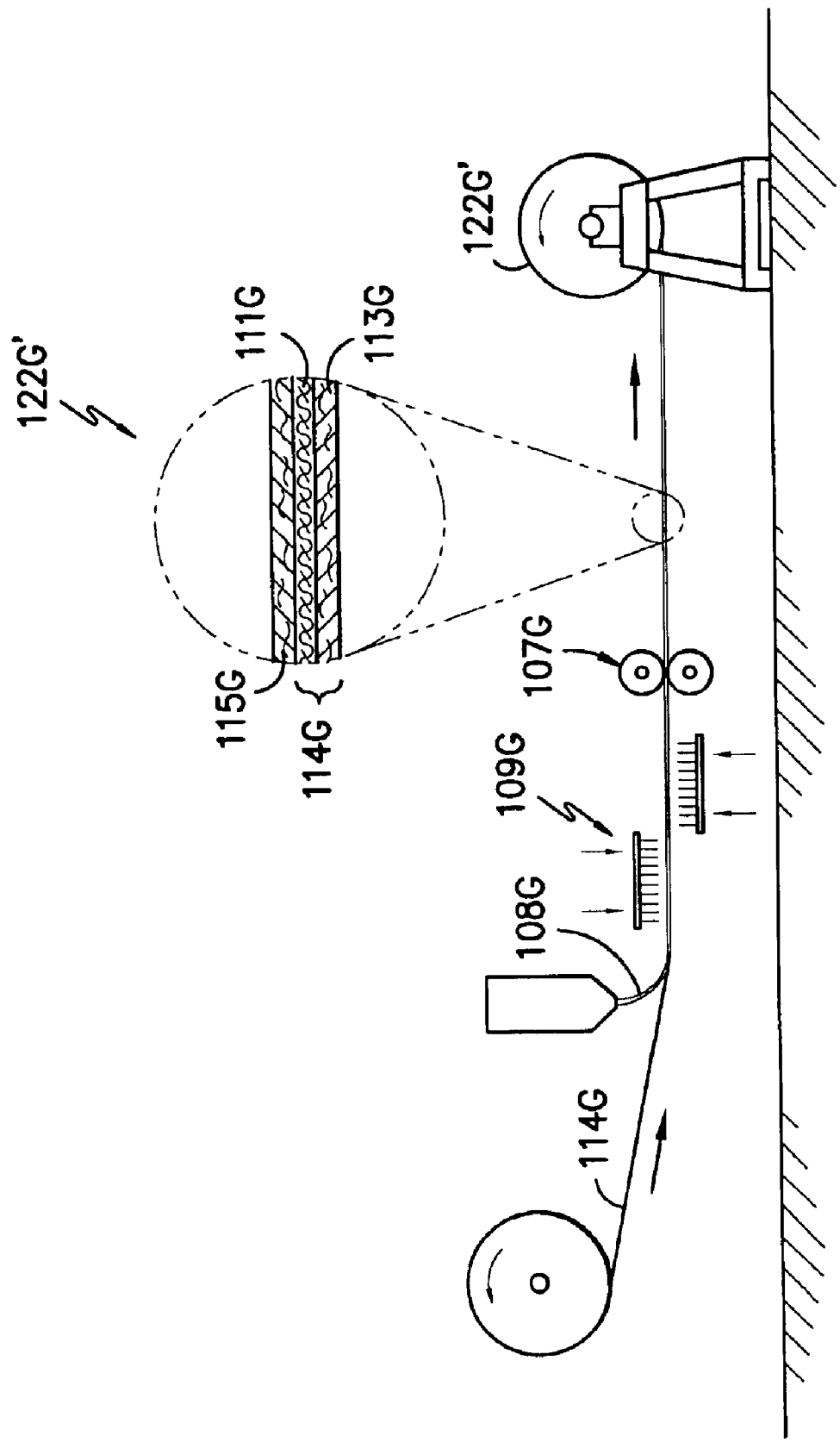
FIG. -3G-

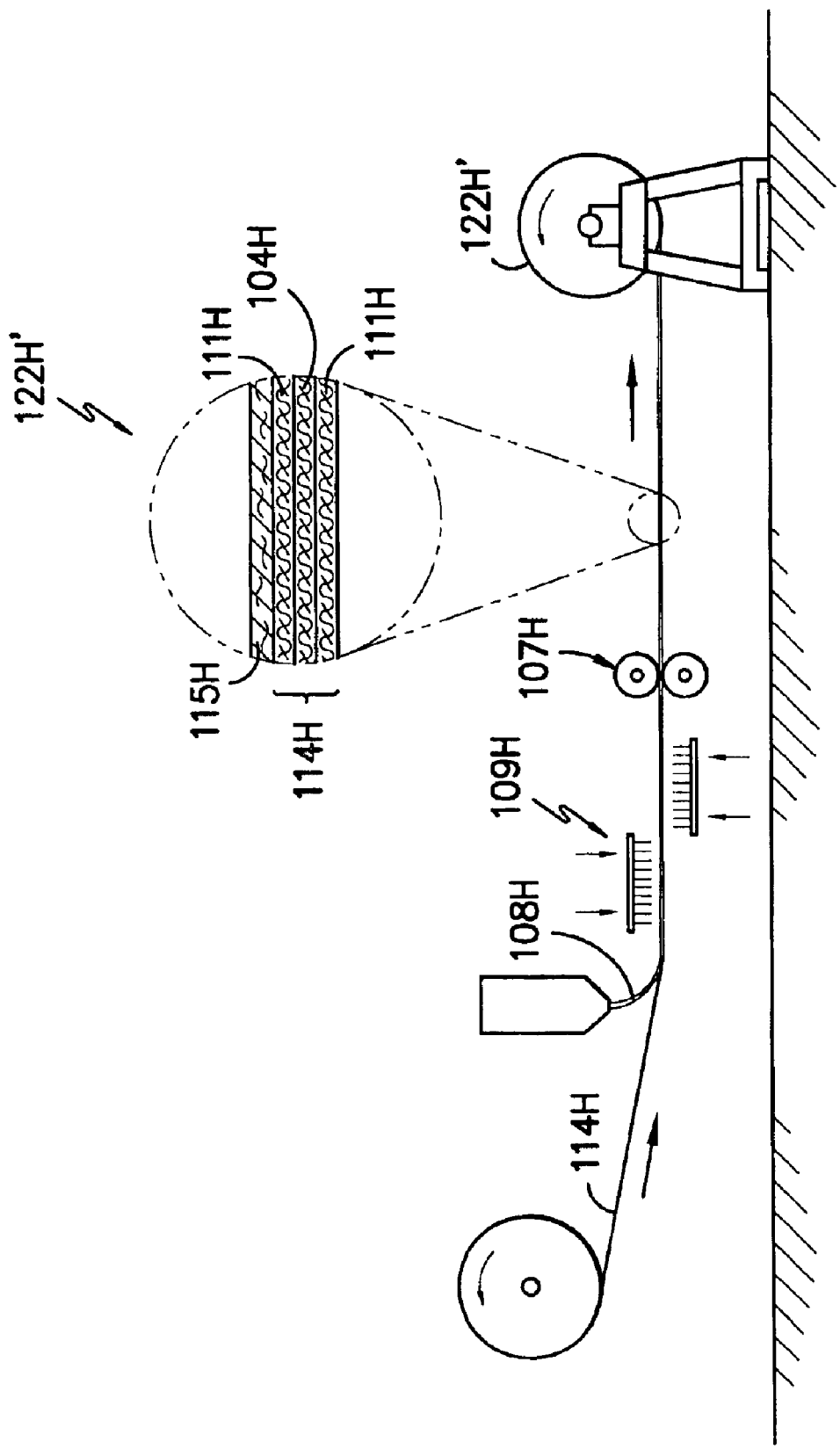

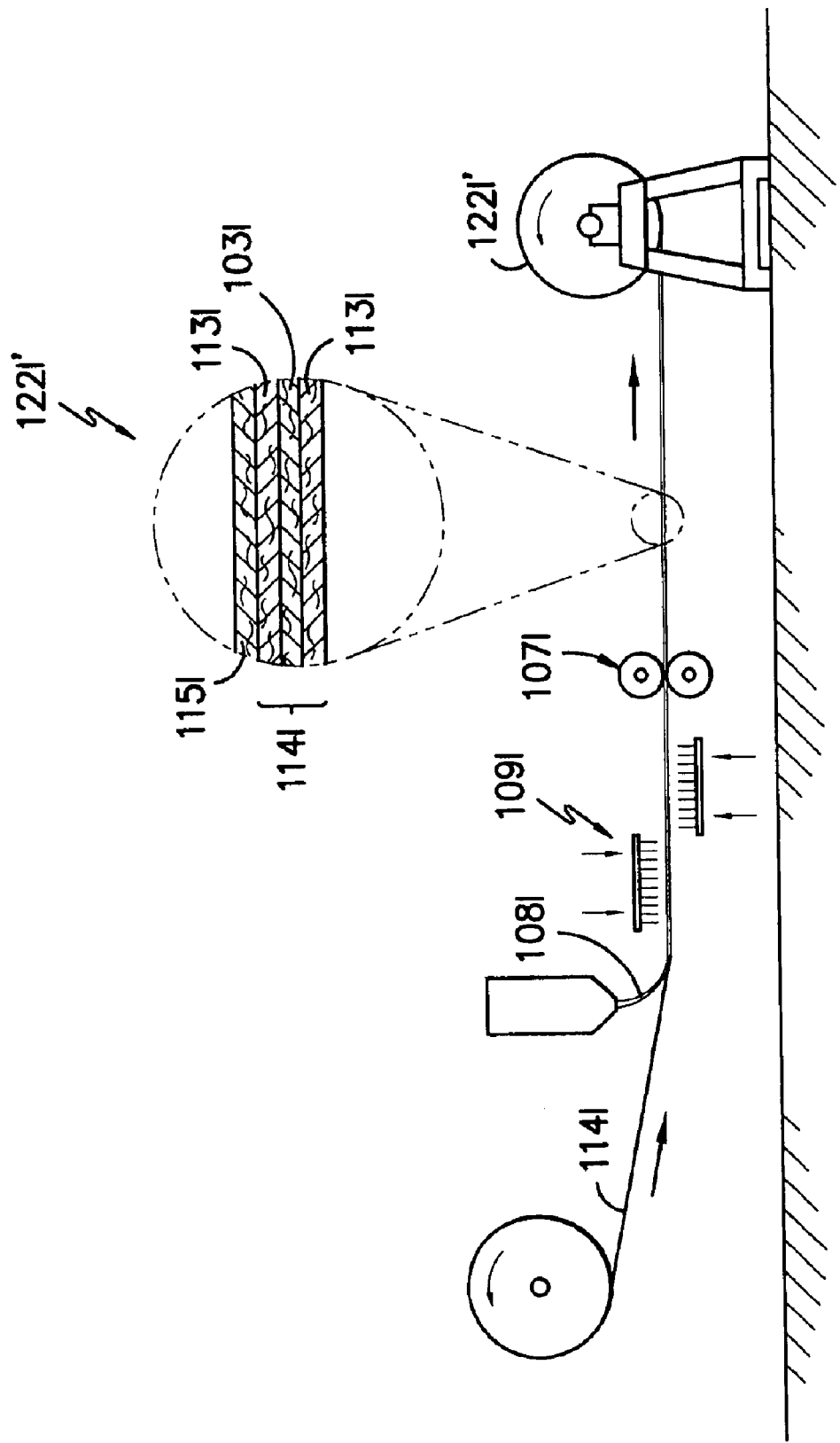

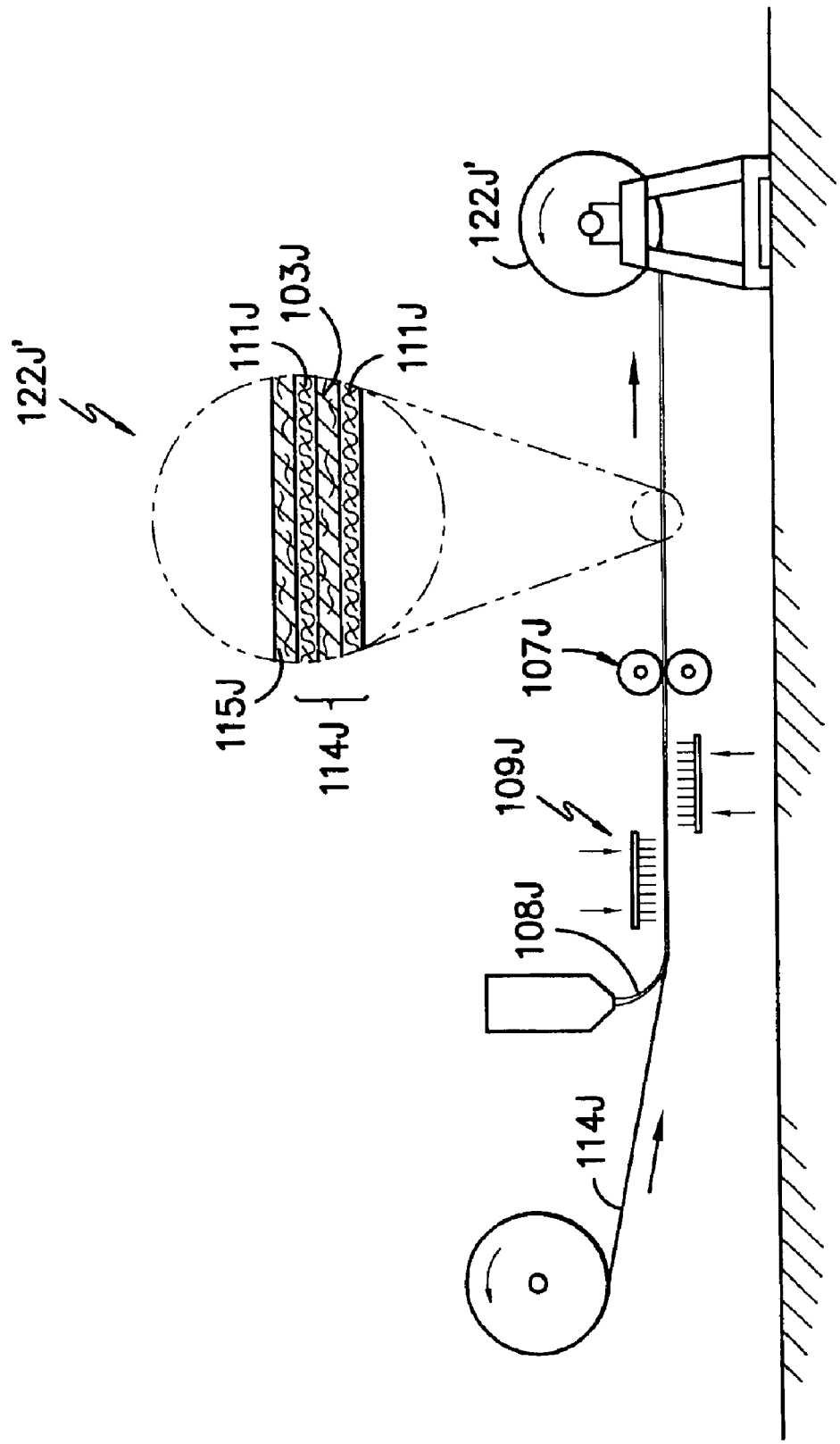
FIG. -3J-

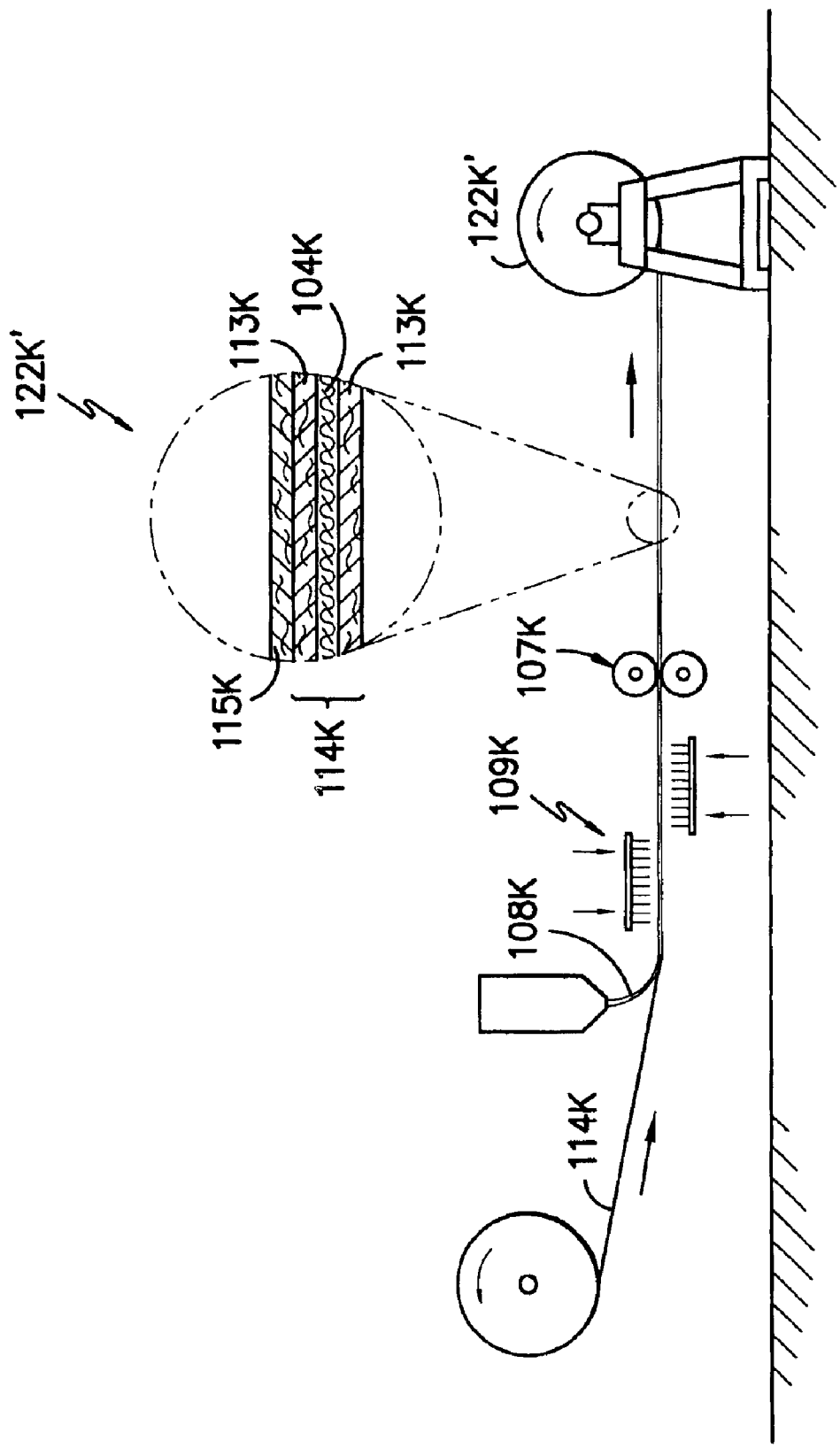

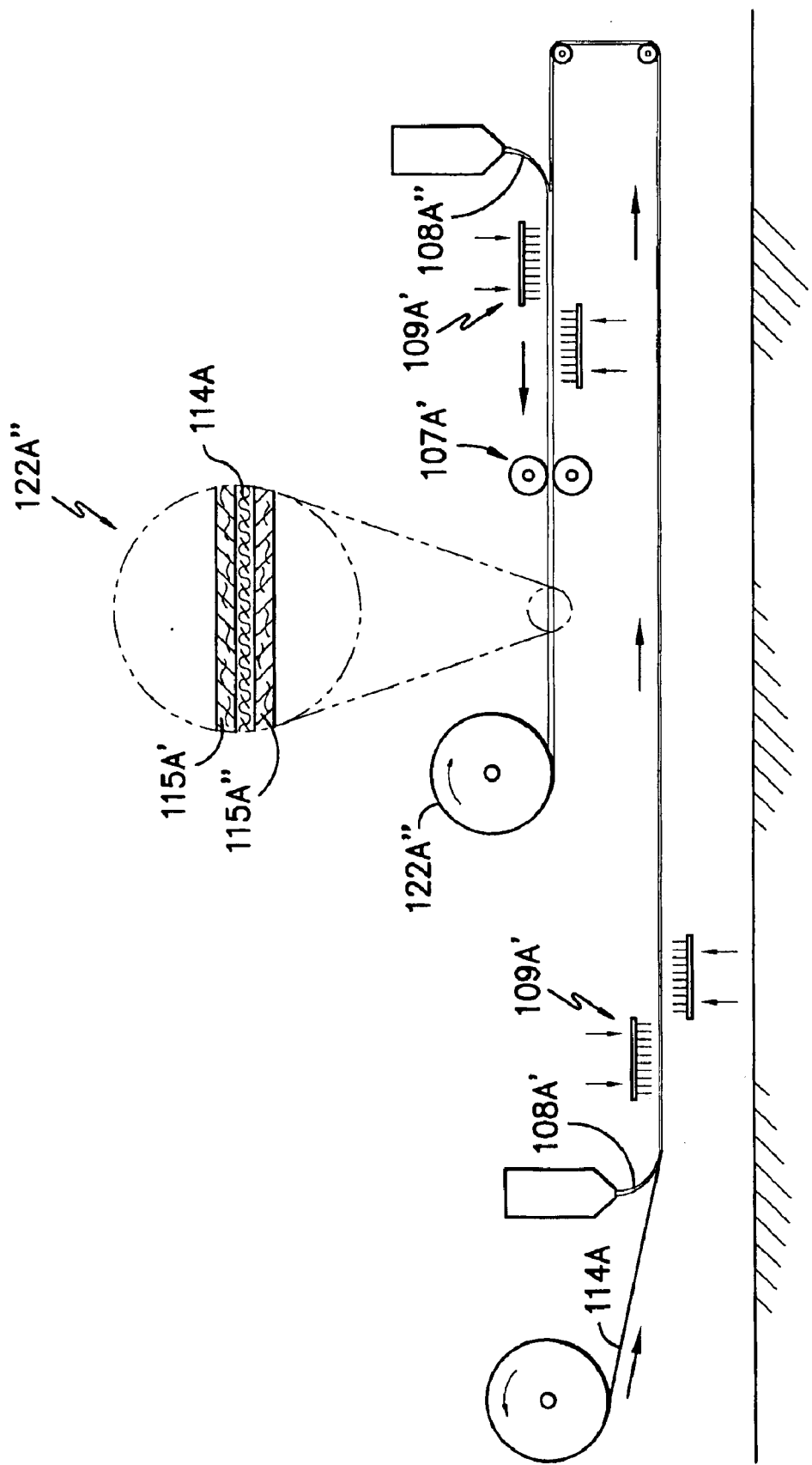
FIG. -4A-

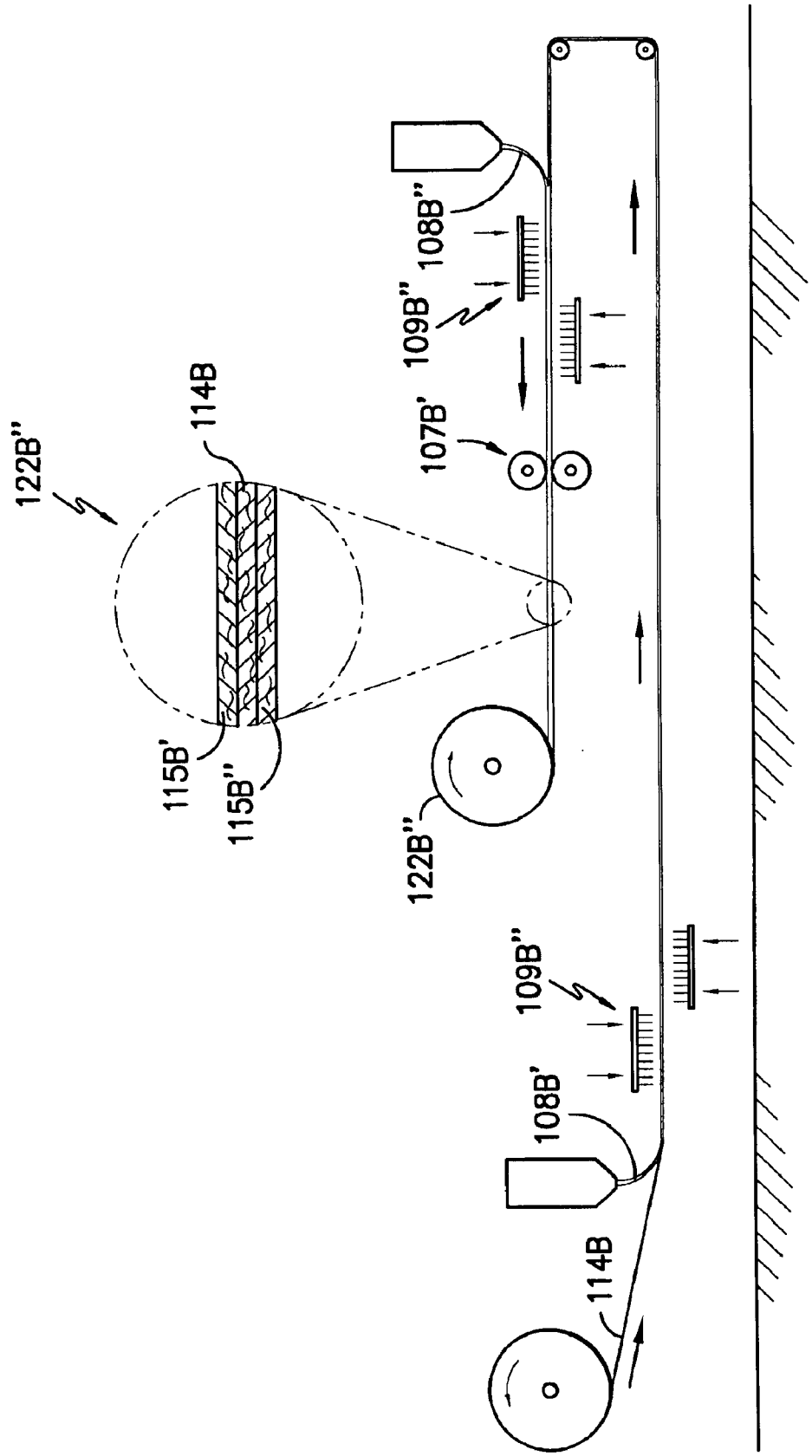
FIG. -4B-

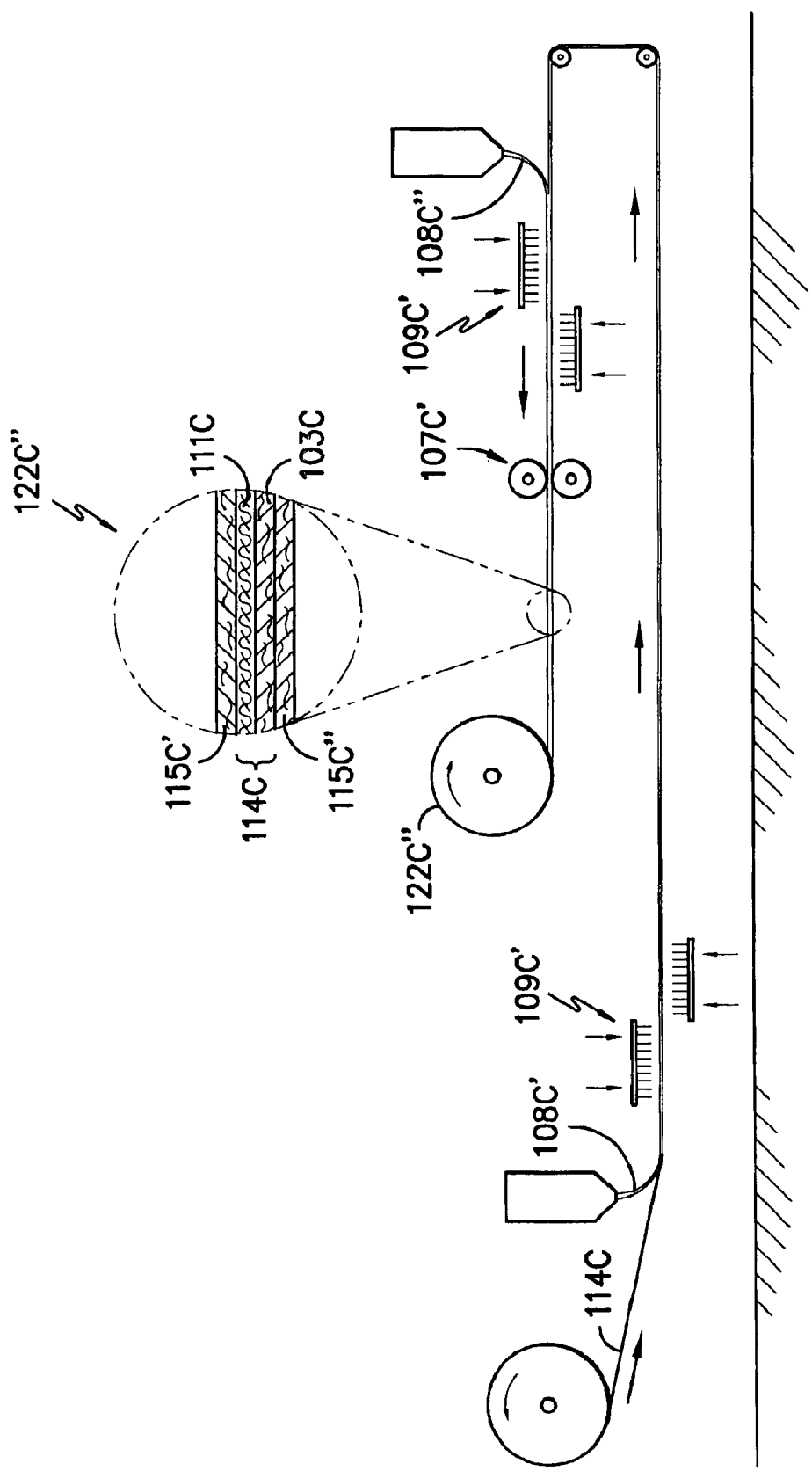
FIG. -4C-

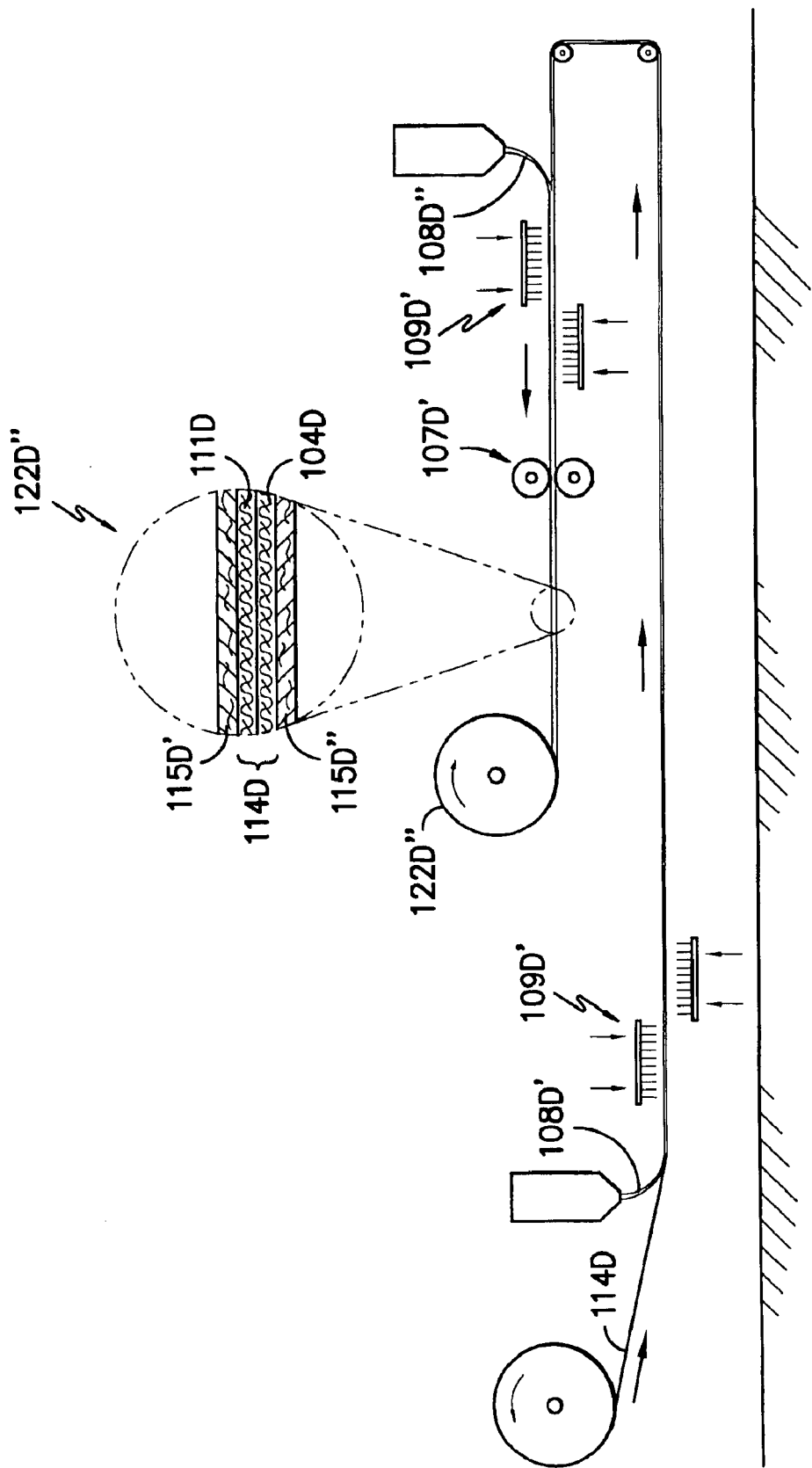
FIG. —4D—

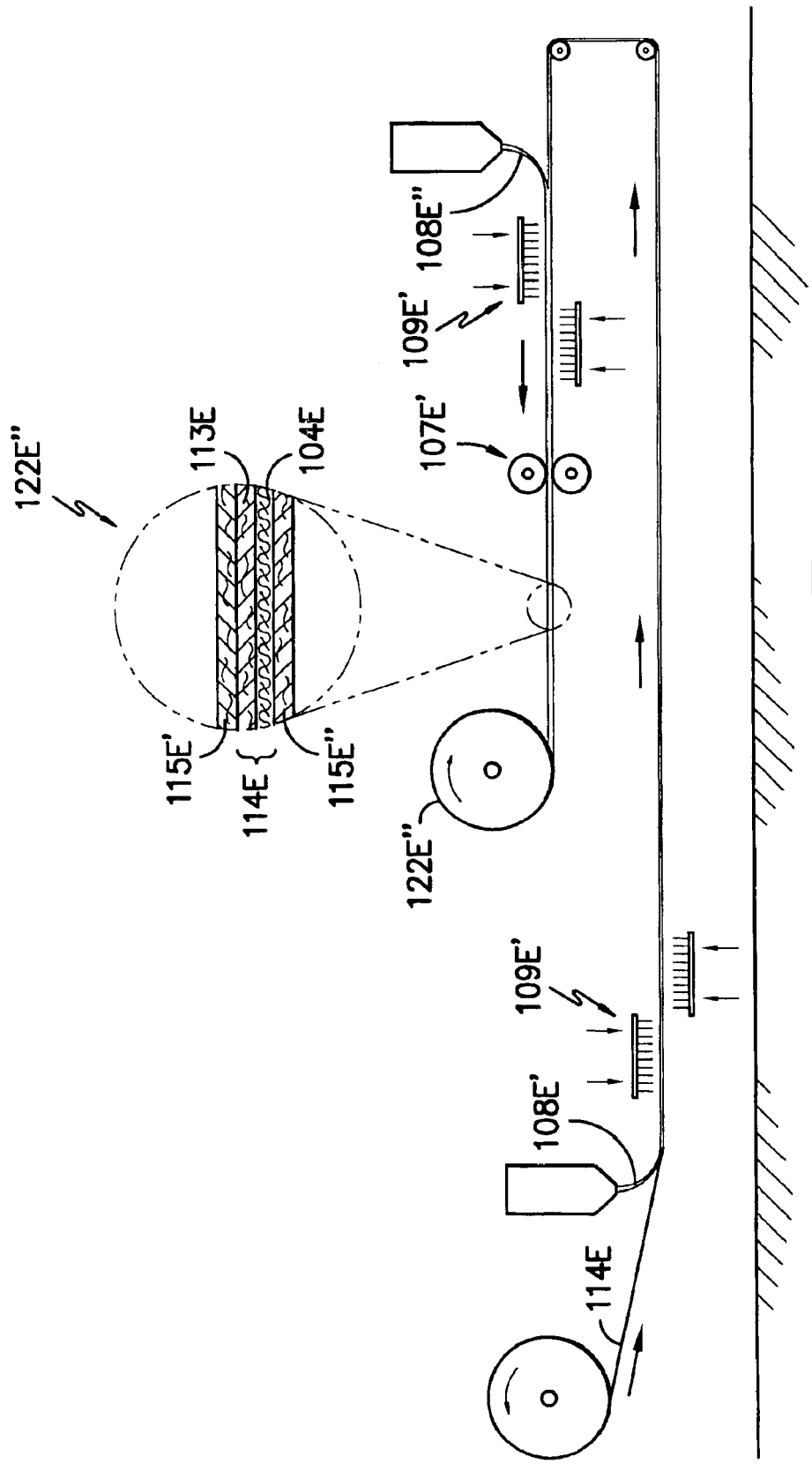
FIG. —4E—

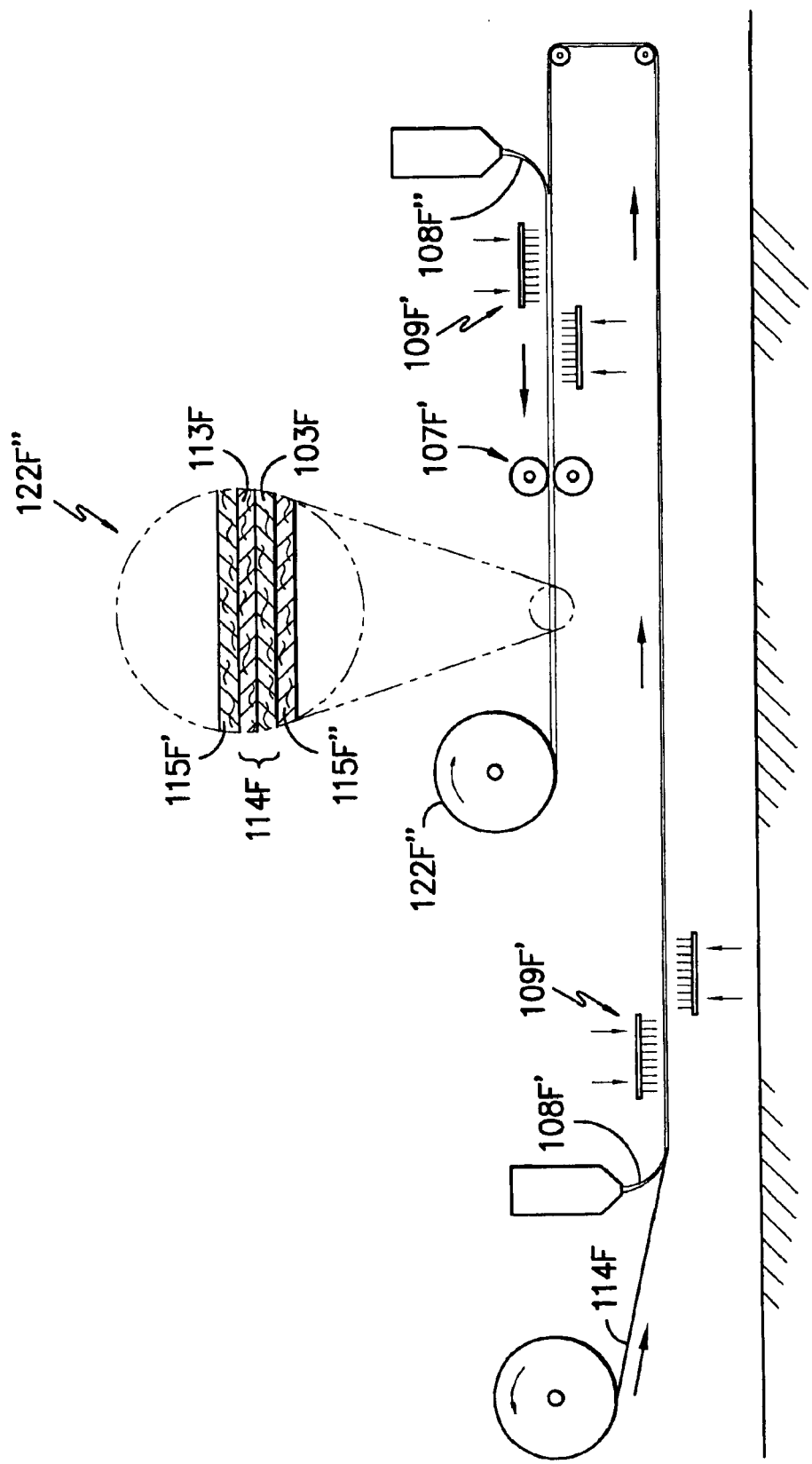
FIG. -4F-

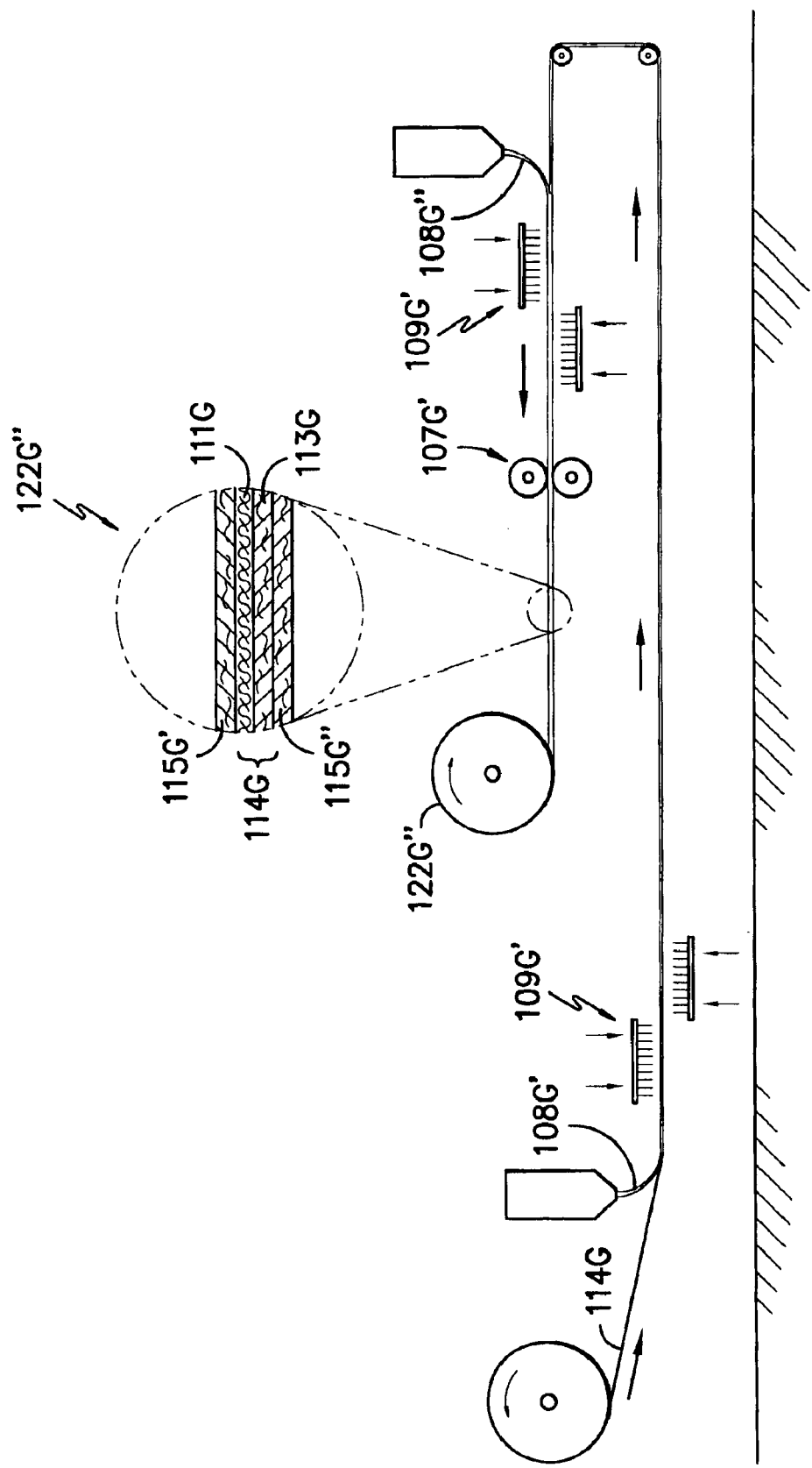
FIG. -4G-

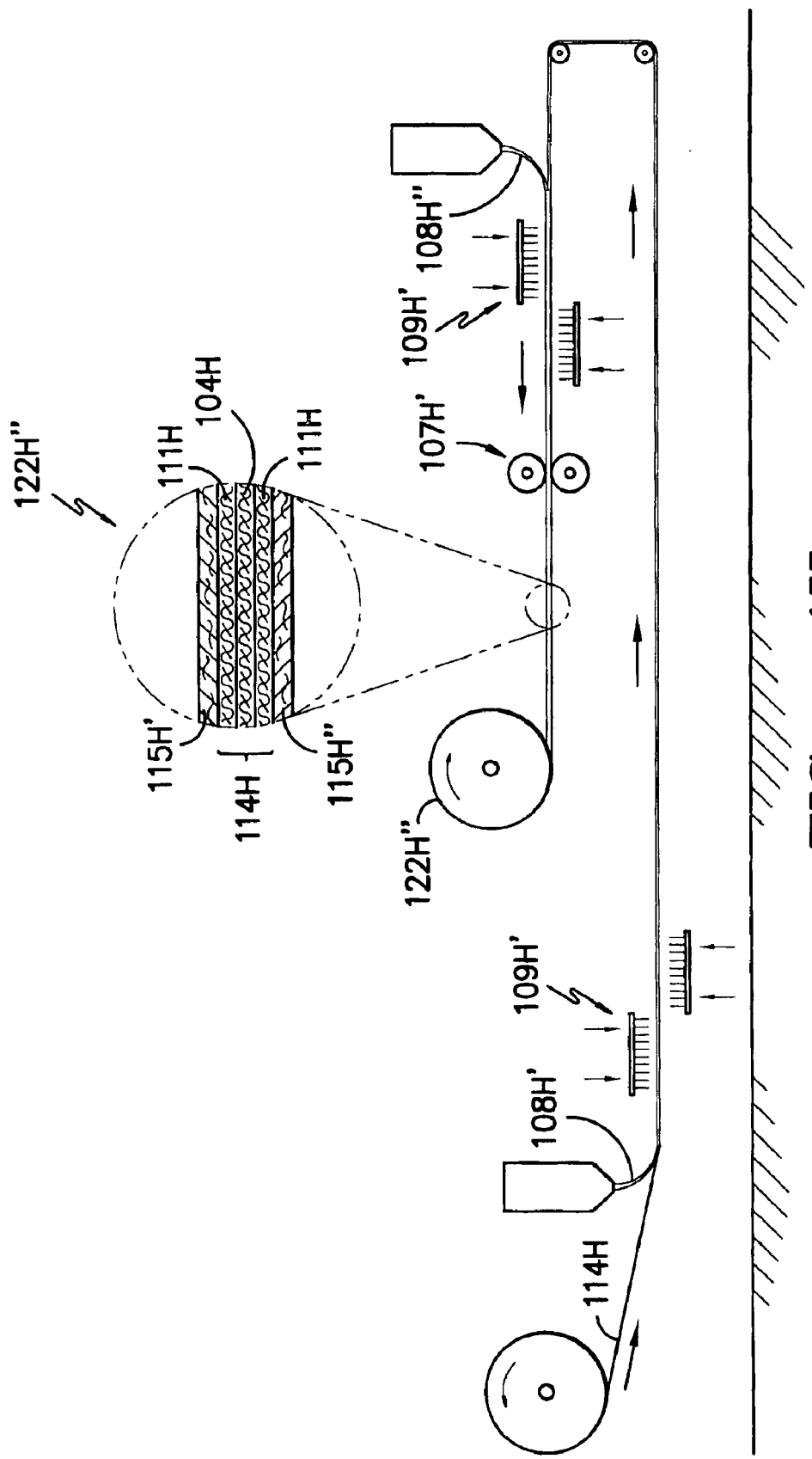

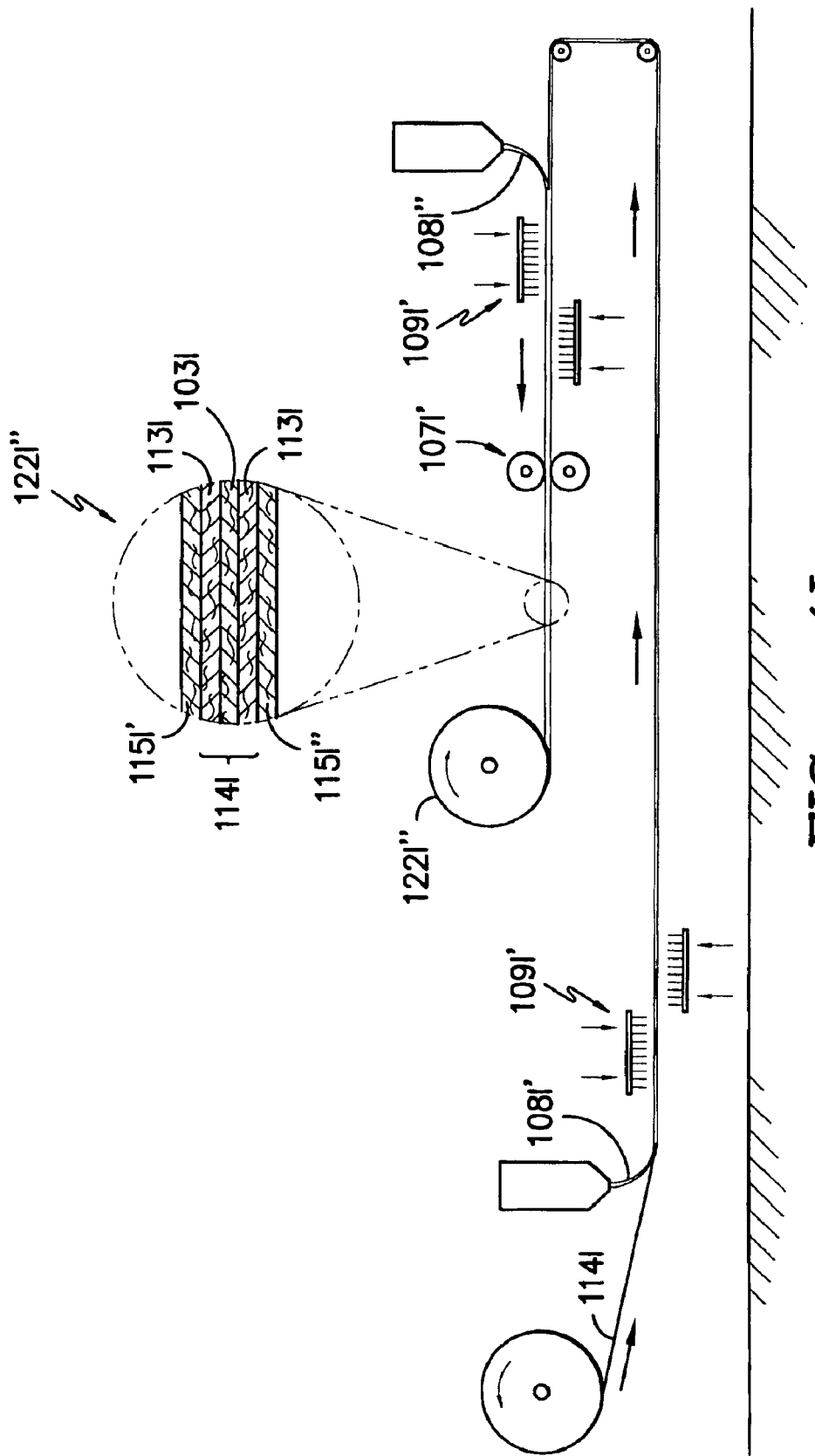
FIG. -4I-

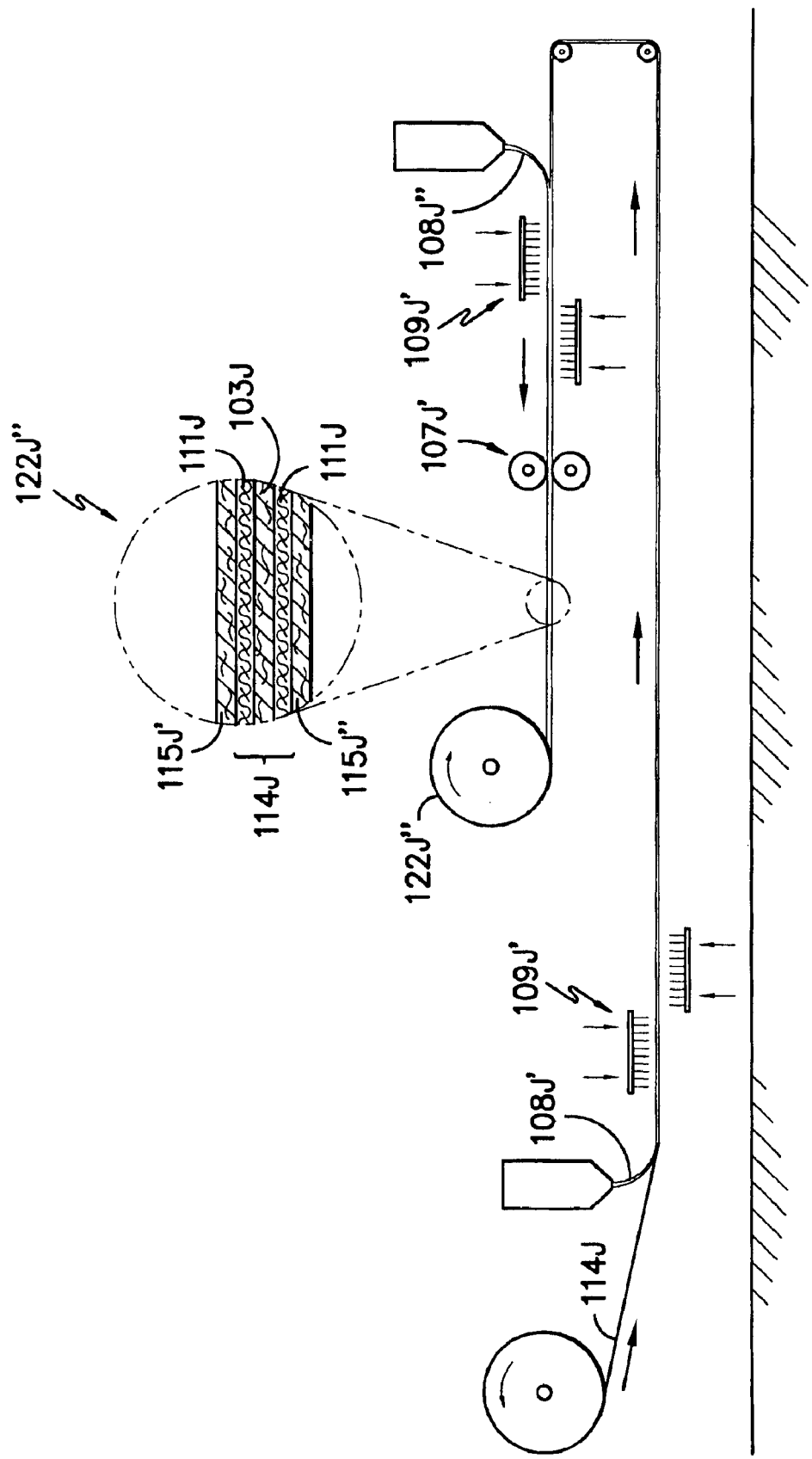
FIG. -4J-

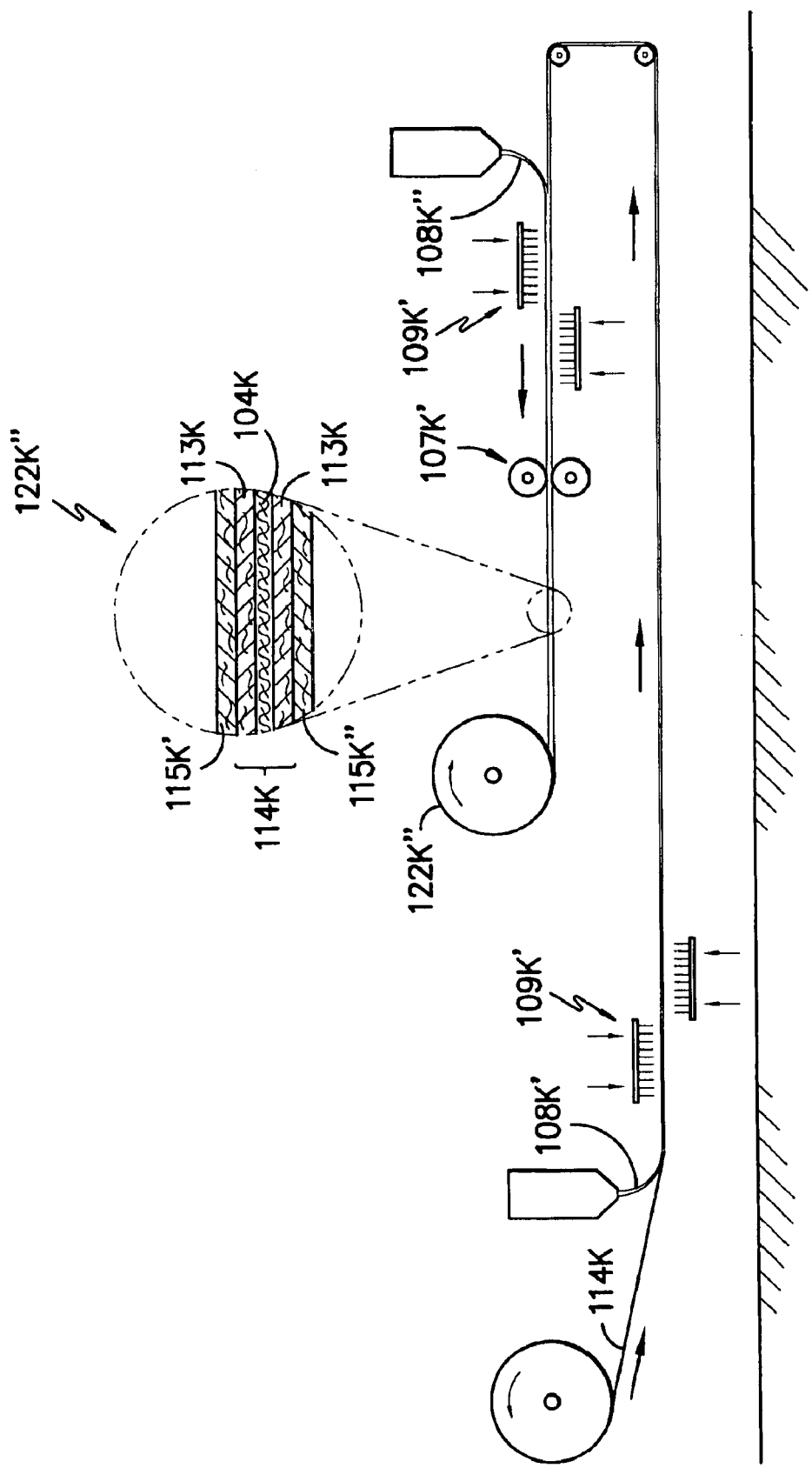
FIG. -4K-

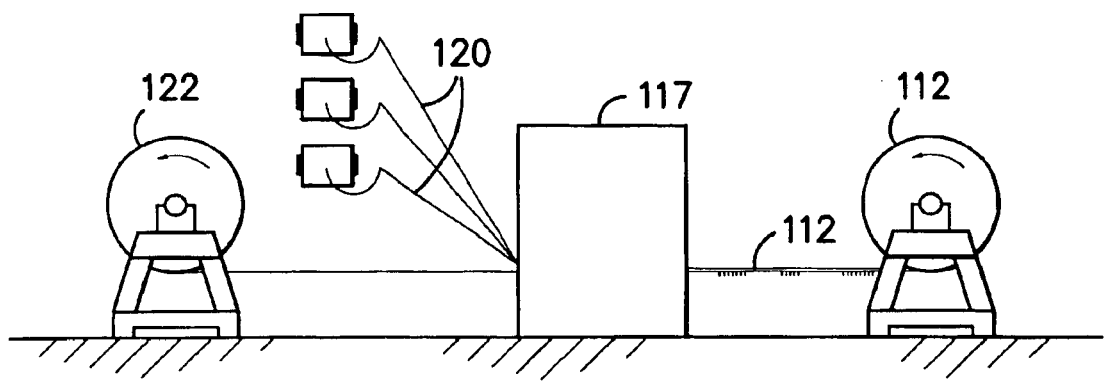
FIG. —5A—
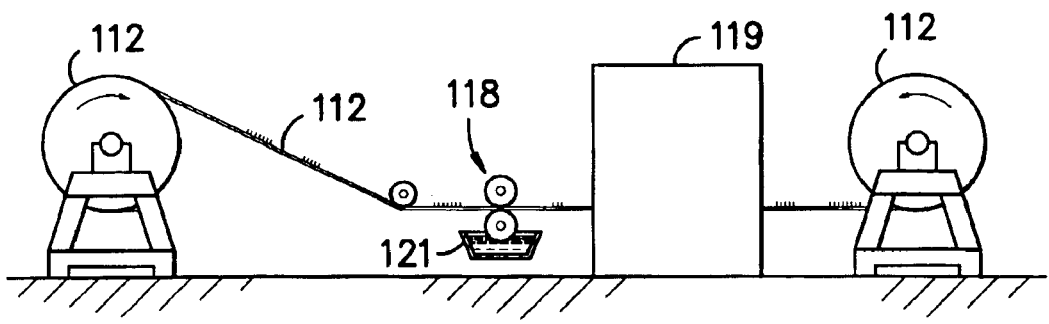
FIG. —5B—

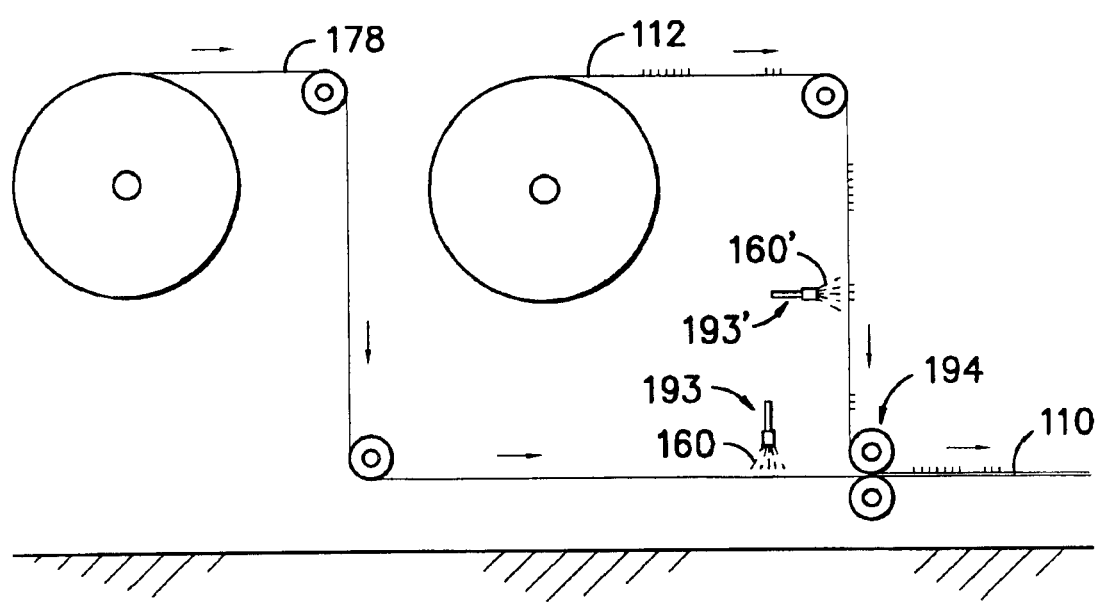
FIG. —6—

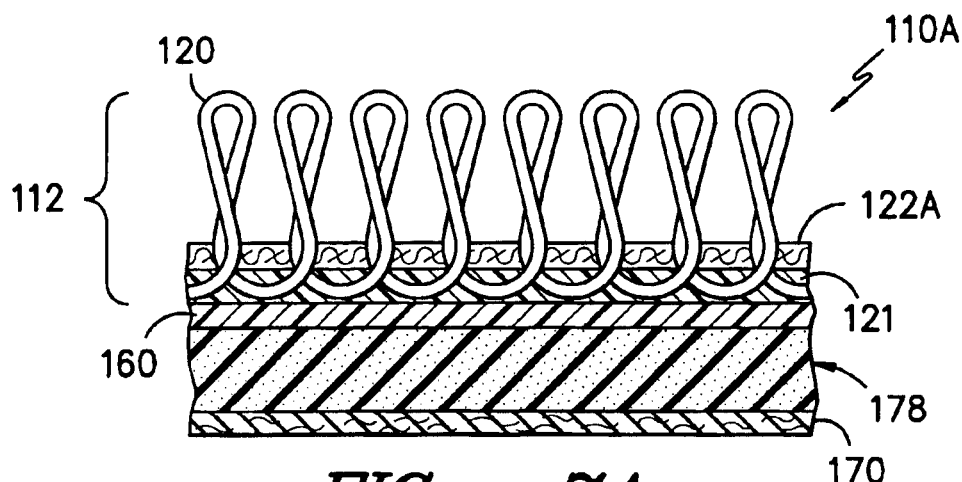
FIG. -7A-
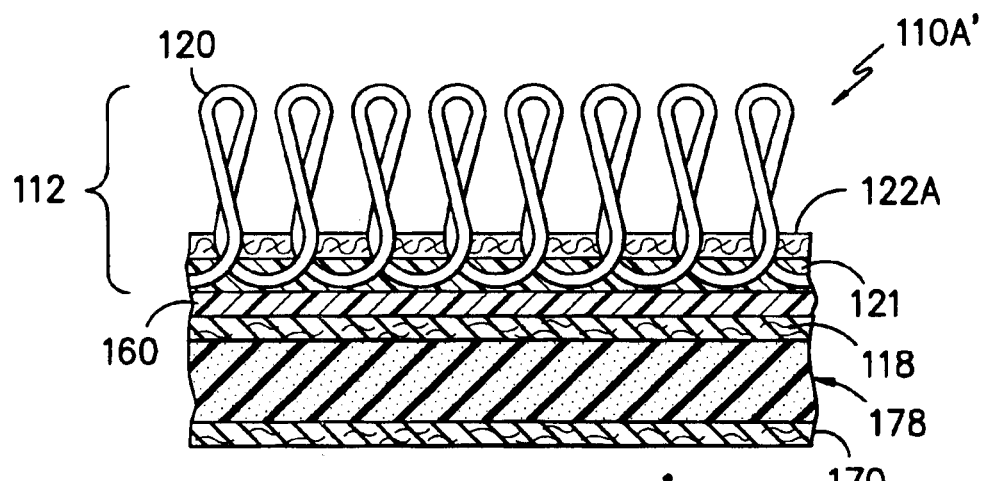
FIG. -7A'-
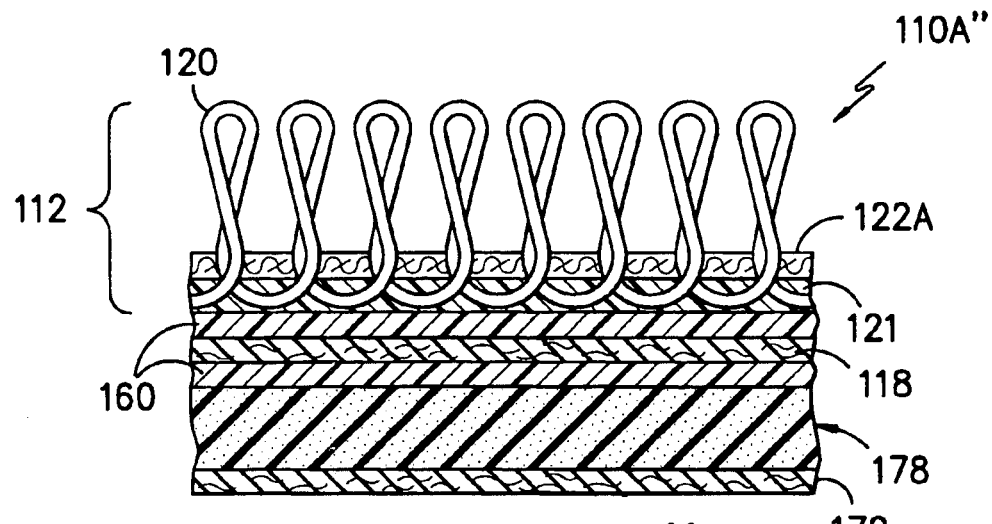
FIG. -7A''-

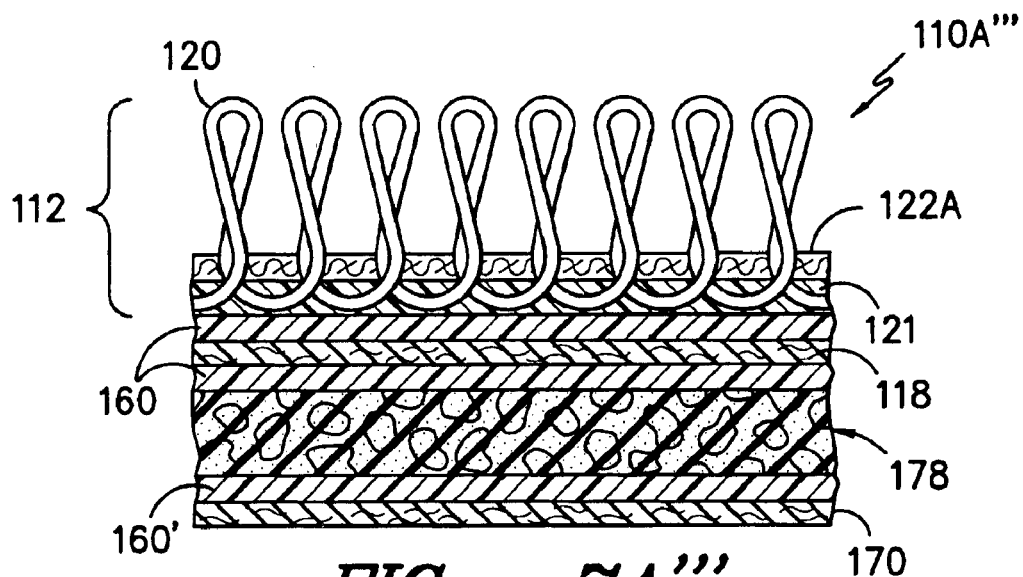
FIG. -7A'''-
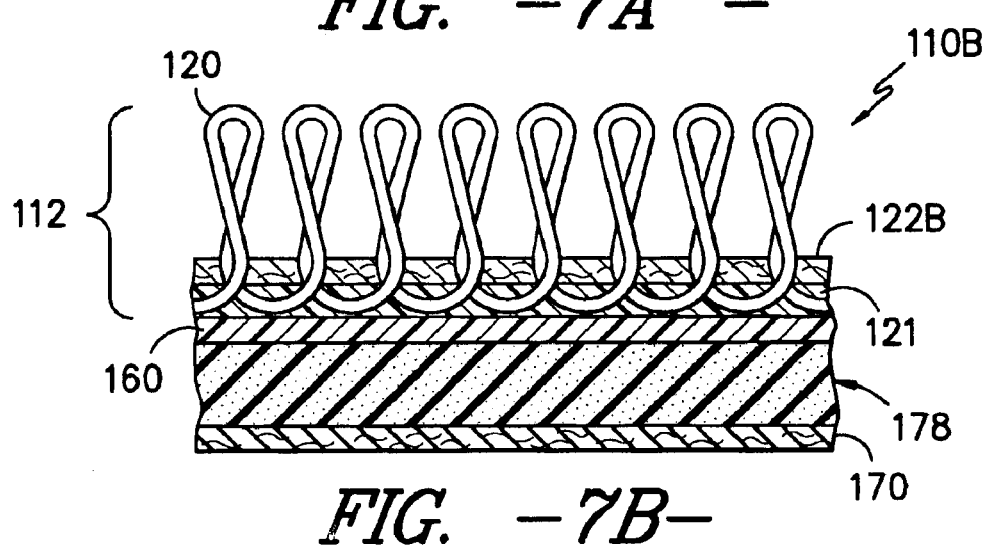
FIG. -7B-
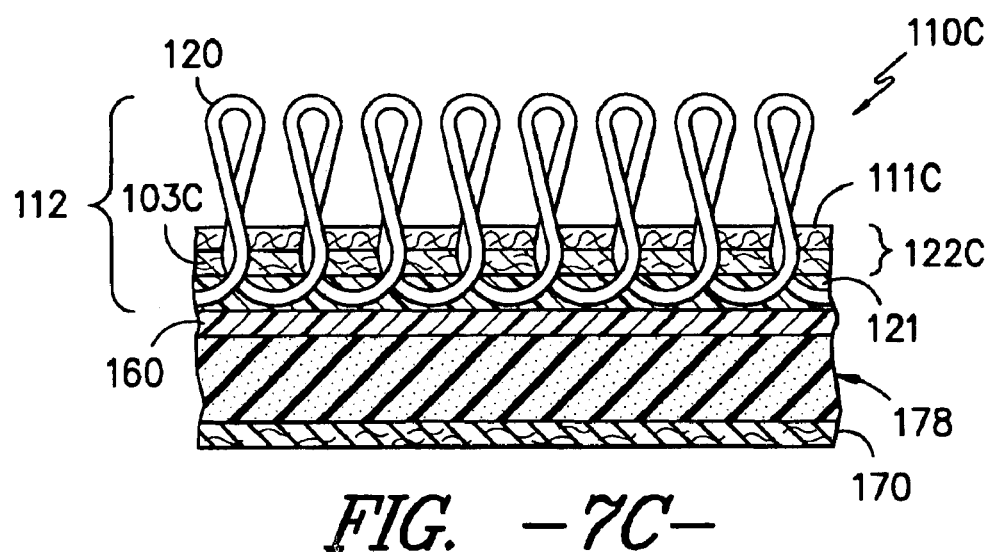
FIG. -7C-

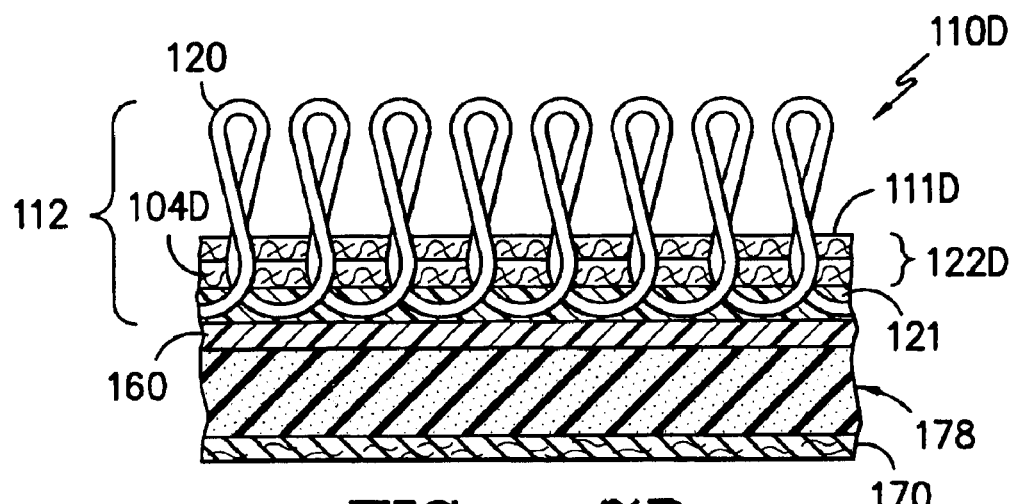
FIG. -7D-
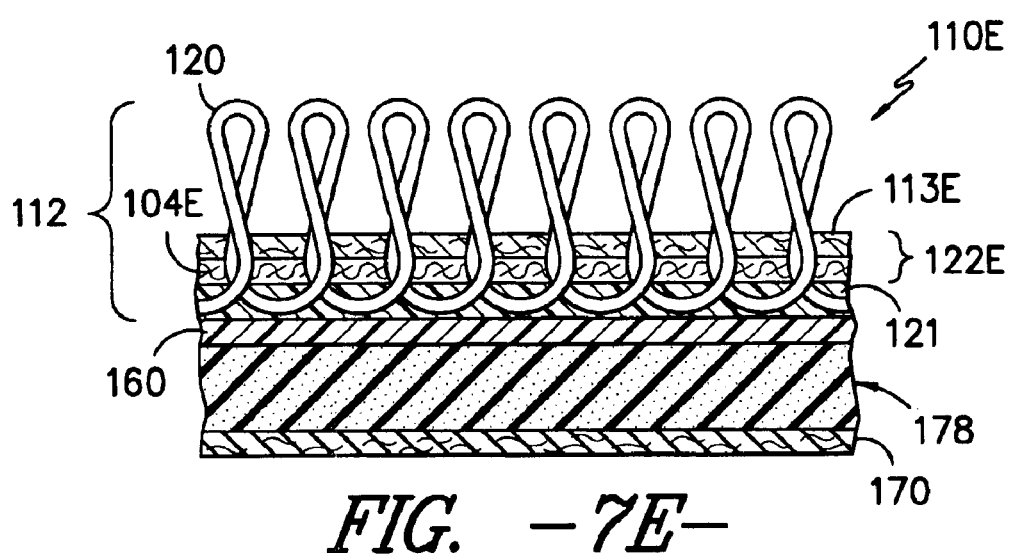
FIG. -7E-
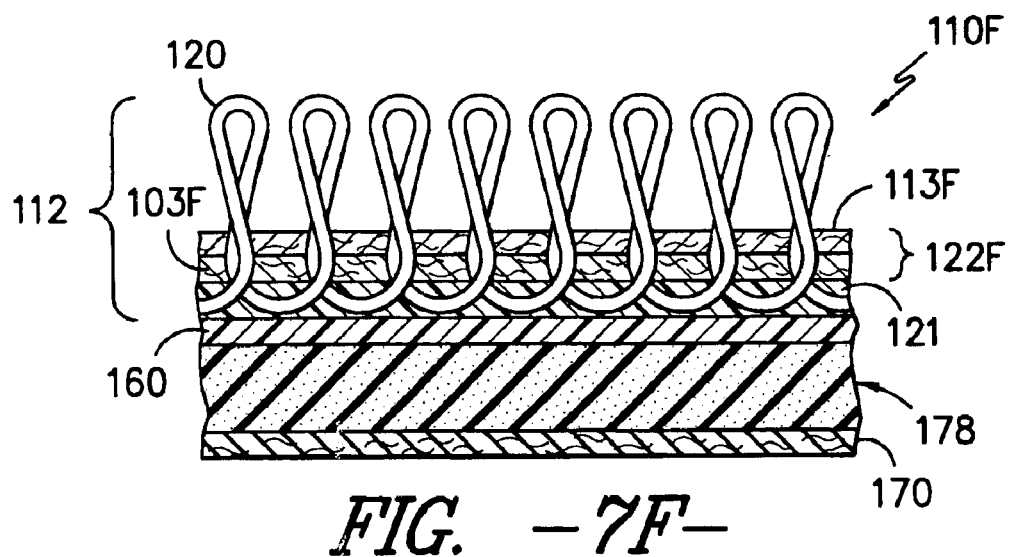
FIG. -7F-

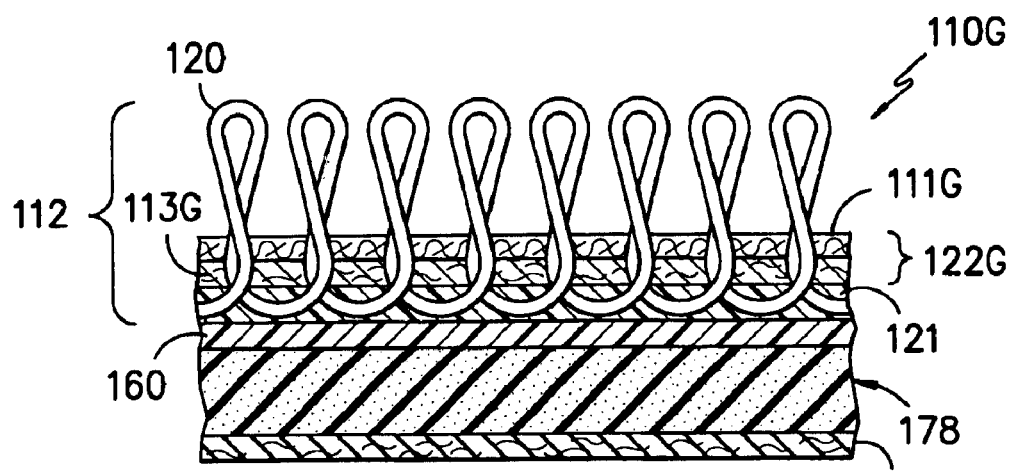
FIG. -7G-
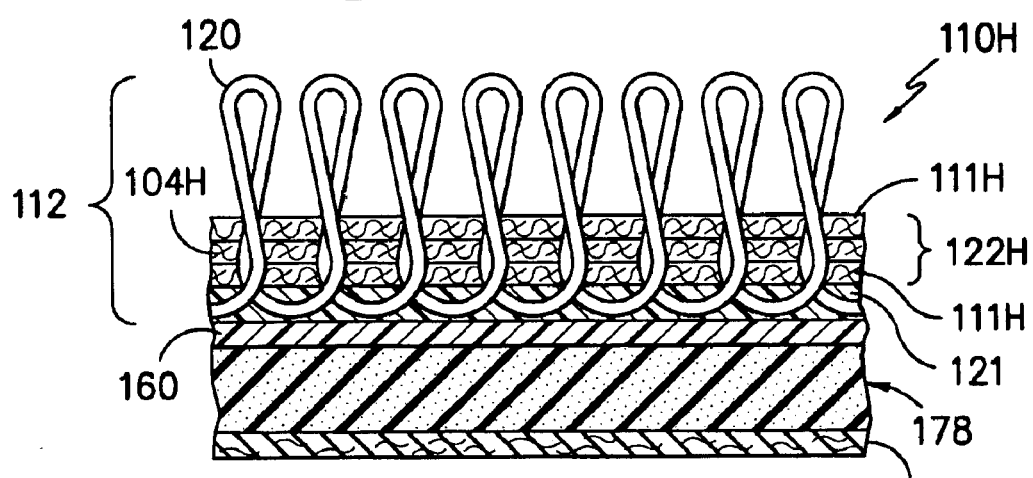
FIG. -7H-
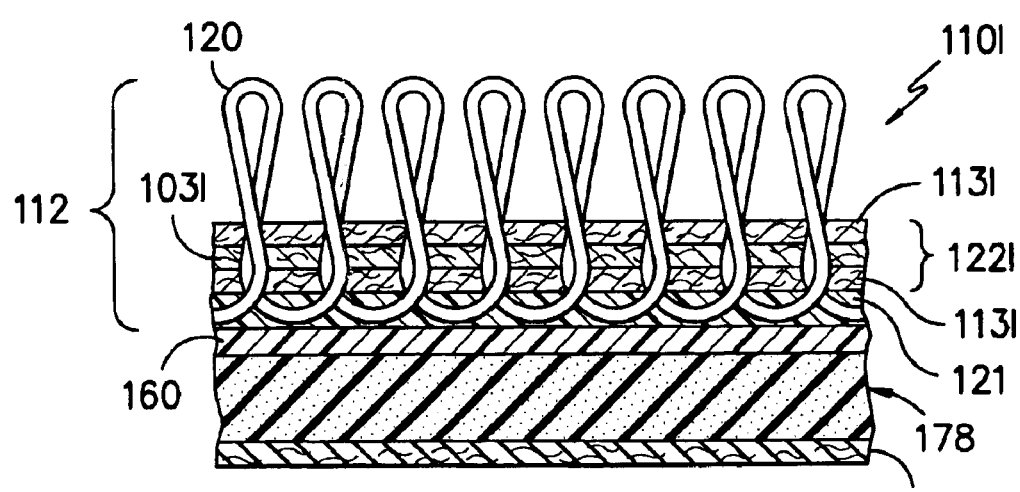
FIG. -7I-

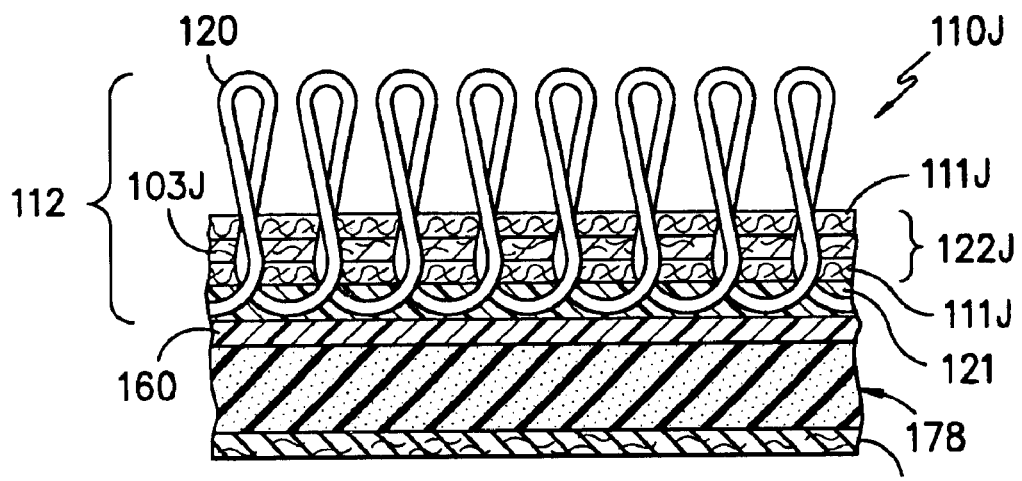
FIG. -7J-
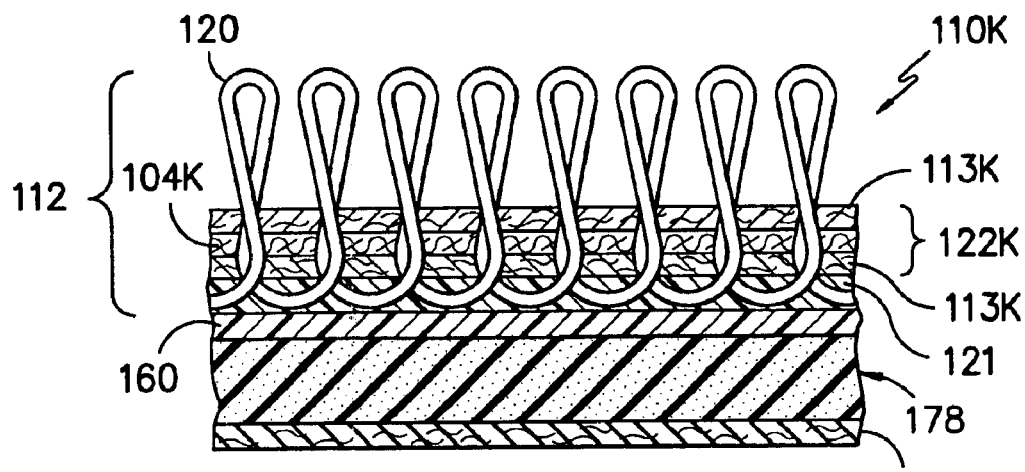
FIG. -7K-
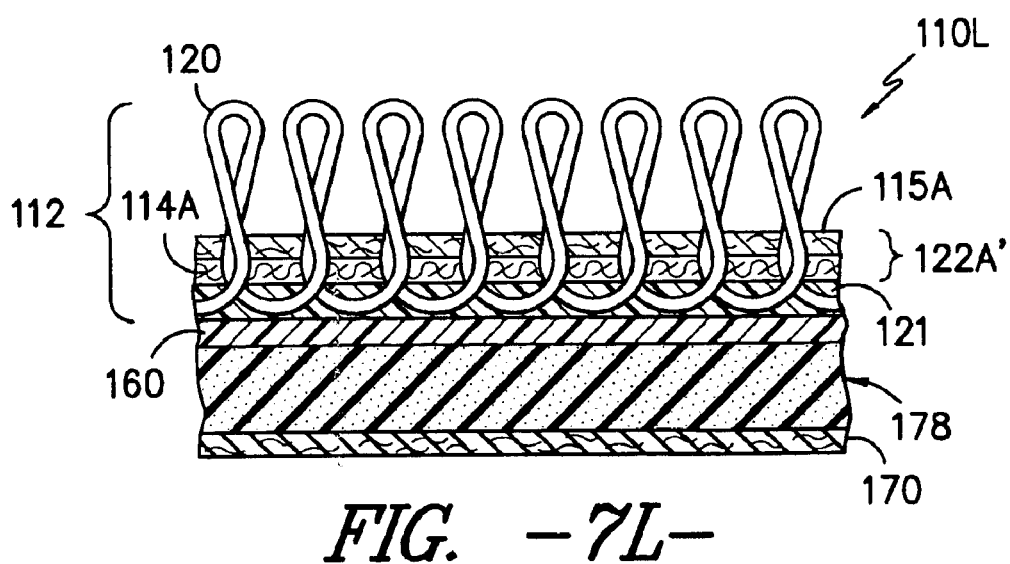
FIG. -7L-

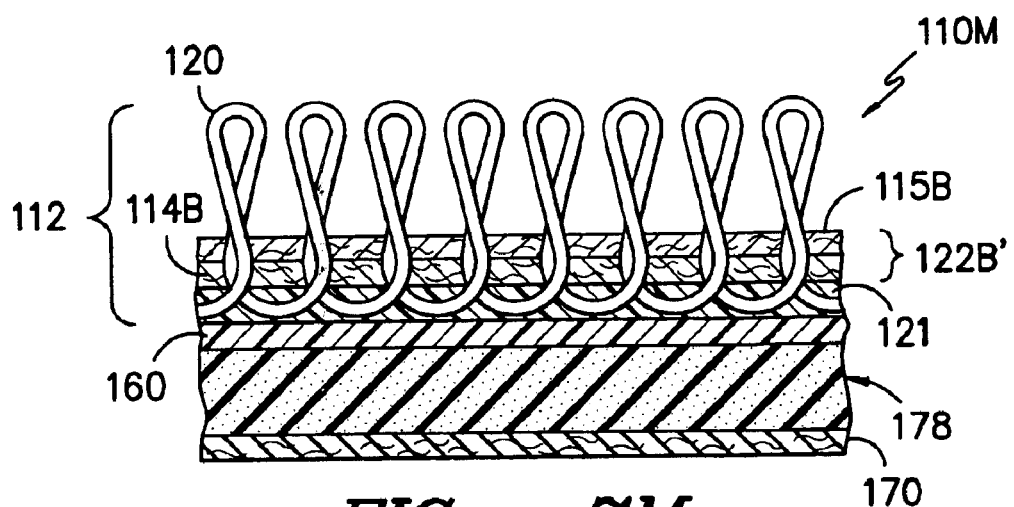
FIG. -7M-
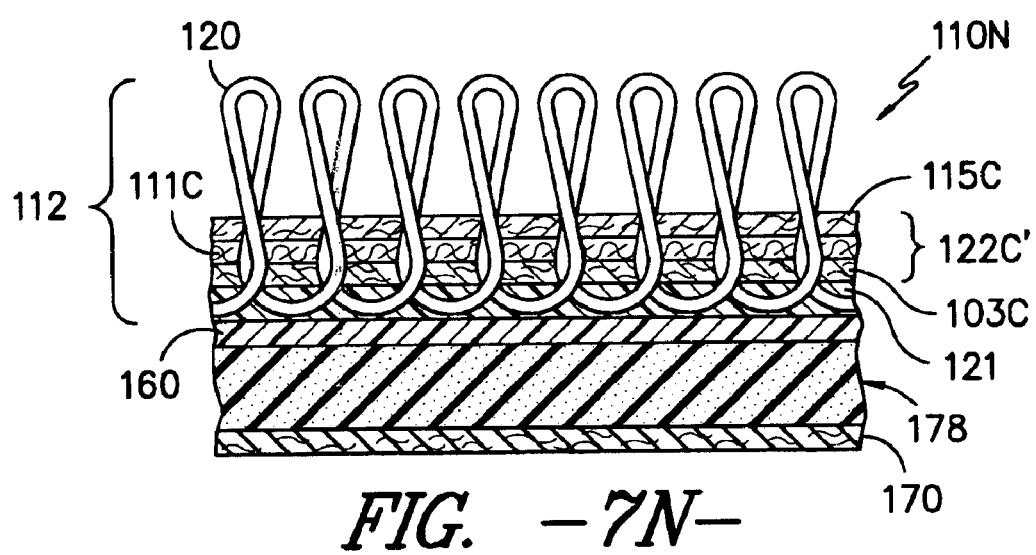
FIG. -7N-
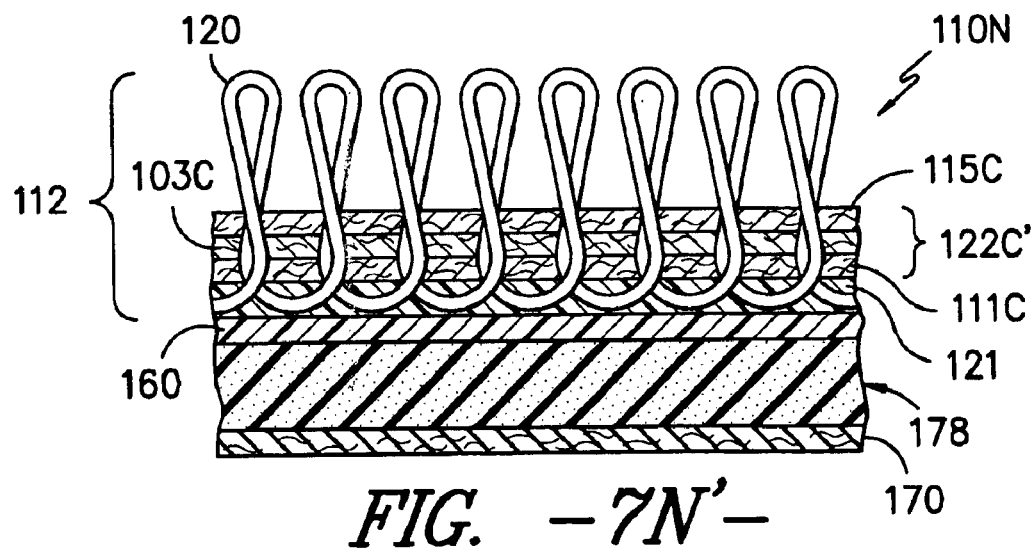
FIG. -7N'-

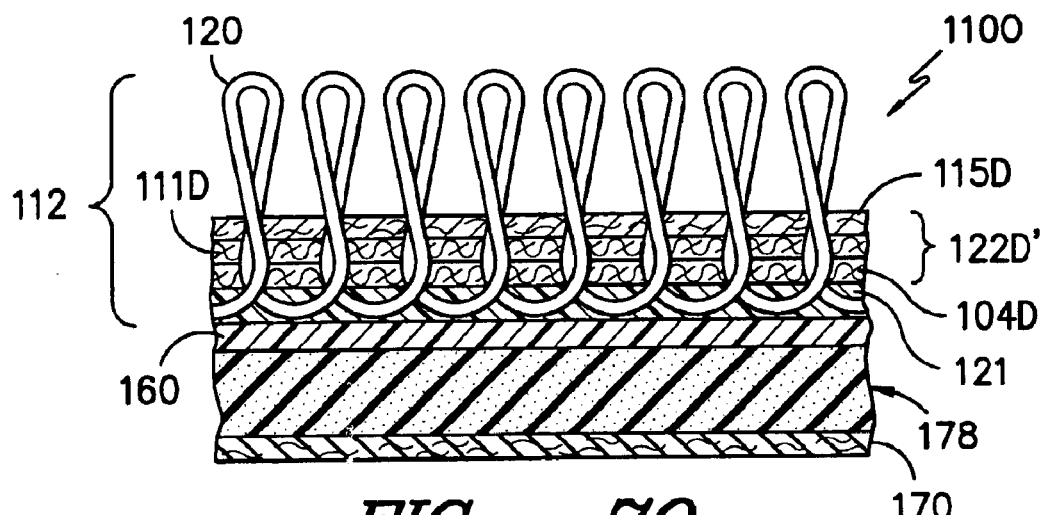
FIG. -7O-
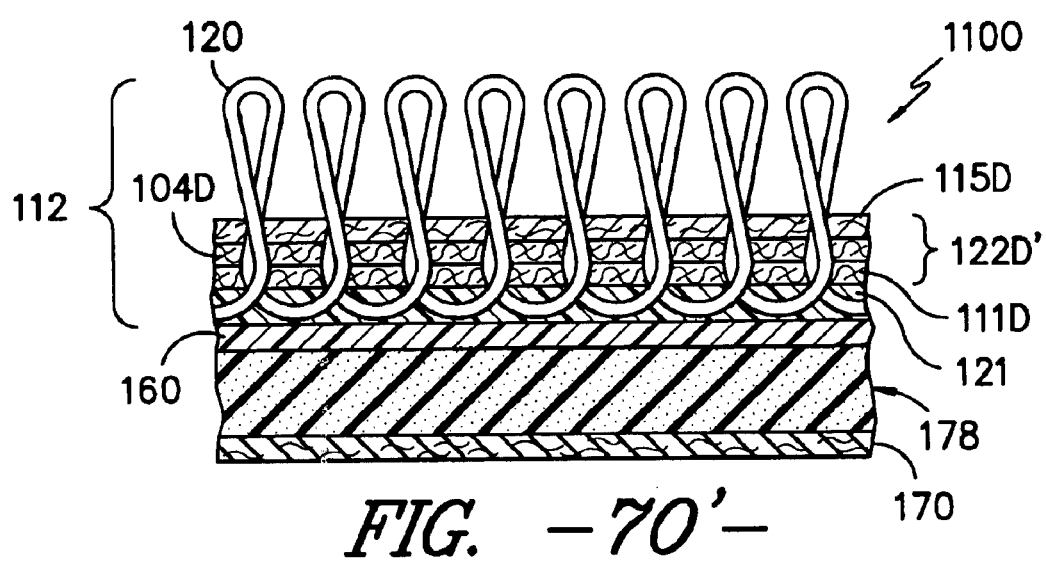
FIG. -7O'-
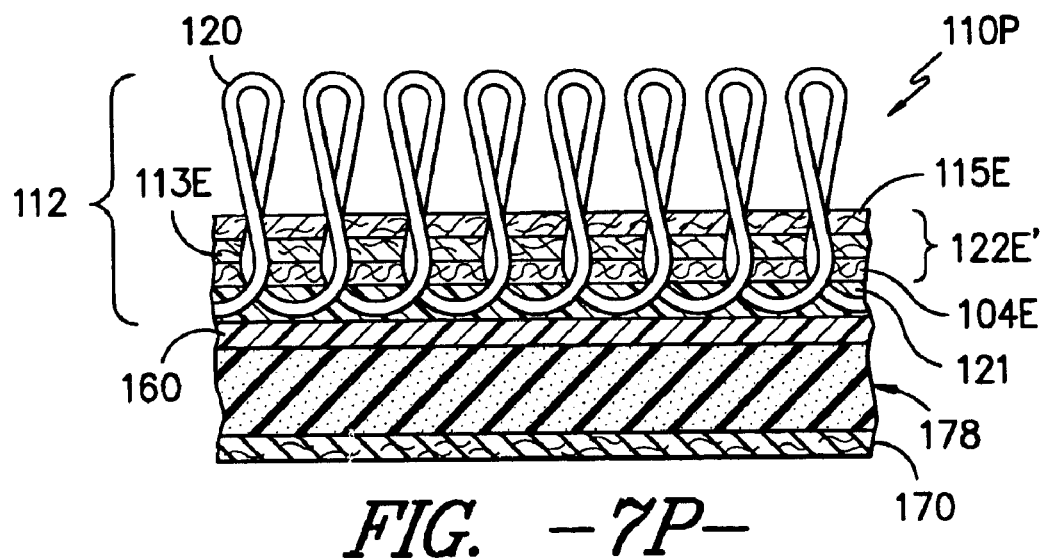
FIG. -7P-

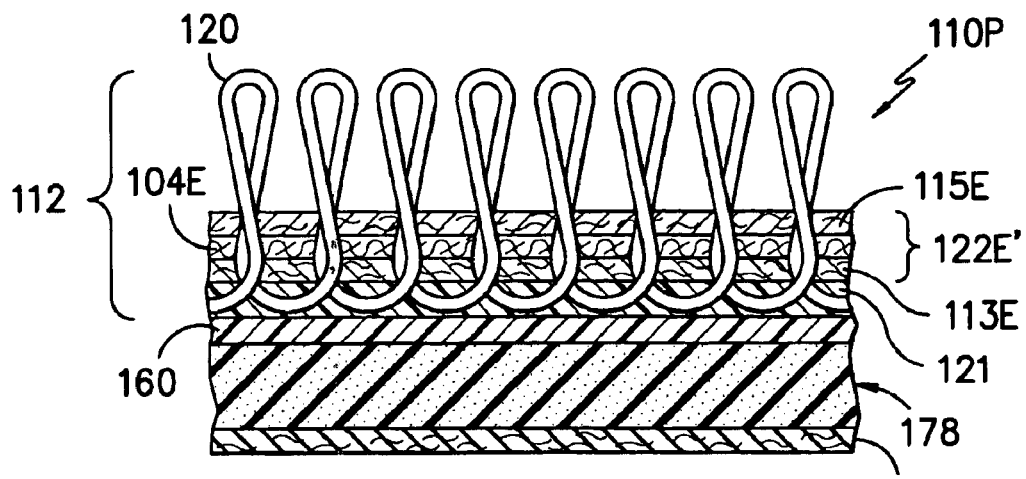
FIG. -7P'-
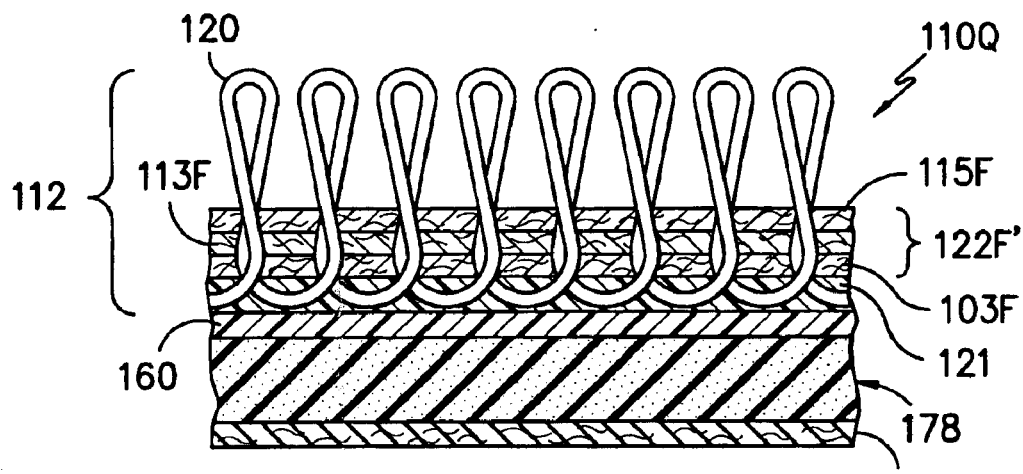
FIG. -7Q-
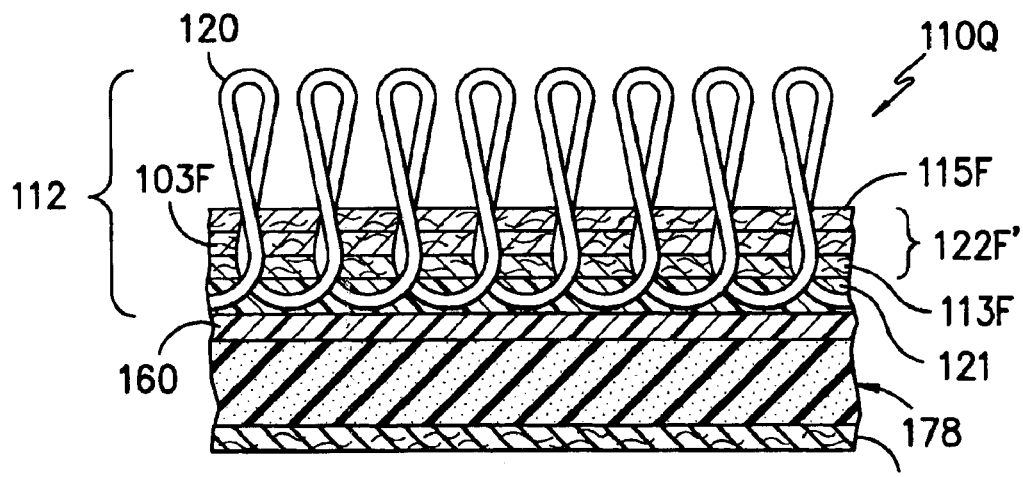
FIG. -7Q'-

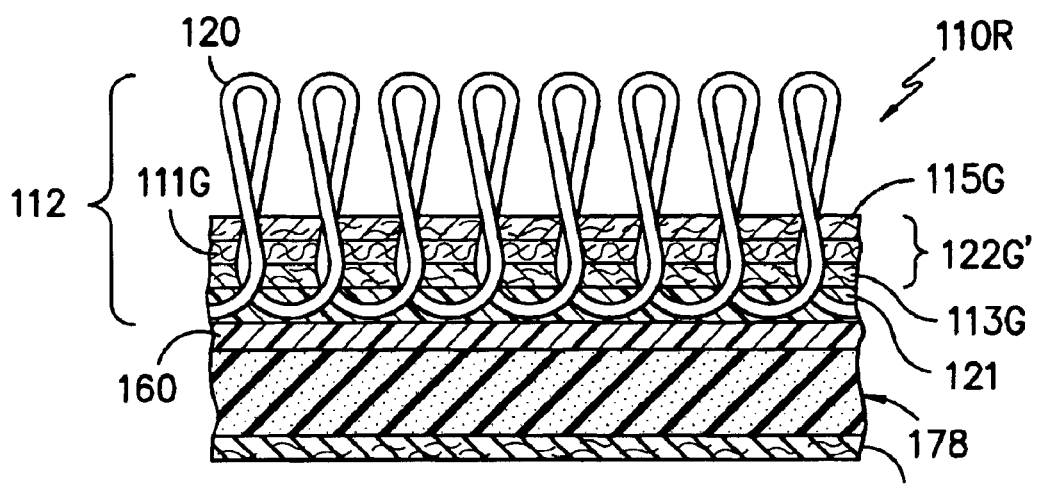
FIG. -7R-
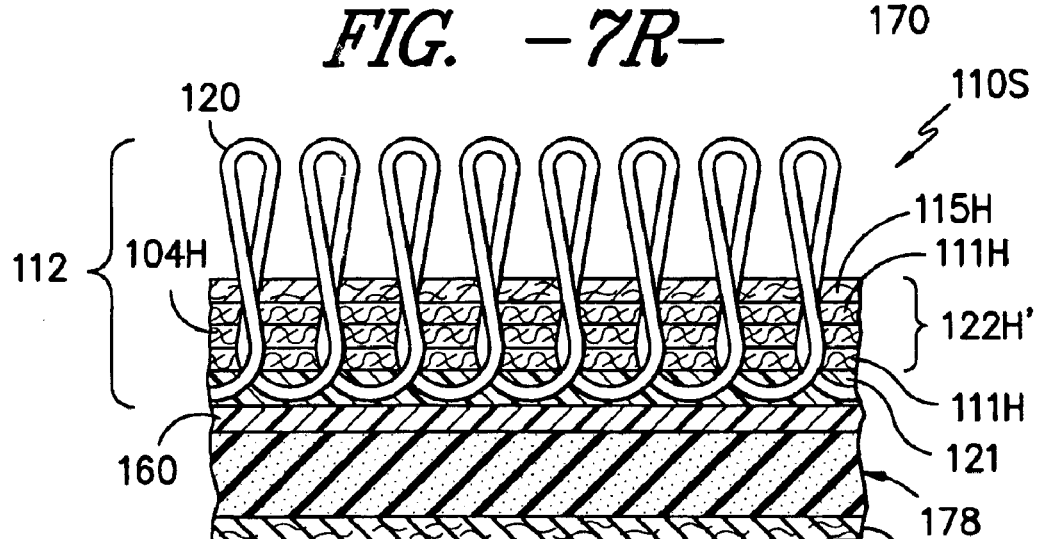
FIG. -7S-
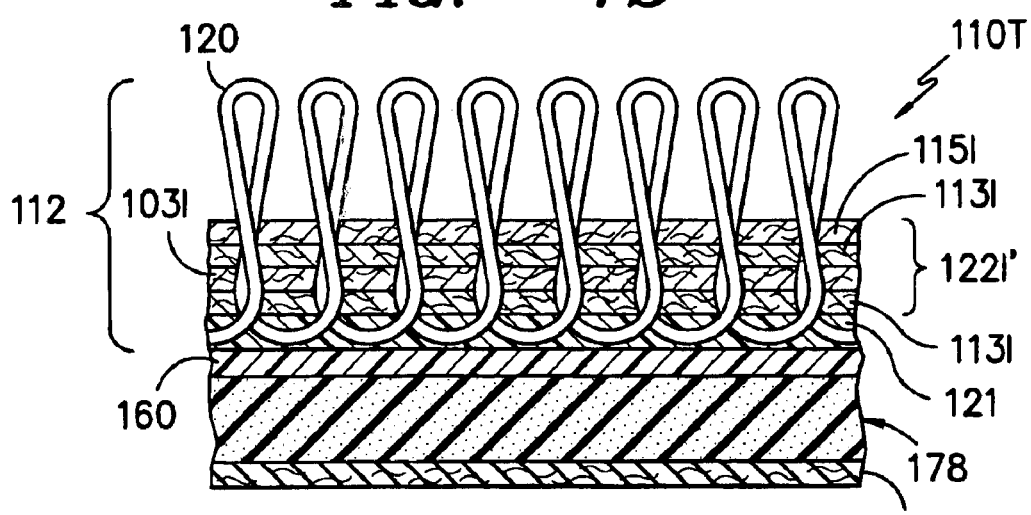
FIG. -7T-

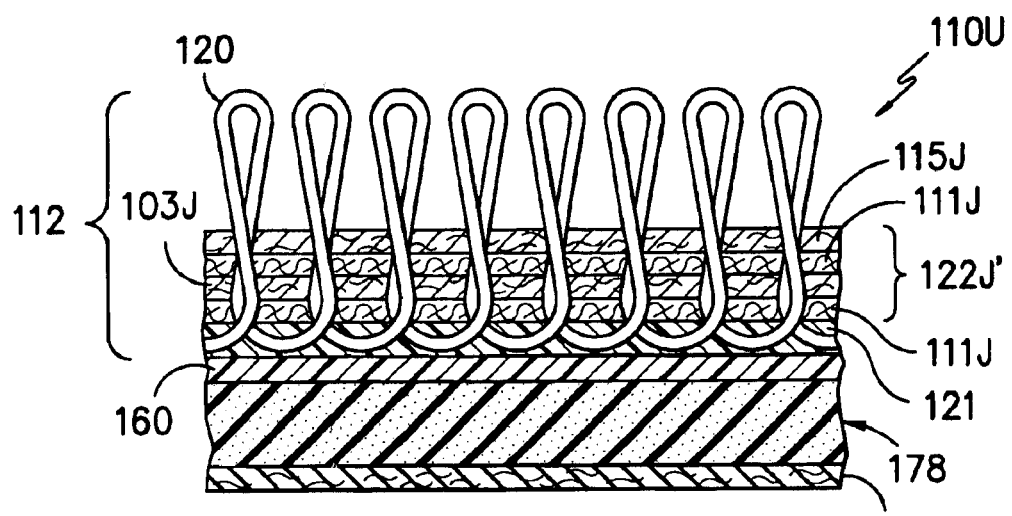
FIG. −7U−
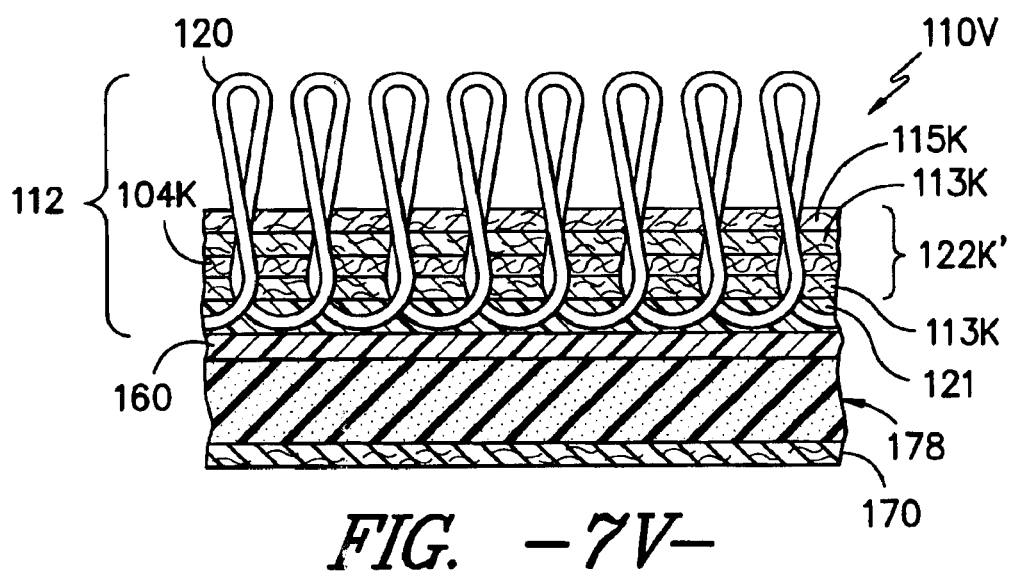
FIG. −7V−
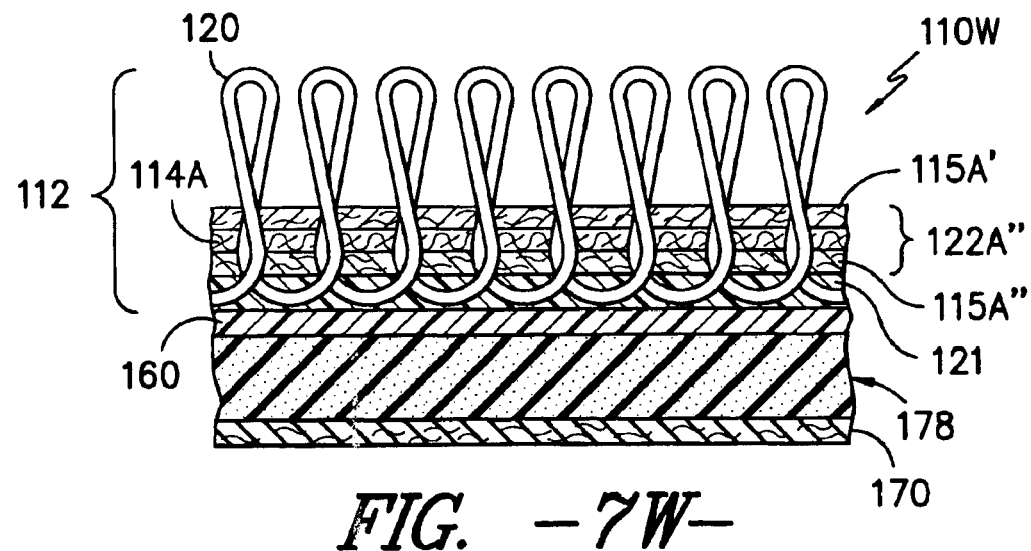
FIG. −7W−

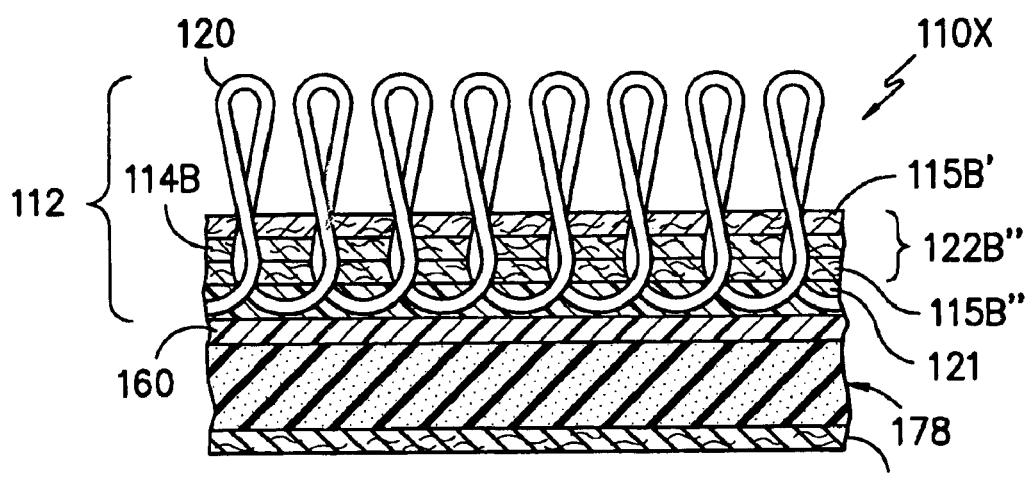
FIG. -7X-
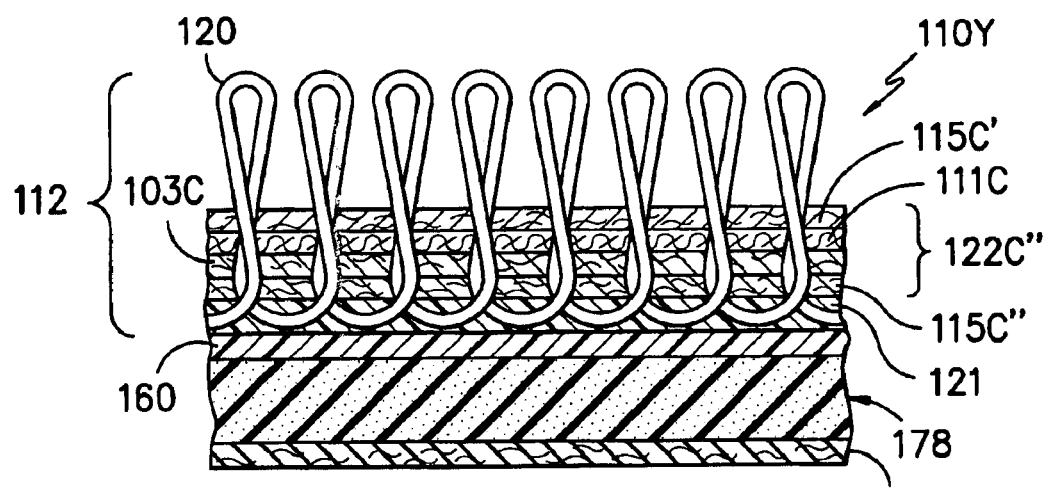
FIG. -7Y-
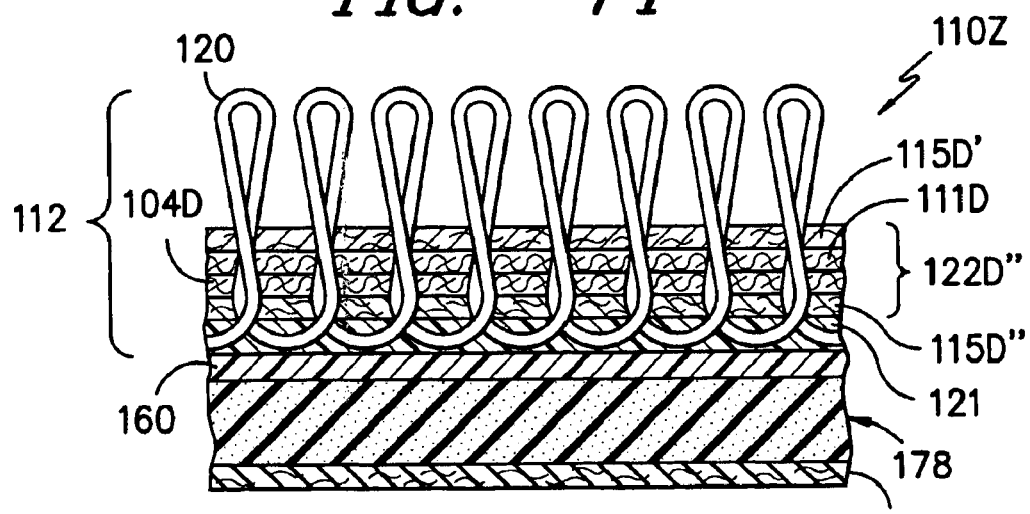
FIG. -7Z-

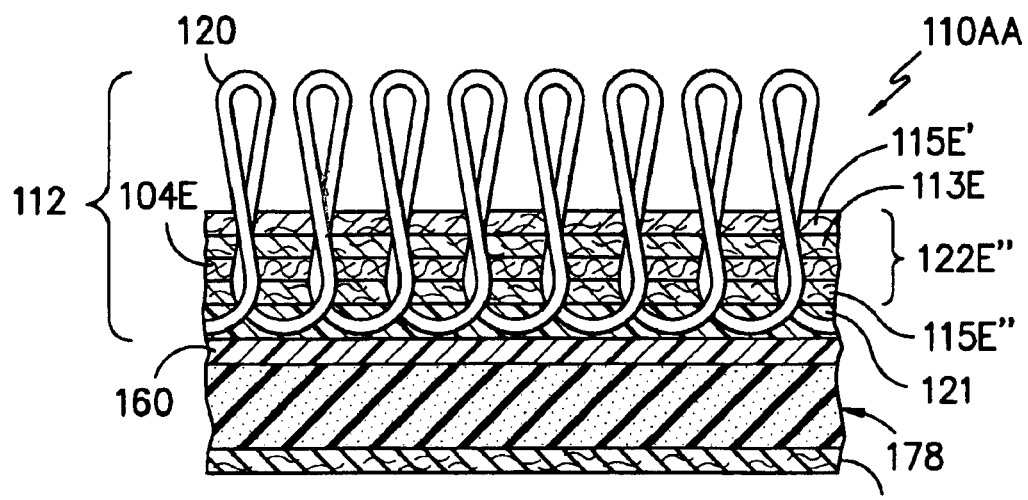
FIG. -7AA-
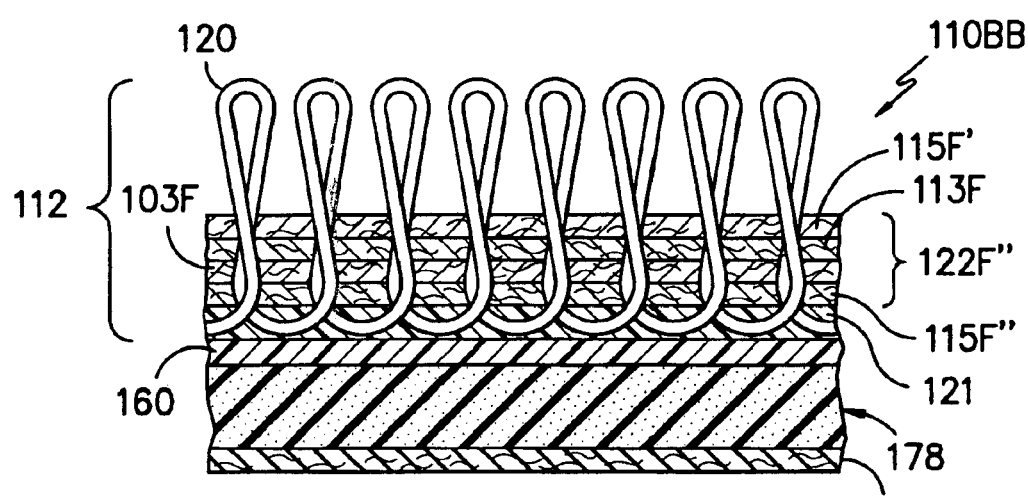
FIG. -7BB-
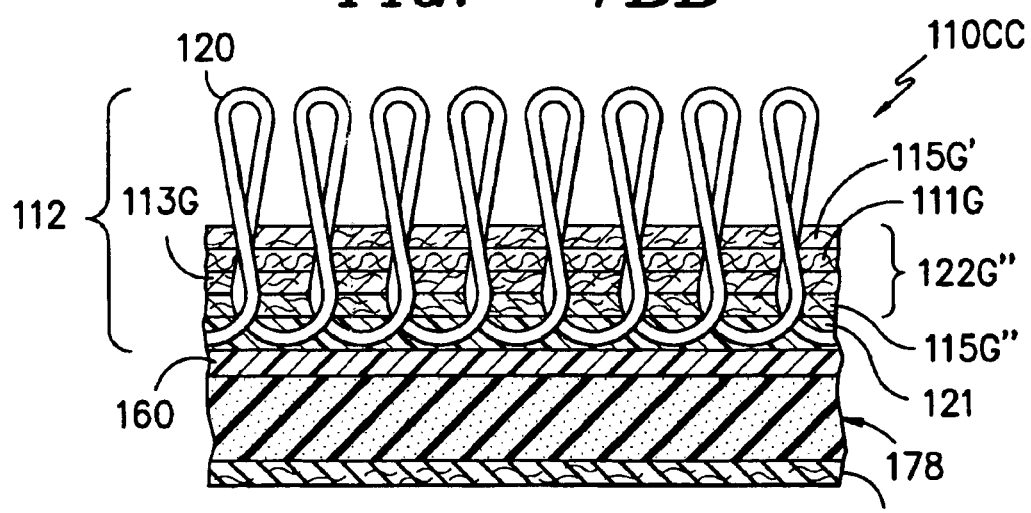
FIG. -7CC-

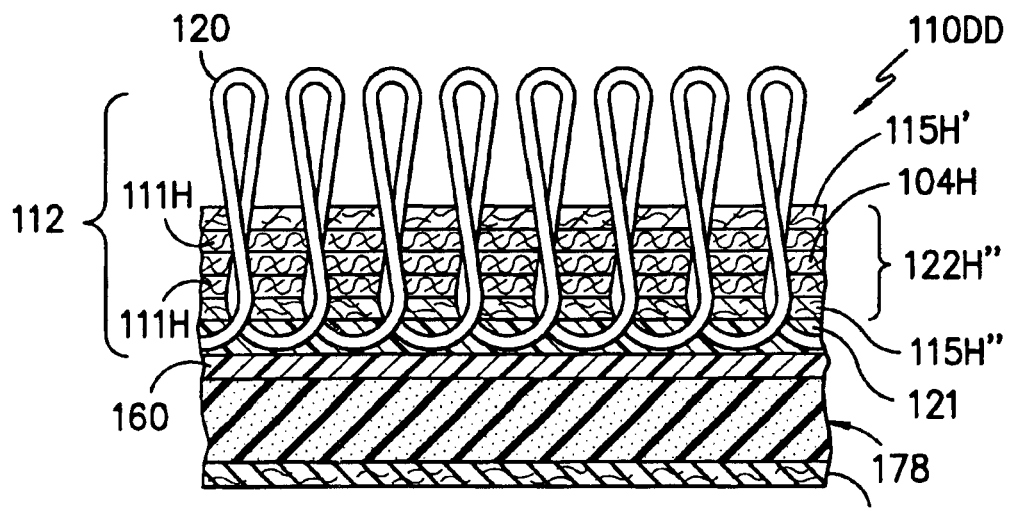
FIG. -7DD-
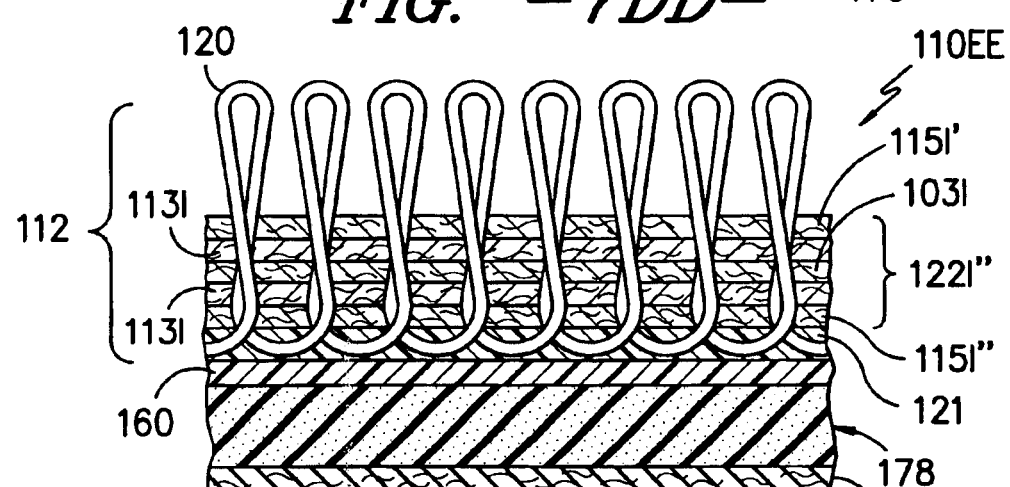
FIG. -7EE-
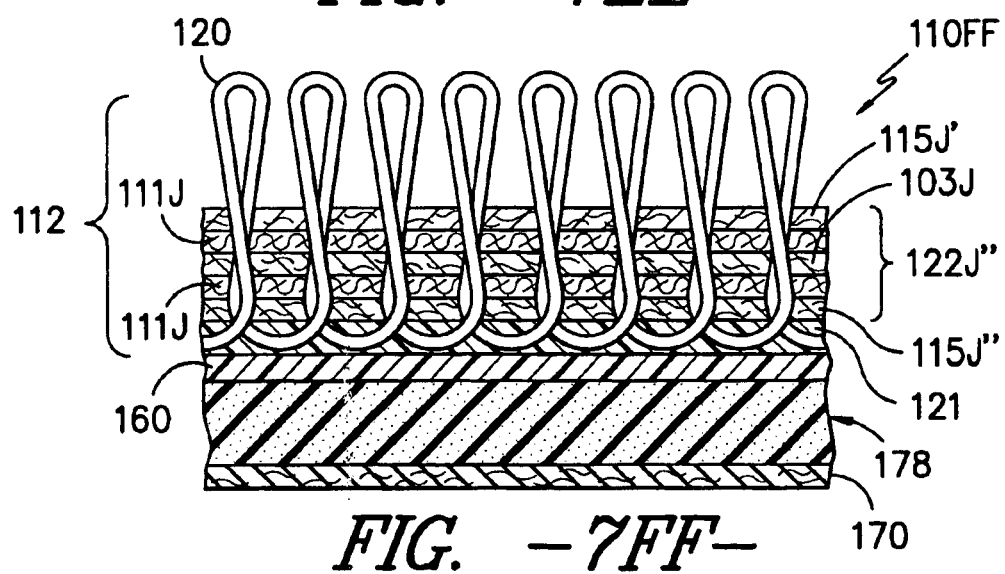
FIG. -7FF-

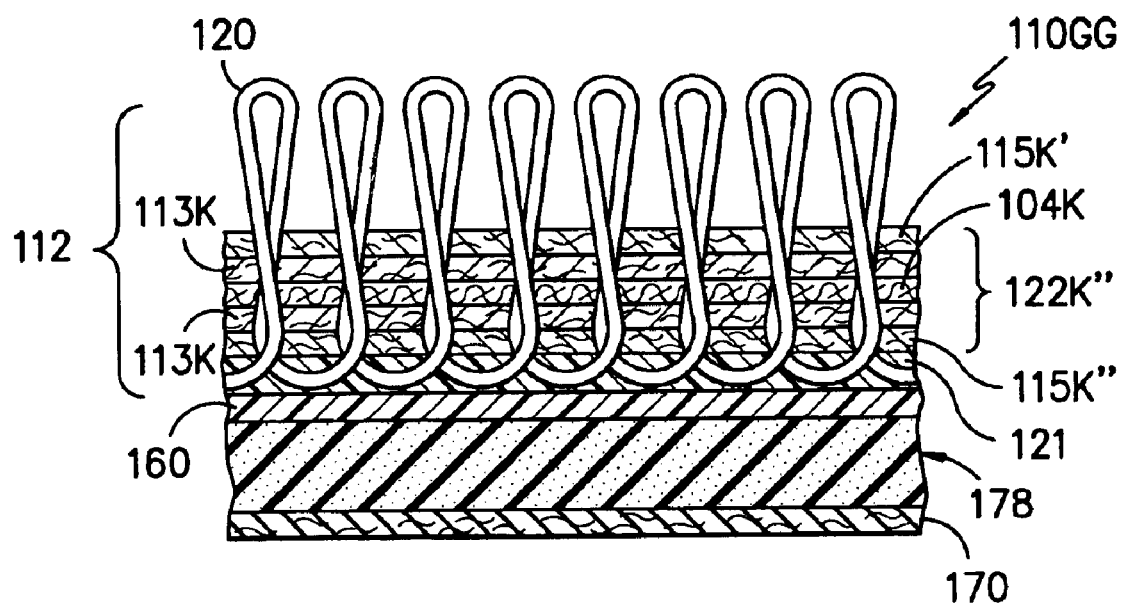
FIG. -7GG-
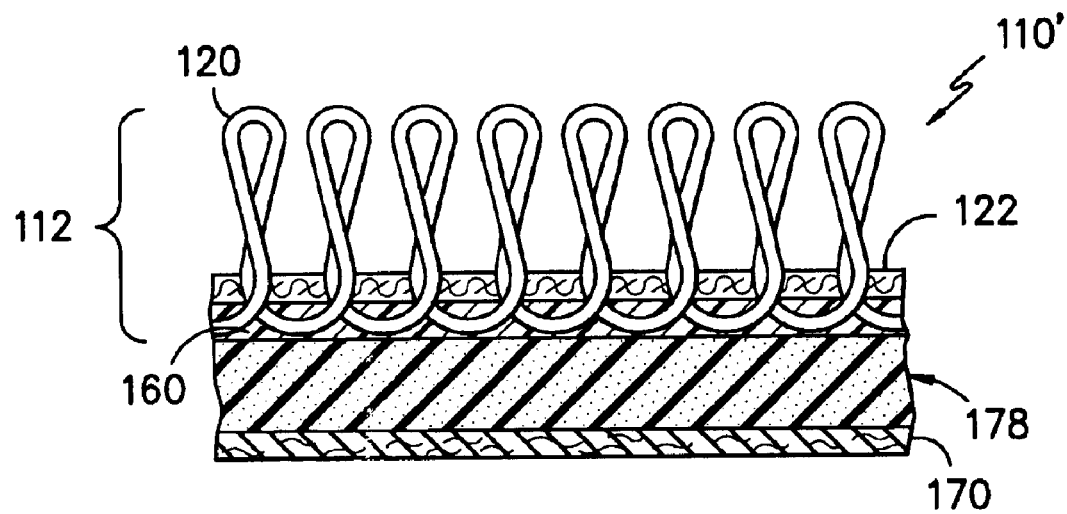
FIG. -8-

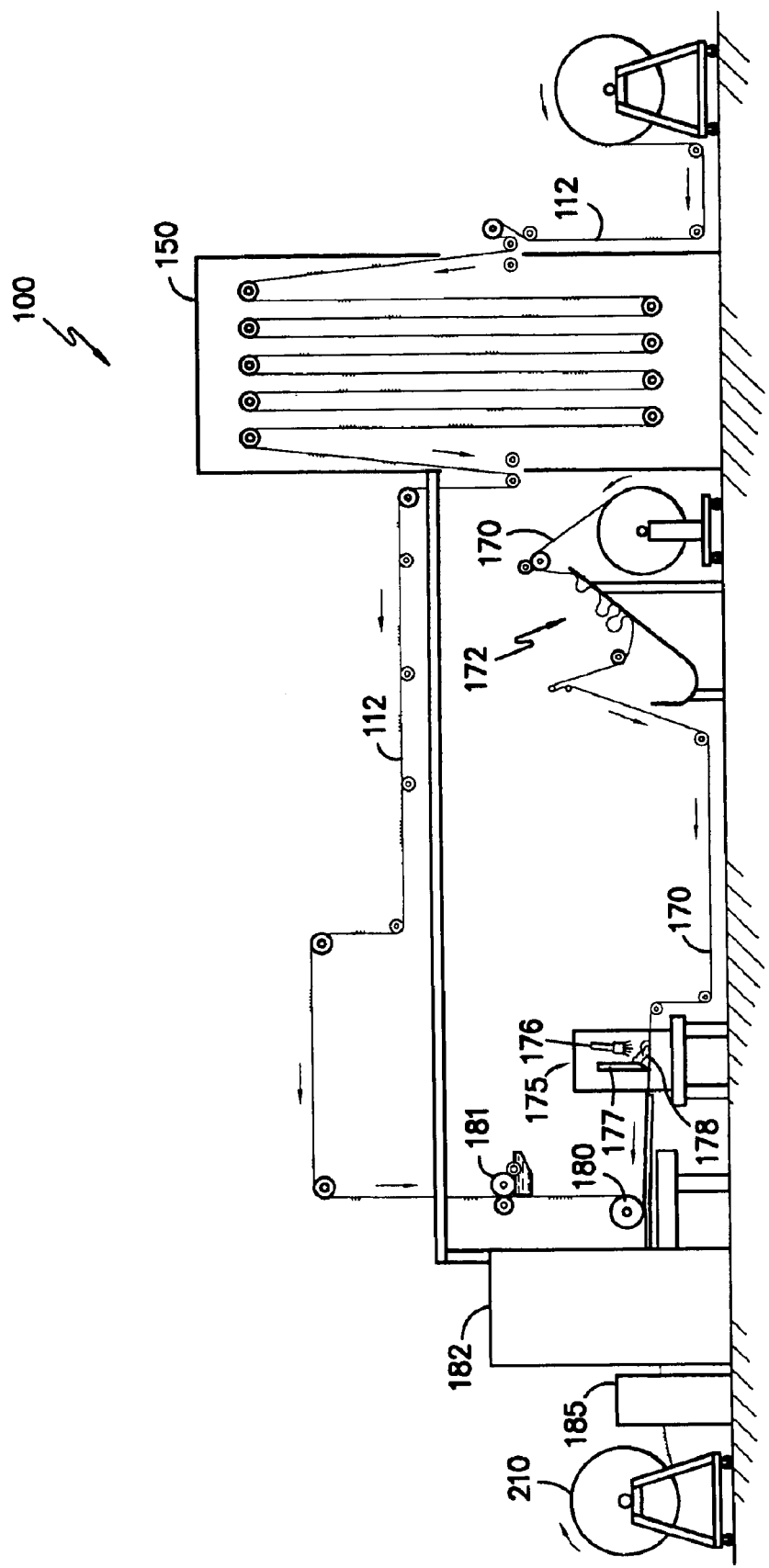
FIG. -9-

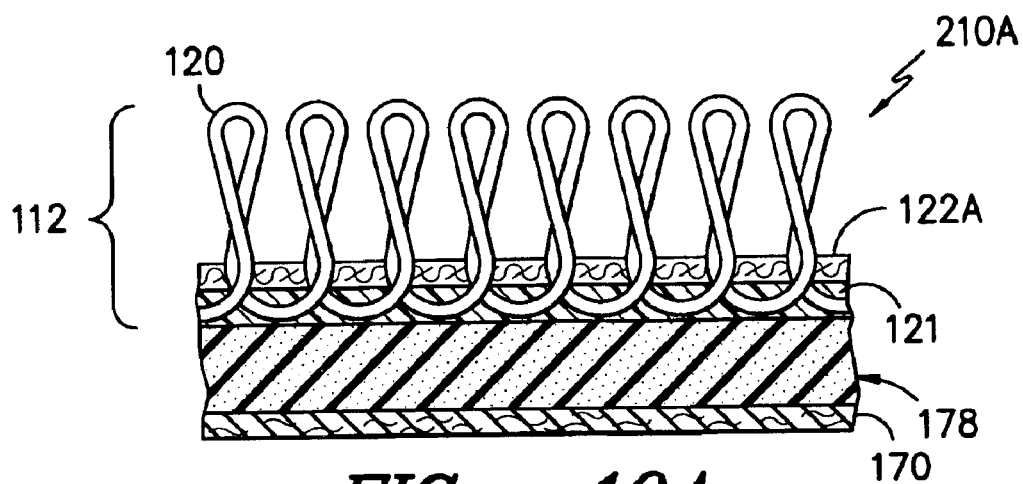
FIG. -10A-
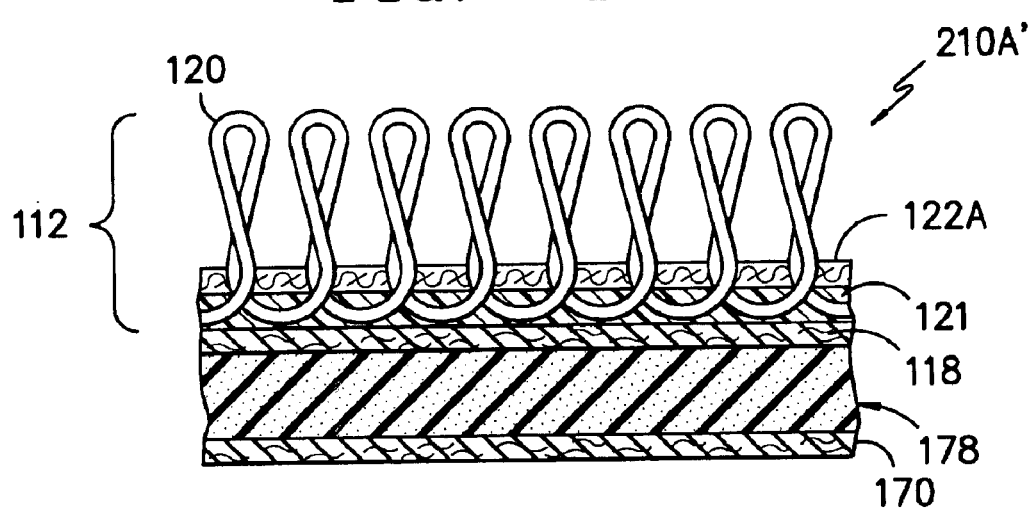
FIG. -10A'-
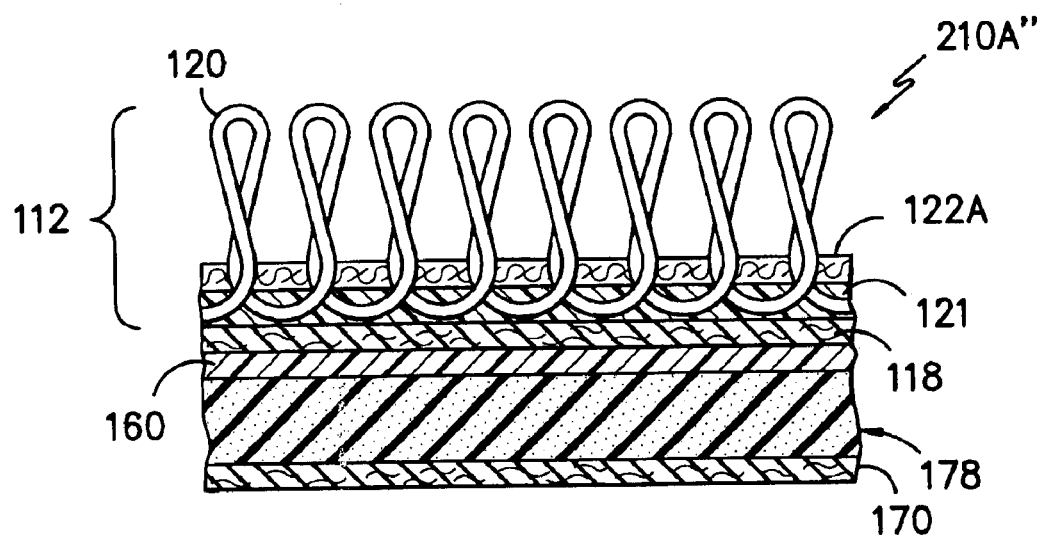
FIG. -10A"-

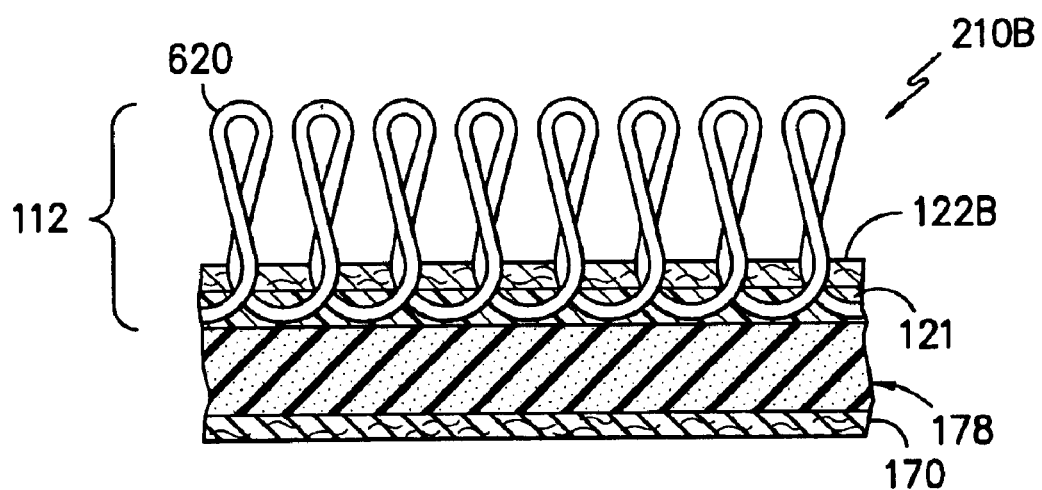
FIG. -10B-
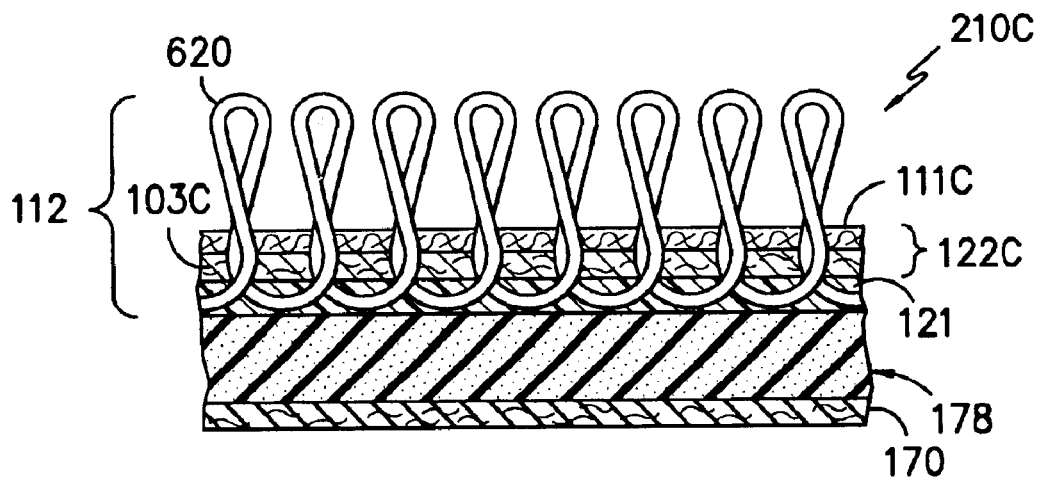
FIG. -10C-
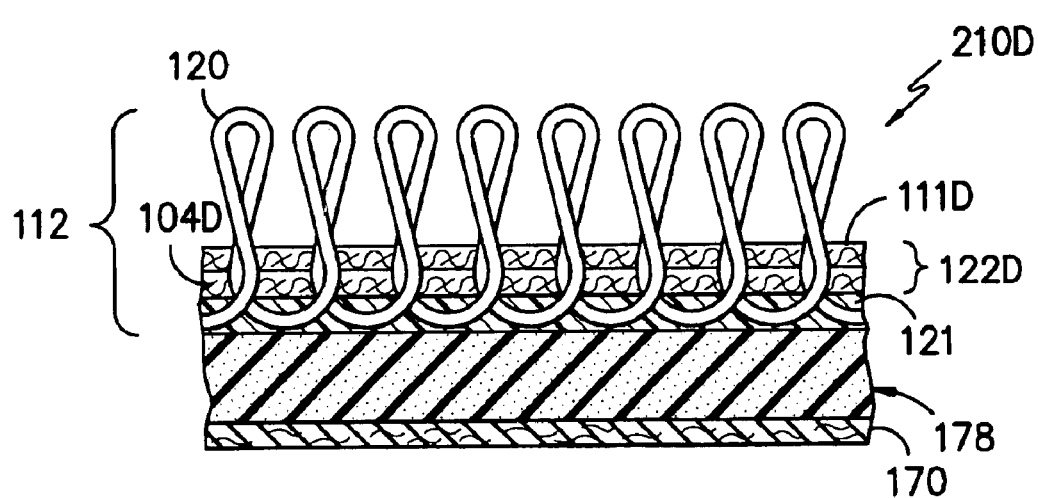
FIG. -10D-

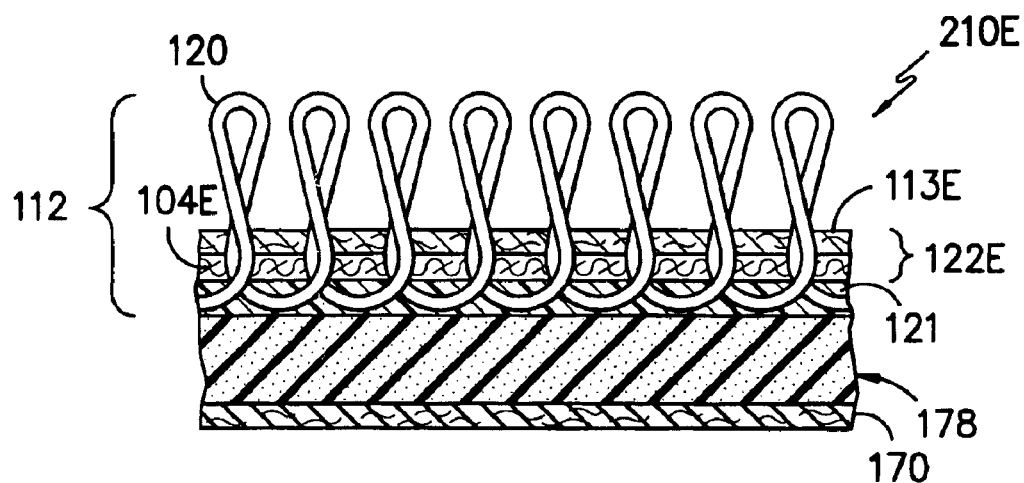
FIG. -10E-
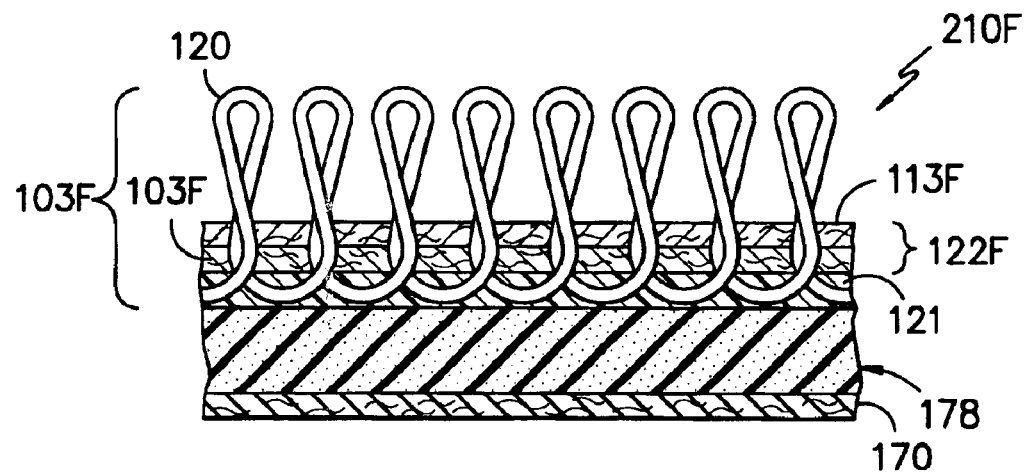
FIG. -10F-
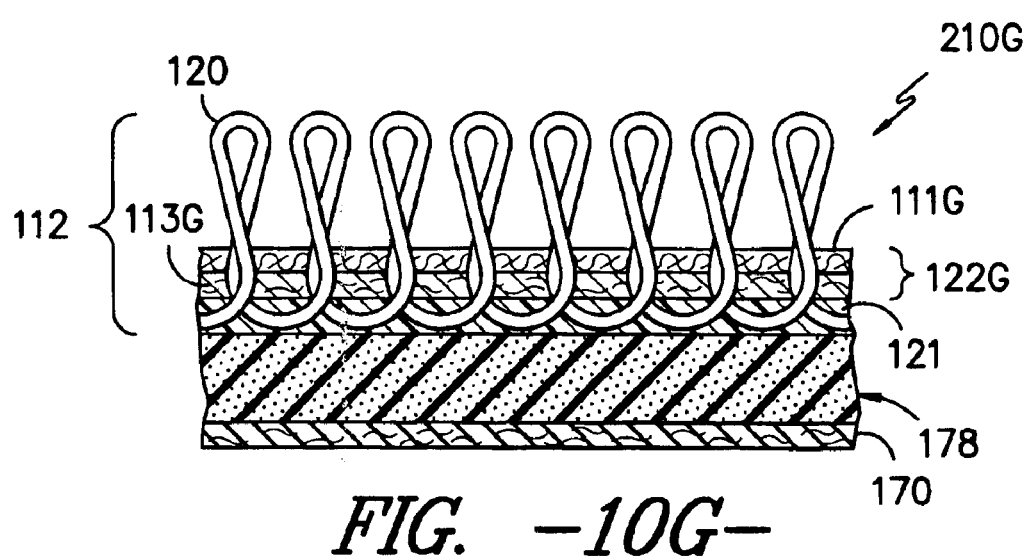
FIG. -10G-

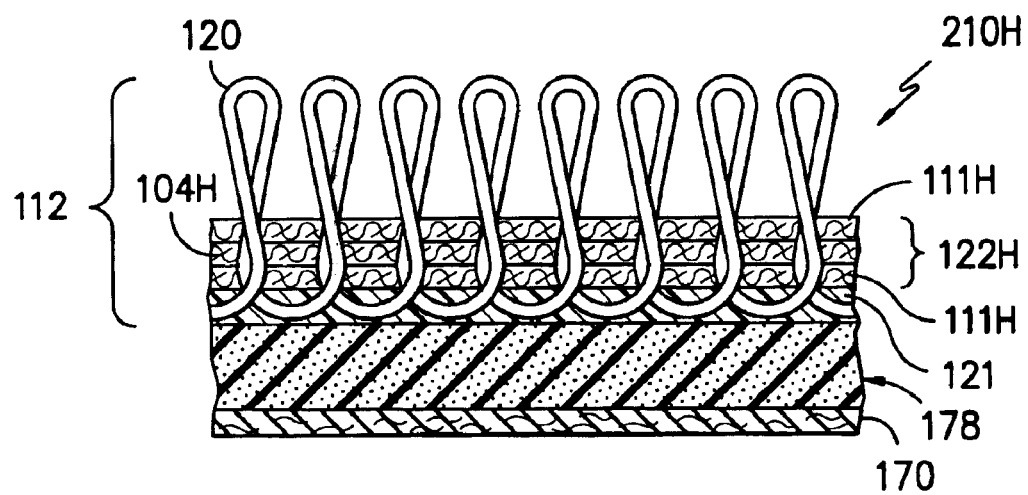
FIG. -10H-
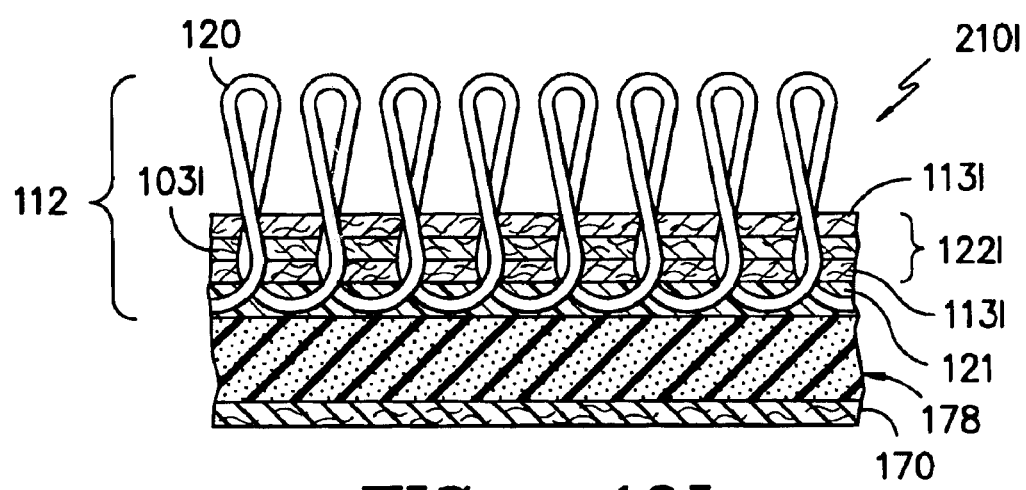
FIG. -10I-
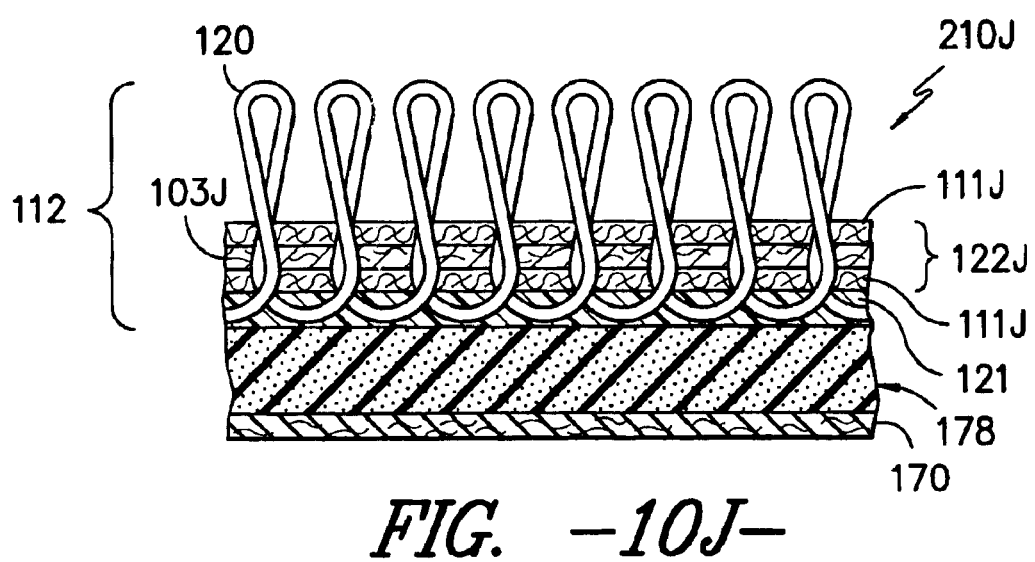
FIG. -10J-

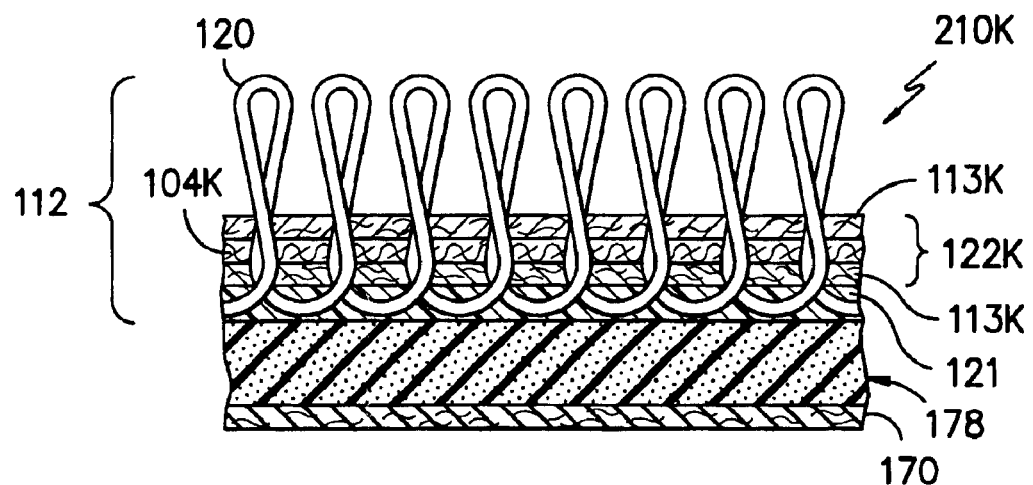
FIG. —10K—
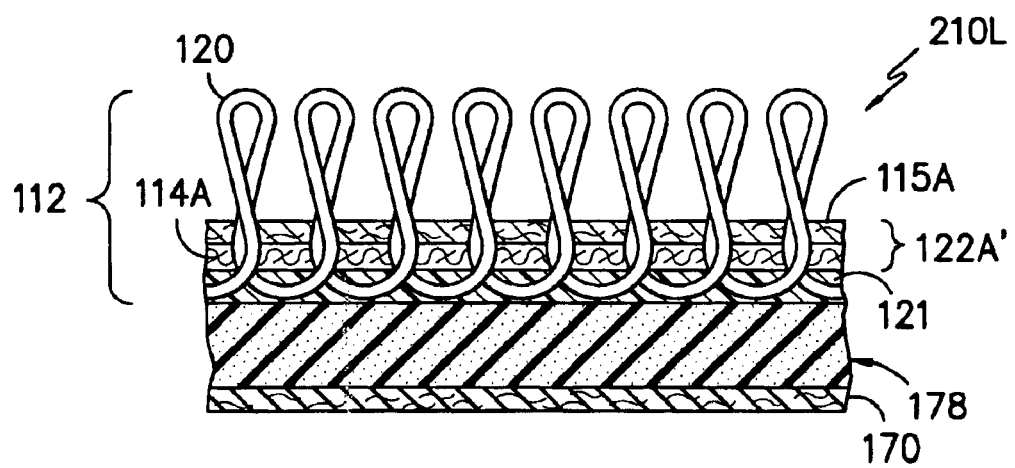
FIG. —10L—
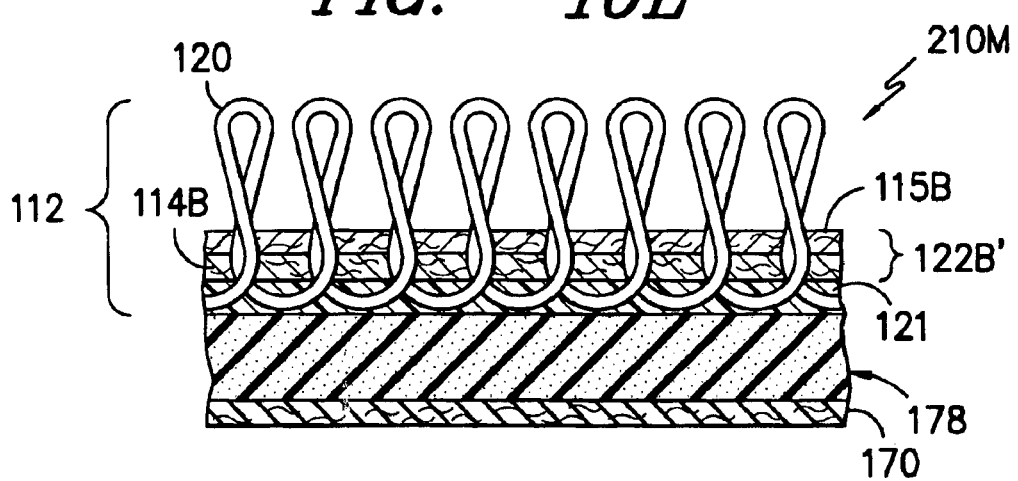
FIG. —10M—

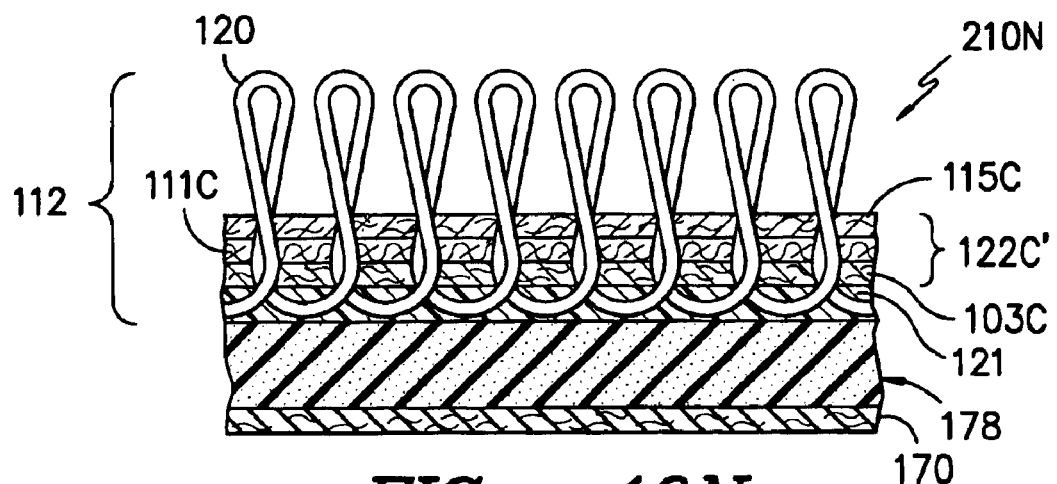
FIG. -10N-
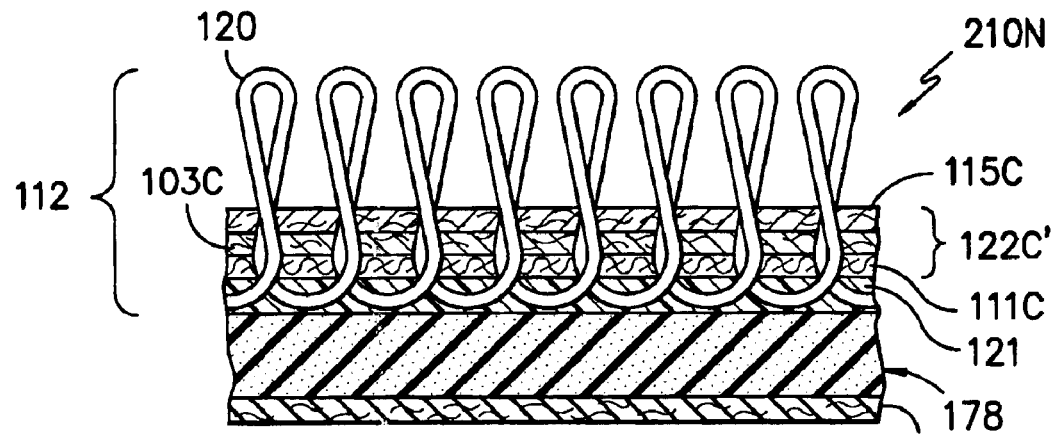
FIG. -10N'-
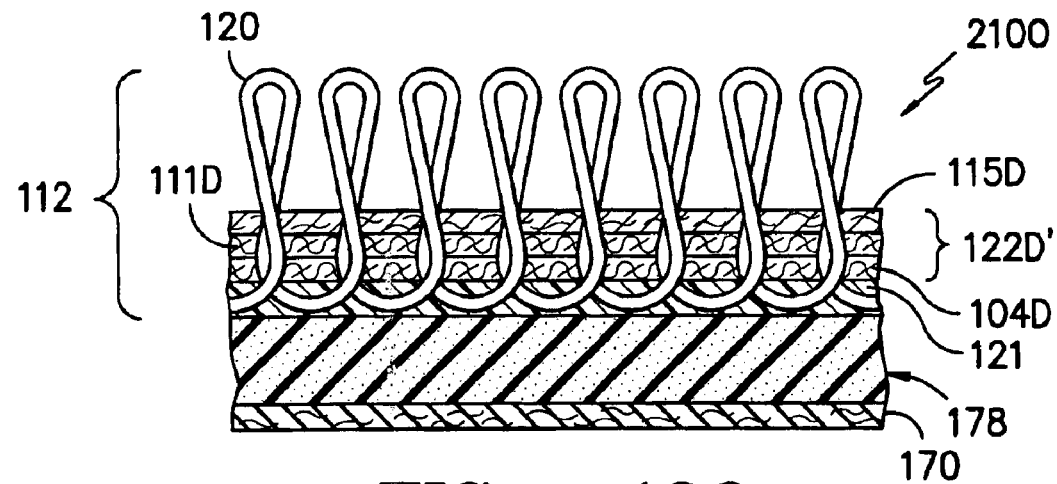
FIG. -10O-

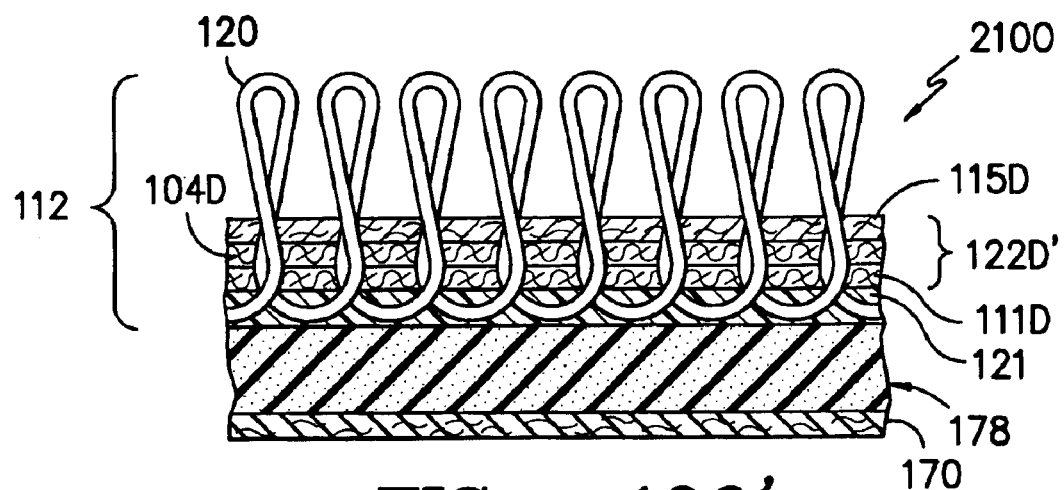
FIG. -100'-
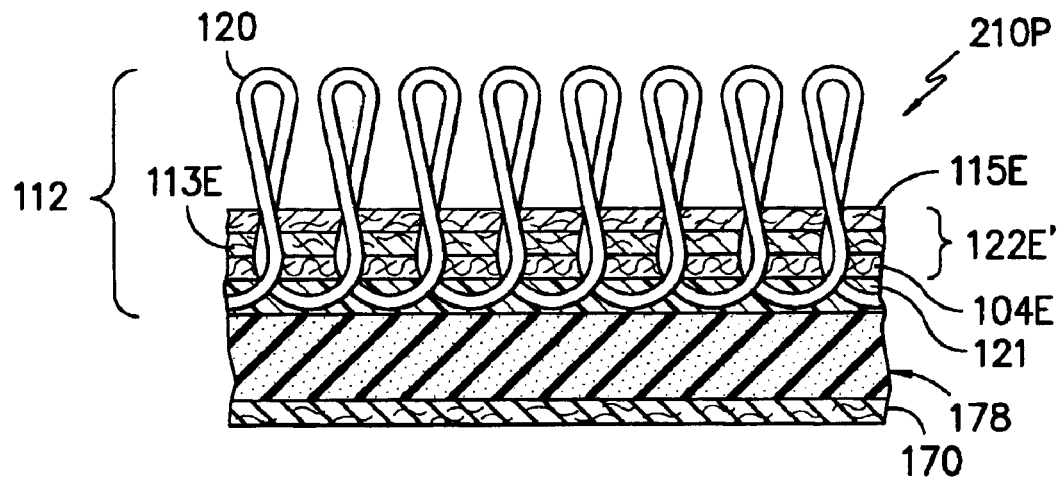
FIG. -10P-
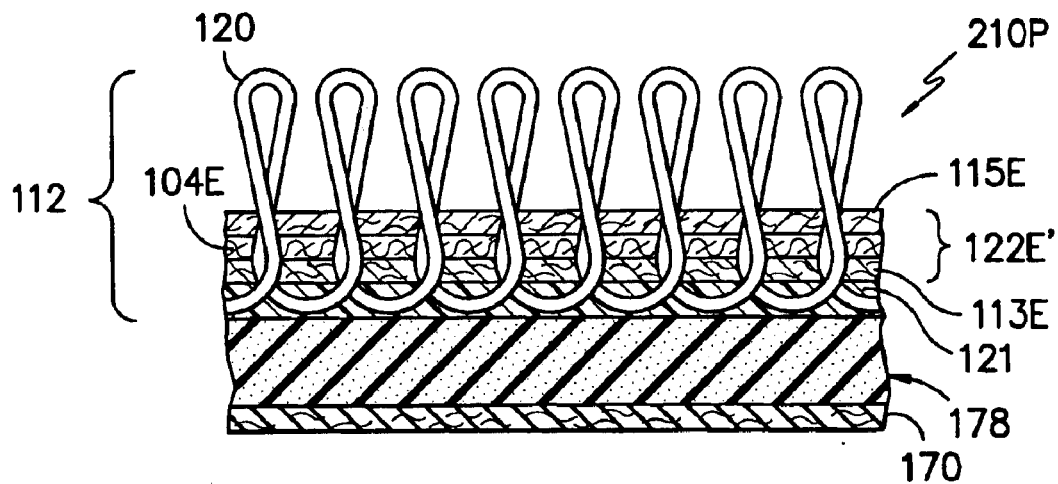
FIG. -10P'-

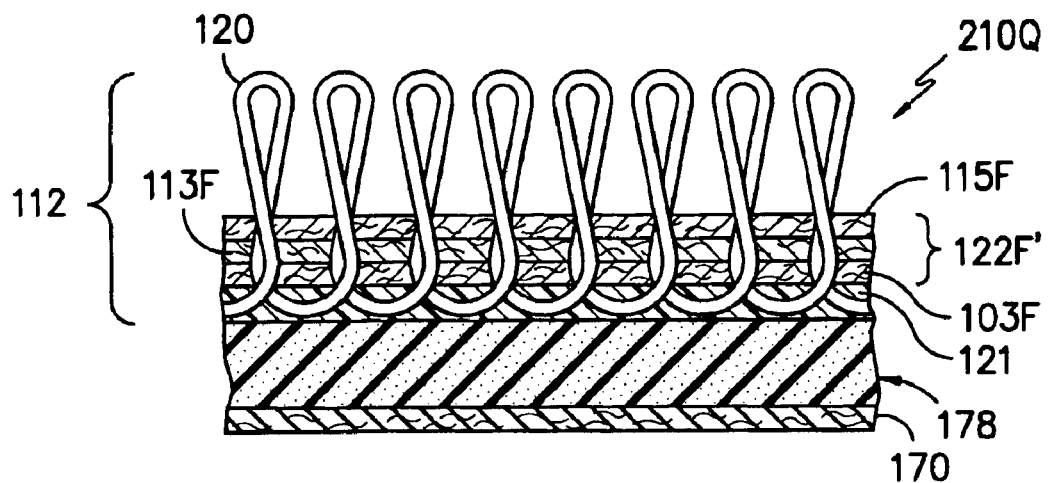
FIG. -10Q-
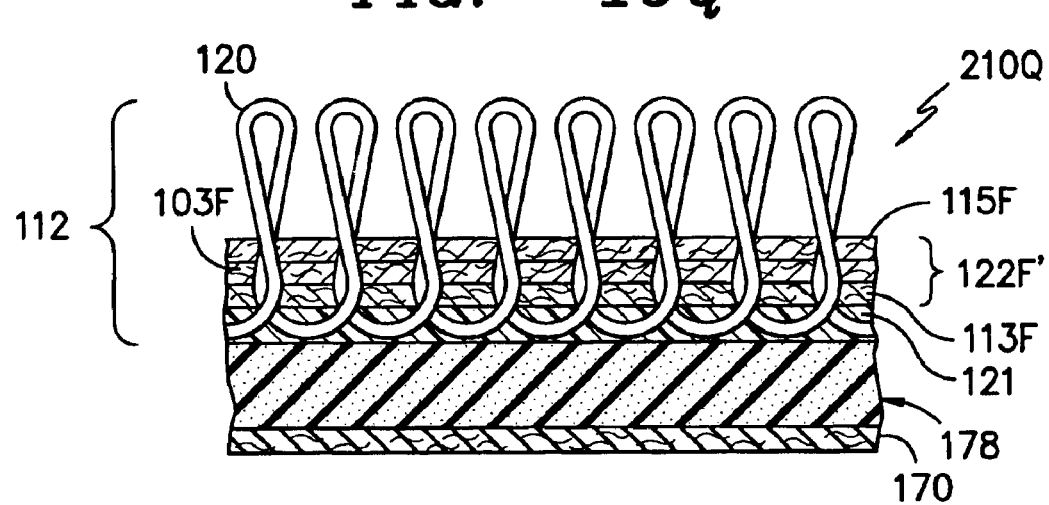
FIG. -10Q'-
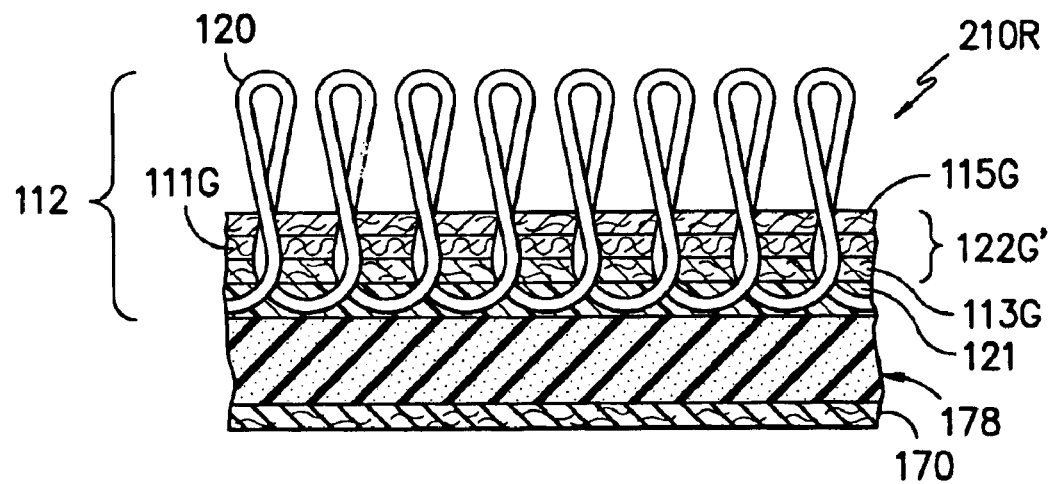
FIG. -10R-

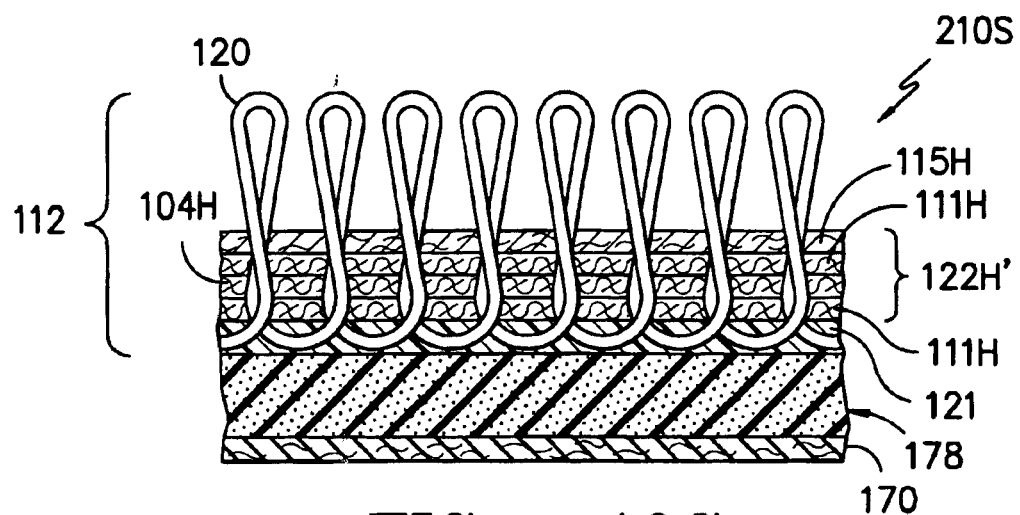
FIG. -10S-
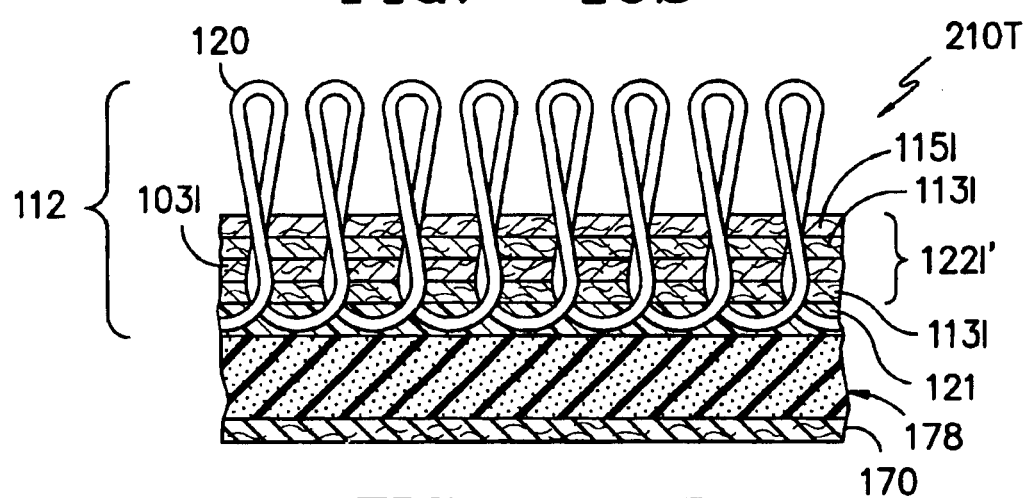
FIG. -10T-
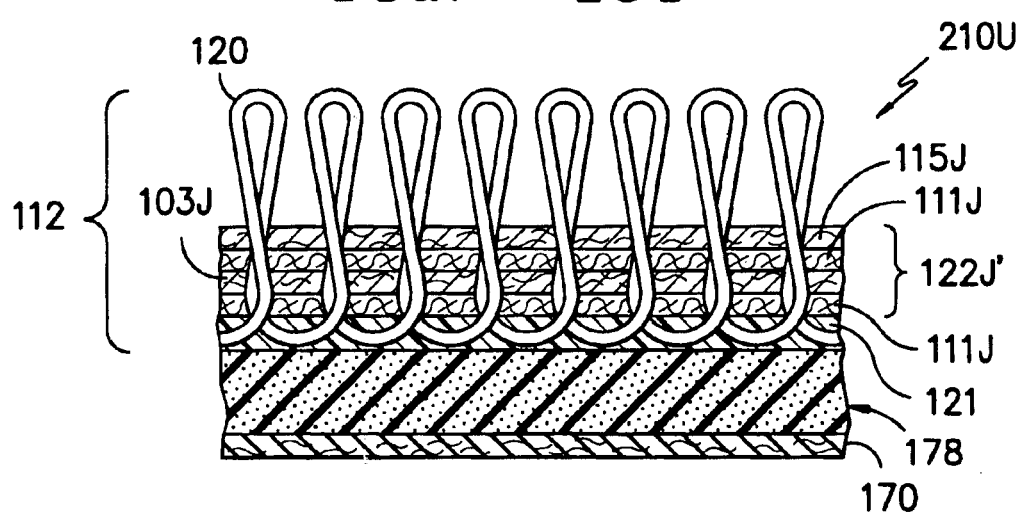
FIG. -10U-

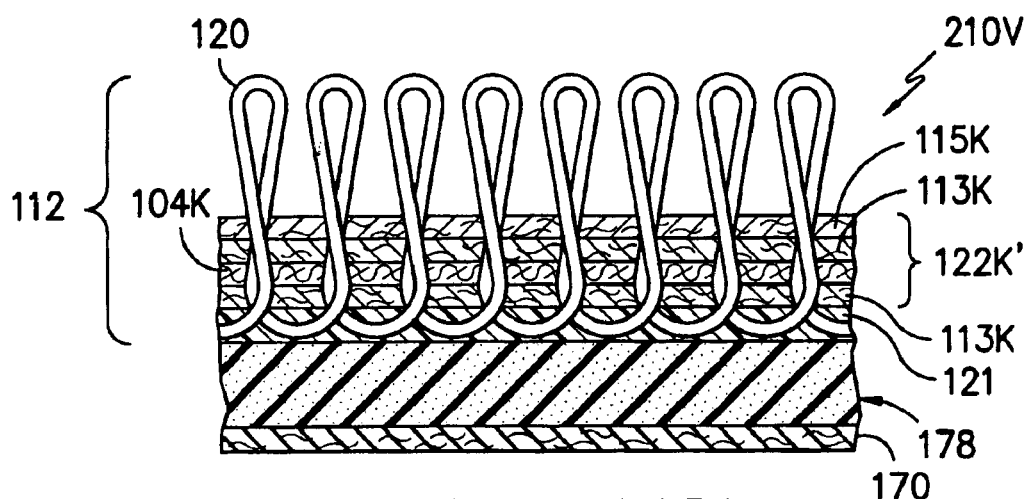
FIG. -10V-
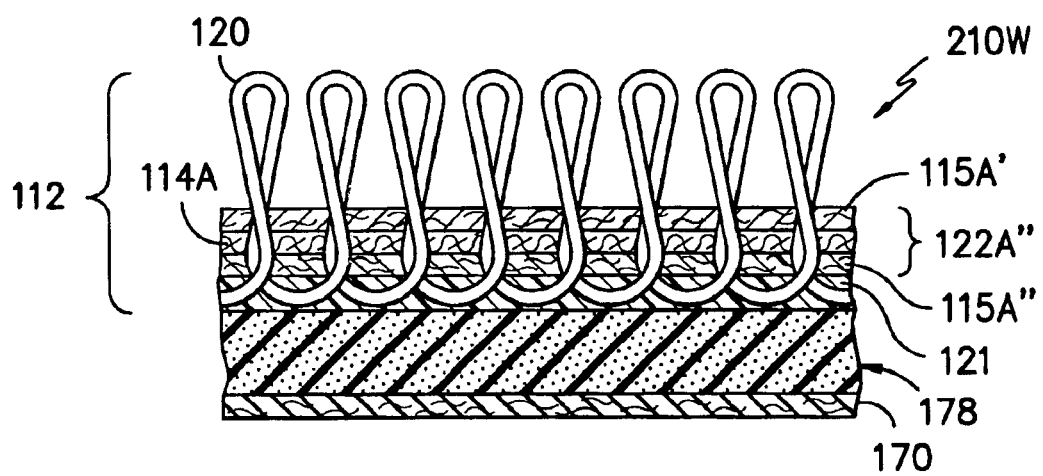
FIG. -10W-
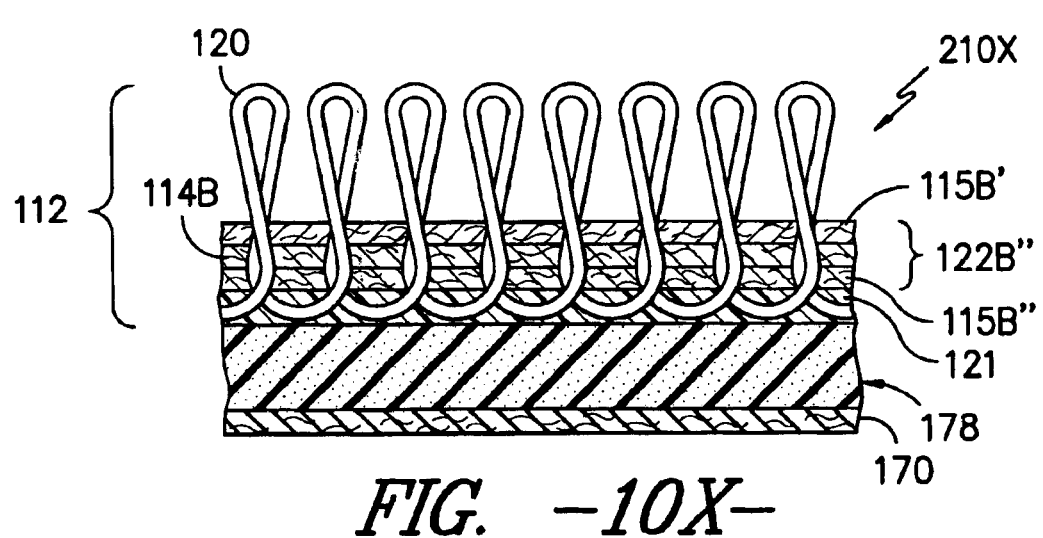
FIG. -10X-

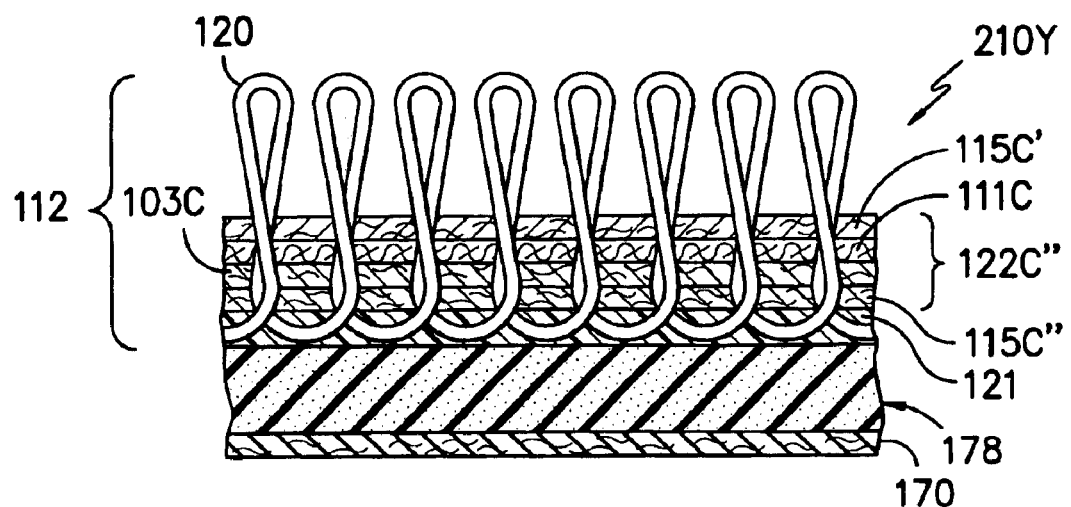
FIG. -10Y-
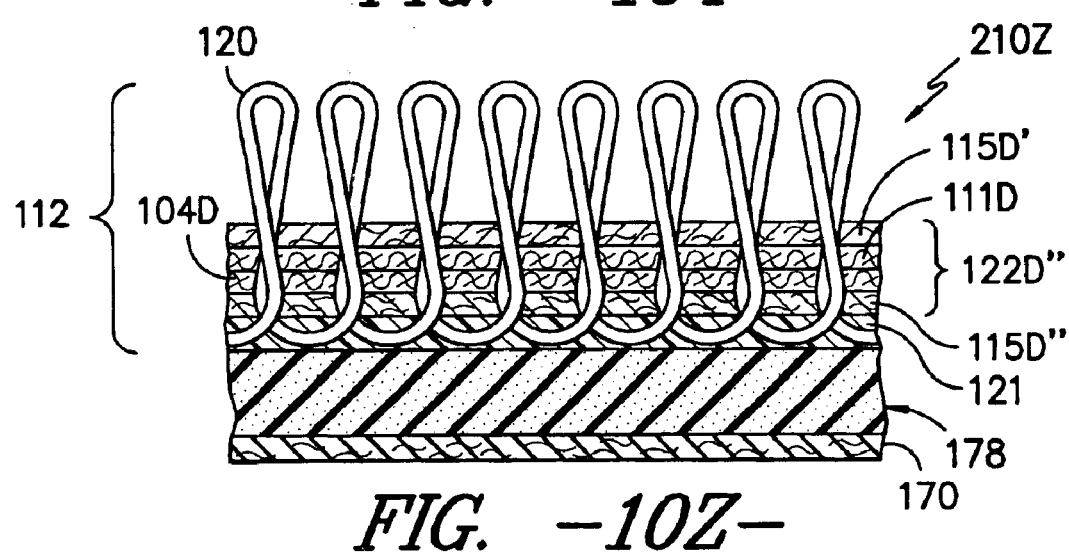
FIG. -10Z-
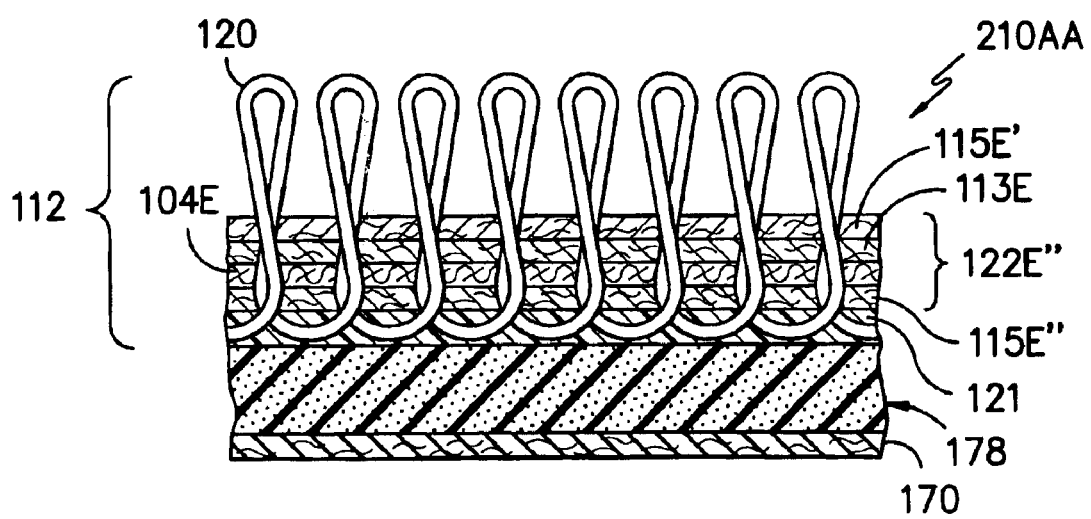
FIG. -10AA-

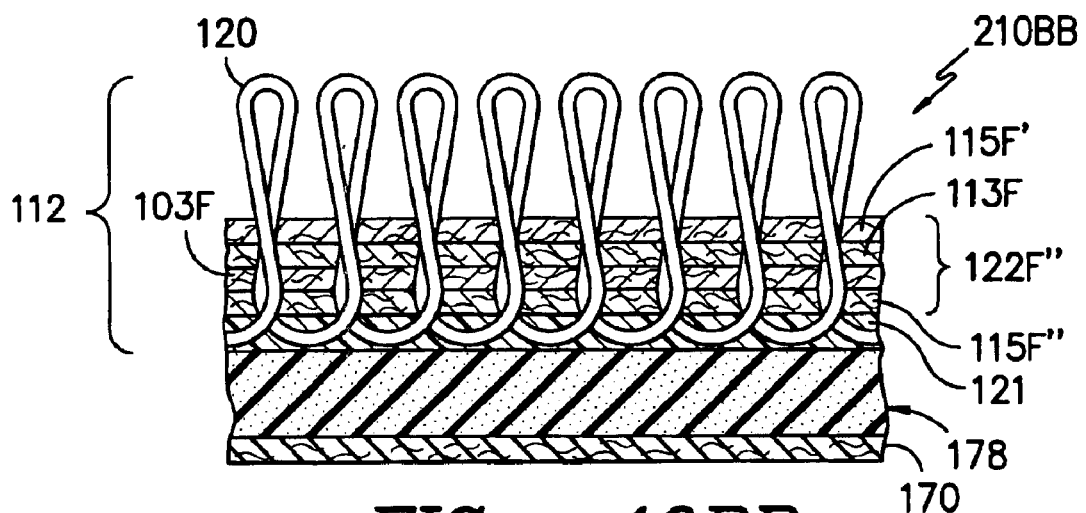
FIG. —10BB—
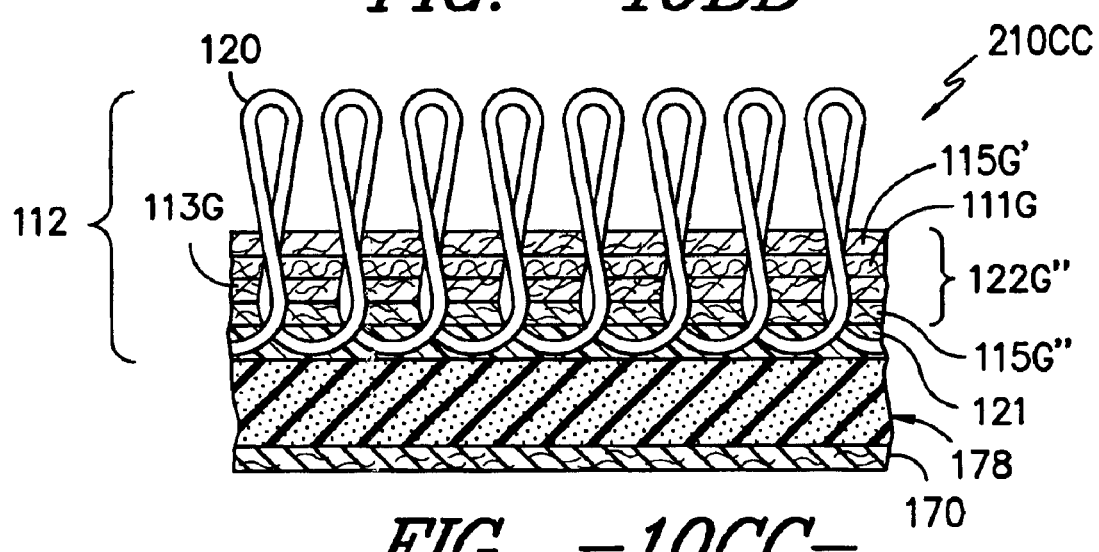
FIG. —10CC—
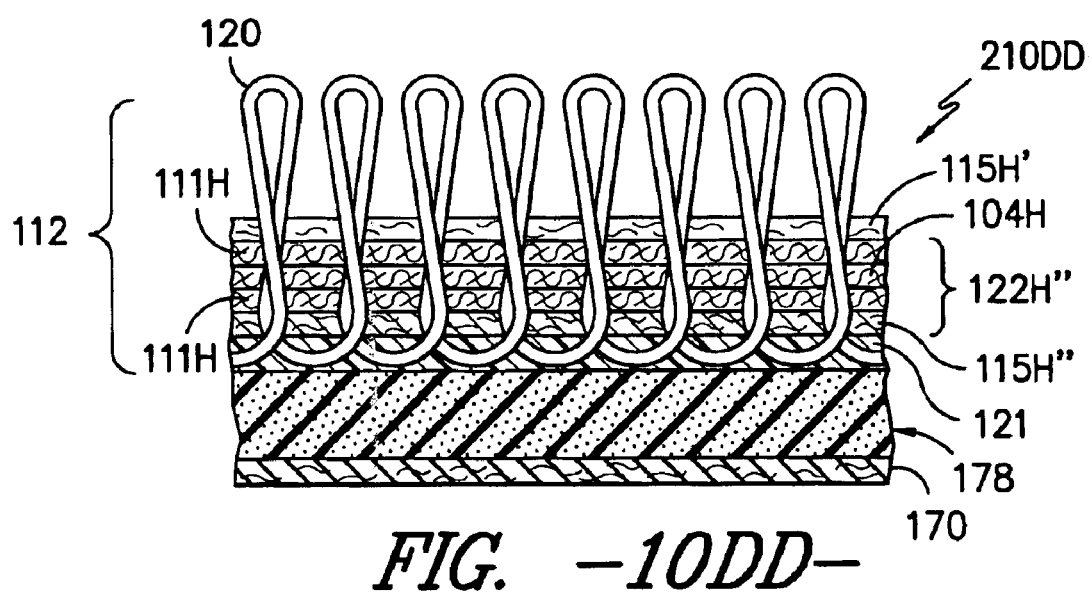
FIG. —10DD—

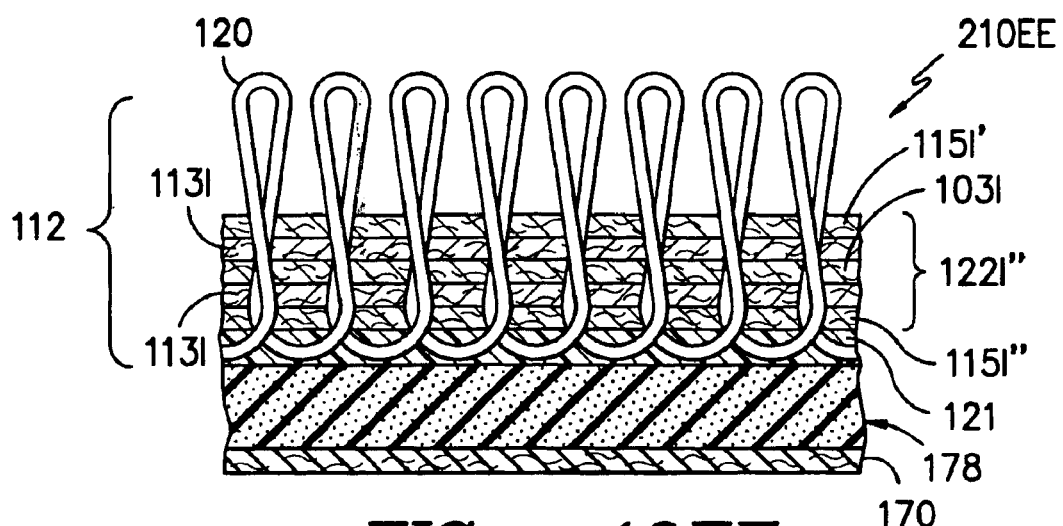
FIG. -10EE-
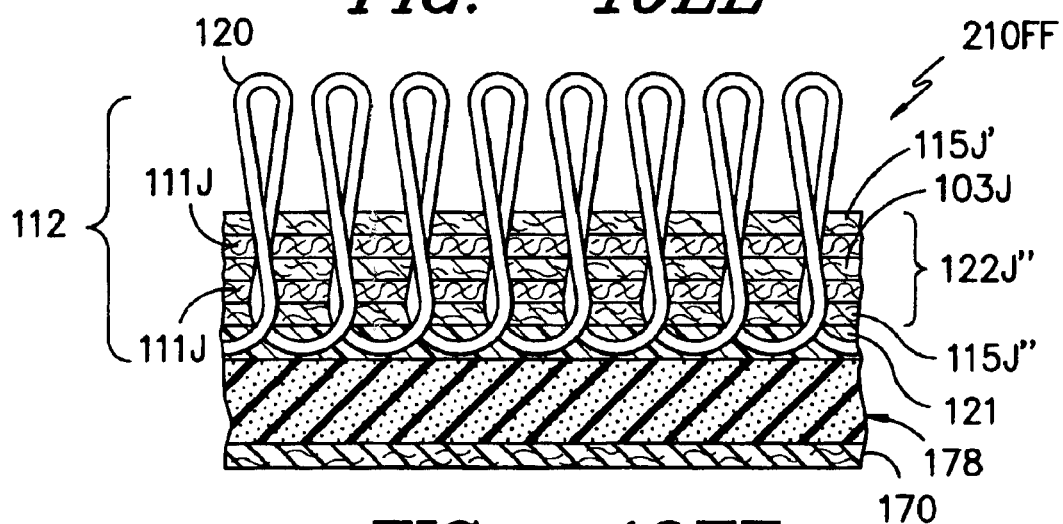
FIG. -10FF-
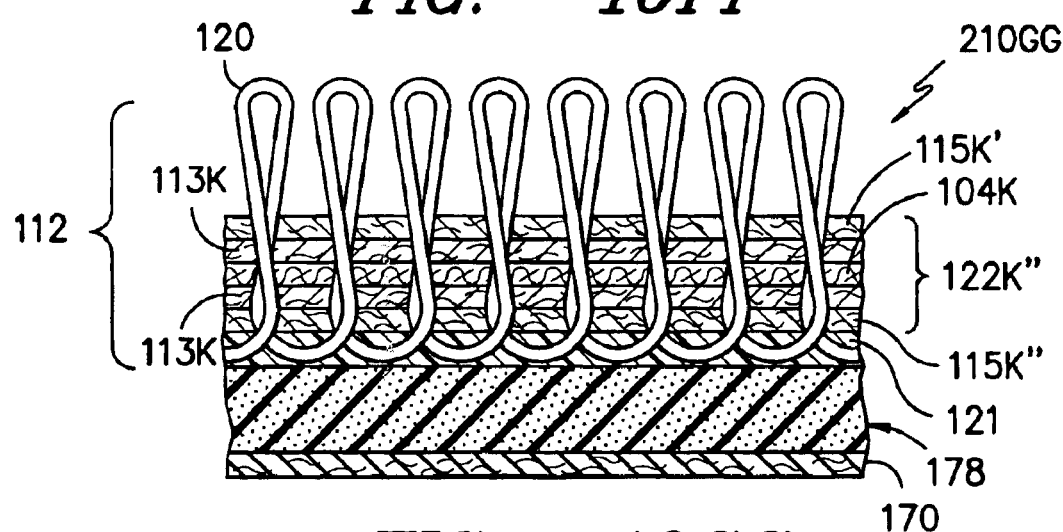
FIG. -10GG-

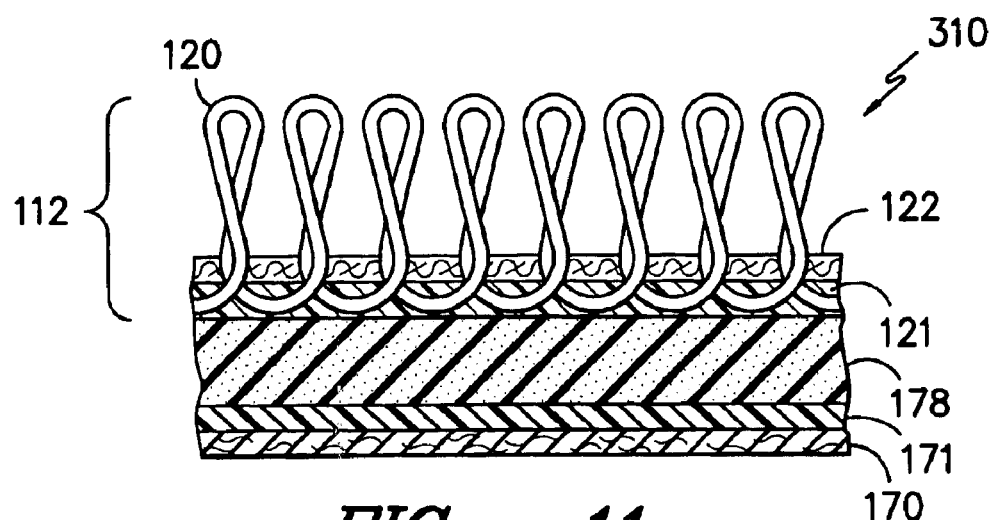
FIG. -11-
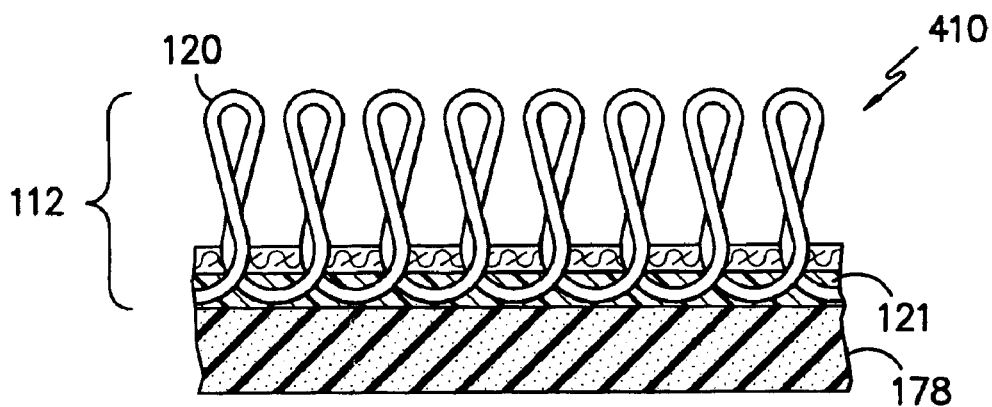
FIG. -12-
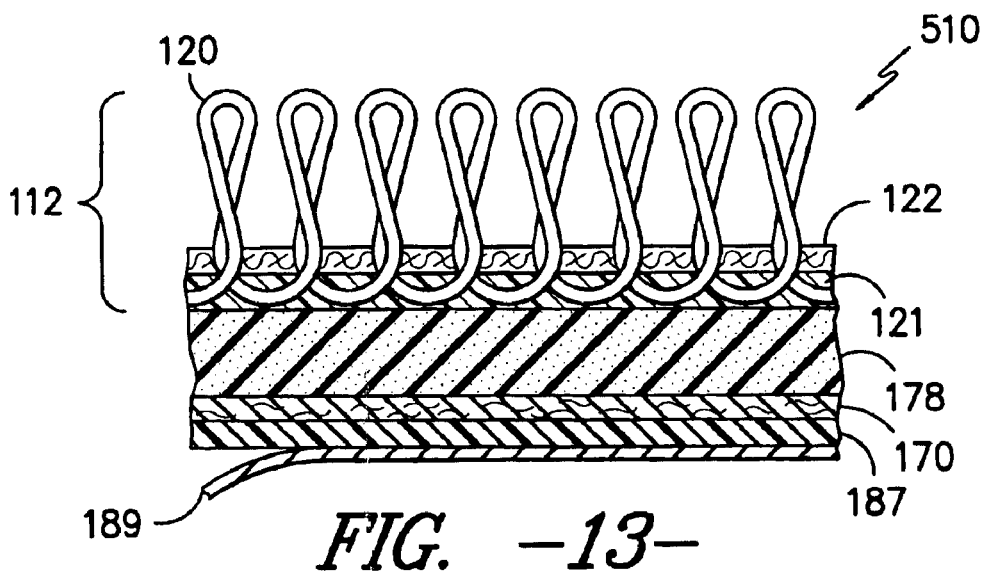
FIG. -13-

TEXTILE CONSTRUCTIONS WITH STABILIZED PRIMARY BACKINGS AND RELATED METHODS

TECHNICAL FIELD

The present invention relates to constructions for surface coverings such as wall coverings or floor coverings including carpet, carpet tile, cushioned carpet, cushioned carpet tile, or the like, and more particularly, to an improved primary pile fabric which may be incorporated into a cushioned or uncushioned pile fabric composite having pile forming yarns tufted through or attached to a stabilized primary backing. A process and apparatus for forming a pile fabric composite such as a carpet or carpet tile composite are also provided.

BACKGROUND OF THE INVENTION

As described in U.S. Pat. Nos. 4,522,857, 5,540,968, 5,545,276, 5,948,500, and 6,203,881 (all hereby incorporated by reference as if fully set forth herein) carpet and carpet tiles incorporating primary pile fabrics in layered constructions are well known to those of skill in the art. An example of a tufted carpet product 10A including a foam cushion underlayer as described in U.S. Pat. No. 5,948,500 is shown herein in FIG. 1. In the carpet 10A of FIG. 1, a pile fabric referred to as a primary carpet fabric 12 is embedded in an adhesive layer 16 in which is embedded a layer of open glass scrim 18. A foam base composite 19 is likewise adhesively bonded to the adhesive layer 16.

In such a carpet construction the primary carpet fabric 12 includes pile forming yarns 20 tufted through a primary backing layer 22 such as a woven or nonwoven textile by a conventional tufting process and held in place by a pre-coat backing layer 24 of latex or other appropriate adhesive. The primary backing layer 22 has traditionally been a single layer of material. A separate layer of stabilizing material 18 such as glass scrim or the like is adhesively bonded within the carpet composite 10A at a position below the primary backing layer 22 to impart dimensional stability. In the illustrated embodiment, an adhesive 16 extends away from both sides of the stabilizing material 18. Open interstices across the stabilizing material 18 promote so called "strike through" of the adhesive 16 through the stabilizing material. The formation of a foam base composite 19 for use in prior cushioned carpeting constructions has typically involved pre-forming and curing urethane foam 28 across a backing material also known as a carrier layer 26 by practices such as are disclosed in U.S. Pat. Nos. 4,171,395, 4,132,817, and 4,512,831 to Tillotson (all hereby incorporated by reference as if fully set forth herein). As described in those references, such a foam base composite may be laminated to a carpet base thereby yielding a multi-layer cushioned composite structure.

SUMMARY OF THE INVENTION

At least one embodiment of the present invention provides advantages and alternatives over previous carpet constructions by providing a construction useful in either a carpet or a carpet tile and which incorporates a primary pile fabric of tufted, bonded, flocked, needle punched, or the like construction including a primary backing of dimensionally stable character. The primary backing incorporates a synthetic and/or natural stabilizing material such as woven or nonwoven polypropylene, nylon, wool, cotton, glass (including fiberglass), polyester, and combinations of any of the foregoing in a form such as a mat, sheet, web, scrim, fabric, or the like. The presence of the dimensionally stable primary backing is believed to improve the physical performance of the primary carpet fabric and/or any surface covering. In particular, such a primary backing improves the tensile stability in the carpet construction at the various stages of production as well as in the final product. This tensile stability is defined by neck-down and elongation characteristics in the carpet construction measured by Instron strain gauge testing procedures conducted on the final product and on intermediate constructions at various stages of the formation process such as before tufting, before printing and before finishing.

In addition to improved tensile stability, the stabilized primary backing improves the dimensional stability of the carpet construction both during processing at various preliminary stages of completion, as well as in the final resulting product. Improved "in process" dimensional stability may be desirable to reduce the occurrence of cumulative variation in the carpet construction as it moves through the production process. Dimensional stability is defined by measurements of various recognized physical criteria including, for example: measurement of bow and bias; measurement of shrinkage; measurement of cup and curl; measurement of tuft lock; measurement of stretch or elongation; and, measurement of skew. For the final product, such dimensional stability measurements may be reported in terms of change in one or more measured characteristics as the product is subjected to tests, processes, and/or actual or simulated use. For "in process" intermediate constructions, such dimensional stability measurements may be reported in terms of change in one or more measured characteristic as the intermediate constructions undergo various processing steps.

The stable pile fabric may be incorporated within a multi-layered composite including a hard back or cushioned backing layer secured in place by lamination or in-situ processing techniques to yield a carpet or carpet tile of desired character. The stabilized pile fabric imparts substantial dimensional stability as described above without the need for separate additional layers of stabilizing material below the primary carpet. Hence, the efficiency of the formation process is thereby improved.

It is a feature of the present invention to provide a pile fabric suitable for use as a primary carpet fabric for use within a composite cushioned carpet or tile wherein the primary carpet fabric includes a plurality of pile-forming yarns tufted through or adhered to a primary backing of integral dimensionally stable character. A cushioning layer of foam, felt, fabric, or other suitable cushioning material may be disposed at a position below the primary carpet fabric.

According to one nonlimiting aspect of the present invention, a construction of a carpet composite is provided including a primary backing incorporating woven polypropylene, nonwoven polypropylene, woven polyester, nonwoven polyester, woven glass, nonwoven glass, and combinations thereof. Polypropylene constituents may include a nucleating agent to enhance dimensional stability. The nonwoven constituents may include, but are not limited to, dry-laid nonwoven constructions, wet-laid nonwoven constructions, needle punched nonwoven constructions, hydroentangled nonwoven constructions, spun bonded nonwoven constructions, and combinations thereof.

According to another nonlimiting aspect of the invention, a carpet construction is provided including a primary backing of one or more layers of woven polypropylene, nonwoven polypropylene, woven polyester, nonwoven polyester, woven glass, nonwoven glass, and combinations thereof with at least one additional fibrous covering layer also referred to as a cap layer such as a nonwoven structure of felted, spun bond, needle punched, hydroentangled construction, or the like. The layers may be attached by needle punching, adhesive bonding, heated calendering, or the like.

In accordance with one exemplary embodiment of the present invention, a cushioned carpet composite or tile is provided wherein a pile forming nylon yarn is tufted through a single layer or multi-layer stabilizing primary backing. A layer of precoat adhesive such as latex or the like may be disposed across the underside of the primary backing. A mass of at least one resilient polymeric adhesive such as a hot melt adhesive or the like extends in bonding relation away from the underside of the primary backing or precoat to a foam or cushion layer. No additional functional layer of stabilizing material need be incorporated between the stabilized primary backing and the foam layer. An optional secondary backing material or multi-component backing composite may be disposed on the underside of the foam layer.

BRIEF DESCRIPTION OF THE DRAWINGS

Exemplary embodiments of the present invention will now be presented with reference to the accompanying drawings which are incorporated in and which constitute a part of this specification and in which:

FIG. 1 is a cut-away side view of a known tufted carpet with a cushioned composite structure;

FIGS. 2A–2K illustrate cut-away side views of various single and multi-layered structures for use as precursors or primary backings of stabilized construction;

FIG. 2A illustrates a cut-away side view of a single woven layer;

FIG. 2B illustrates a cut-away side view of a single nonwoven layer;

FIG. 2C illustrates a cut-away side view of the woven layer of FIG. 2A and a nonwoven layer construction;

FIG. 2D illustrates a cut-away side view of the woven layer of FIG. 2A and another woven layer;

FIG. 2E illustrates a cut-away side view of the nonwoven layer of FIG. 2B and a woven layer;

FIG. 2F illustrates a cut-away side view of the nonwoven layer of FIG. 2B and another nonwoven layer;

FIG. 2G illustrates a cut-away side view of a multi-layer construction of the layers of FIGS. 2A and 2B;

FIG. 2H illustrates a multi-layer or sandwich construction of two woven outer layers of FIG. 2A with another woven layer therebetween;

FIG. 2I illustrates a multi-layer or sandwich construction of two outer nonwoven layers of FIG. 2B with another nonwoven layer therebetween;

FIG. 2J illustrates a cut-away side view of a multi-layer or sandwich construction of two outer woven layers of FIG. 2A with a nonwoven layer therebetween;

FIG. 2K illustrates a cut-away side view of a multi-layer or sandwich construction of two outer nonwoven layers of FIG. 2B and a woven layer therebetween.

FIGS. 3A–3K illustrate side views of exemplary construction practices for formation of various multi-component primary backing constructions incorporating a fibrous capping layer across at least one side, each figure includes an enlarged cut-away side view of the resultant primary backing construction;

FIG. 3A illustrates a side view of a construction practice for formation of a multi-component backing or precursor incorporating a fibrous capping layer atop the woven layer of FIG. 2A;

FIG. 3B illustrates a side view of a construction practice for formation of a multi-component backing or precursor incorporating a fibrous capping layer atop the nonwoven layer of FIG. 2B;

FIG. 3C illustrates a side view of a construction practice for formation of a multi-component backing or precursor incorporating a fibrous capping layer atop the woven layer of the construction of FIG. 2C;

FIG. 3D illustrates a side view of a construction practice for formation of a multi-component backing or precursor incorporating a fibrous capping layer atop one woven layer of FIG. 2D;

FIG. 3E illustrates a side view of a construction practice for formation of a multi-component backing or precursor incorporating a fibrous capping layer atop the nonwoven layer of FIG. 2E;

FIG. 3F illustrates a side view of a construction practice for formation of a multi-component backing or precursor incorporating a fibrous capping layer atop one nonwoven layer of FIG. 2F;

FIGS. 3C'–3F' correspond to FIGS. 3C–3F except that the construction or precursor 114C–114F has been inverted prior to addition of the fibrous cap layer.

FIG. 3C' illustrates a side view of a construction practice for formation of a multi-component backing or precursor incorporating a fibrous capping layer atop the nonwoven layer of the construction of FIG. 2C;

FIG. 3D' illustrates a side view of a construction practice for formation of a multi-component backing or precursor incorporating a fibrous capping layer atop one woven layer of FIG. 2D;

FIG. 3E' illustrates a side view of a construction practice for formation of a multi-component backing or precursor incorporating a fibrous capping layer atop the woven layer of FIG. 2E;

FIG. 3F' illustrates a side view of a construction practice for formation of a multi-component backing or precursor incorporating a fibrous capping layer atop one nonwoven layer of FIG. 2F;

FIG. 3G illustrates a side view of a construction practice for formation of a multi-component backing or precursor incorporating a fibrous capping layer atop the woven layer of FIG. 2G;

FIG. 3H illustrates a side view of a construction practice for formation of a multi-component backing or precursor incorporating a fibrous capping layer atop one woven layer of the construction of FIG. 2H;

FIG. 3I illustrates a side view of a construction practice for formation of a multi-component backing or precursor incorporating a fibrous capping layer atop one nonwoven layer of the construction of FIG. 2I;

FIG. 3J illustrates a side view of a construction practice for formation of a multi-component backing or precursor incorporating a fibrous capping layer atop one woven layer of the construction of FIG. 2J;

FIG. 3K illustrates a side view of a construction practice for formation of a multi-component backing or precursor incorporating a fibrous capping layer atop one nonwoven layer of the construction of FIG. 2K;

FIGS. 4A–4K illustrate side views of exemplary construction practices for formation of various multi-component primary backing constructions incorporating a fibrous capping layer across two sides, each figure includes an enlarged cut-away side view of the resultant primary backing construction;

FIG. 4A illustrates a side view of a construction practice for formation of a multi-component backing or precursor incorporating a fibrous capping layer above and below the construction of FIG. 2A;

FIG. 4B illustrates a side view of a construction practice for formation of a multi-component backing or precursor incorporating fibrous capping layer above and below the construction of FIG. 2B;

FIG. 4C illustrates a side view of a construction practice for formation of a multi-component backing or precursor incorporating fibrous capping layer above and below the construction of FIG. 2C;

FIG. 4D illustrates a side view of a construction practice for formation of a multi-component backing or precursor incorporating fibrous capping layer above and below the construction of FIG. 2D;

FIG. 4E illustrates a side view of a construction practice for formation of a multi-component backing or precursor incorporating fibrous capping layer above and below the construction of FIG. 2E;

FIG. 4F illustrates a side view of a construction practice for formation of a multi-component backing or precursor incorporating fibrous capping layer above and below the construction of FIG. 2F;

FIG. 4G illustrates a side view of a construction practice for formation of a multi-component backing or precursor incorporating fibrous capping layer above and below the construction of FIG. 2G;

FIG. 4H illustrates a side view of a construction practice for formation of a multi-component backing or precursor incorporating fibrous capping layer above and below the construction of FIG. 2H;

FIG. 4I illustrates a side view of a construction practice for formation of a multi-component backing or precursor incorporating fibrous capping layer above and below the construction of FIG. 2I;

FIG. 4J illustrates a side view of a construction practice for formation of a multi-component backing or precursor incorporating fibrous capping layer above and below the construction of FIG. 2J;

FIG. 4K illustrates a side view of a construction practice for formation of a multi-component backing or precursor incorporating fibrous capping layer above and below the construction of FIG. 2K;

FIG. 5A shows a side view of a representative construction practice for application of a pile forming yarn to a primary backing to form a face forming pile fabric for use as a primary carpet fabric;

FIG. 5B shows a side view of a representative construction practice for application of a precoat adhesive across the underside of the pile fabric formed in FIG. 5A;

FIG. 6 illustrates a side view of a representative construction practice for application of a pile fabric across a preformed cushioning underlayer to form a cushioned carpet;

FIGS. 7A–7GG illustrate cut-away side views of various exemplary carpet constructions or composites, such as cushioned carpet or tile, incorporating pile forming yarns tufted through various primary backings with an adhesive precoat layer and a preformed cushioning underlayer;

FIG. 7A illustrates a cut-away side view of an exemplary carpet construction incorporating the primary backing of FIG. 2A;

FIG. 7A' illustrates a cut-away side view of another exemplary carpet construction incorporating the primary backing of FIG. 2A and an added reinforcement layer;

FIG. 7A" illustrates a cut-away side view of yet another exemplary carpet construction incorporating the primary backing of FIG. 2A and added reinforcement and adhesive layers;

FIG. 7A'" illustrates a cut-away side view of still yet another exemplary embodiment of a carpet construction incorporating the primary backing of FIG. 2A and added reinforcement and adhesive layers together with a preferably rebond foam layer.

FIG. 7B illustrates a cut-away side view of an exemplary carpet construction incorporating the primary backing of FIG. 2B;

FIG. 7C illustrates a cut-away side view of an exemplary carpet construction incorporating the primary backing of FIG. 2C;

FIG. 7D illustrates a cut-away side view of an exemplary carpet construction incorporating the primary backing of FIG. 2D;

FIG. 7E illustrates a cut-away side view of an exemplary carpet construction incorporating the primary backing of FIG. 2E;

FIG. 7F illustrates a cut-away side view of an exemplary carpet construction incorporating the primary backing of FIG. 2F;

FIG. 7G illustrates a cut-away side view of an exemplary carpet construction incorporating the primary backing of FIG. 2G;

FIG. 7H illustrates a cut-away side view of an exemplary carpet construction incorporating the primary backing of FIG. 2H;

FIG. 7I illustrates a cut-away side view of an exemplary carpet construction incorporating the primary backing of FIG. 2I;

FIG. 7J illustrates a cut-away side view of an exemplary carpet construction incorporating the primary backing of FIG. 2J;

FIG. 7K illustrates a cut-away side view of an exemplary carpet construction incorporating the primary backing of FIG. 2K;

FIG. 7L illustrates a cut-away side view of an exemplary carpet construction incorporating the primary backing of FIG. 3A.

FIG. 7M illustrates a cut-away side view of an exemplary carpet construction incorporating the primary backing of FIG. 3B;

FIG. 7N illustrates a cut-away side view of an exemplary carpet construction incorporating the primary backing of FIG. 3C;

FIG. 7O illustrates a cut-away side view of an exemplary carpet construction incorporating the primary backing of FIG. 3D;

FIG. 7P illustrates a cut-away side view of an exemplary carpet construction incorporating the primary backing of FIG. 3E;

FIG. 7Q illustrates a cut-away side view of an exemplary carpet construction incorporating the primary backing of FIG. 3F;

FIGS. 7N'–7Q' correspond to FIGS. 7N–7Q except that the respective primary backings are those of FIGS. 3C'–3F' in place of those of FIGS. 3C–3F.

FIG. 7N' illustrates a cut-away side view of an exemplary carpet construction incorporating the primary backing of FIG. 3C';

FIG. 7O' illustrates a cut-away side view of an exemplary carpet construction incorporating the primary backing of FIG. 3D';

FIG. 7P' illustrates a cut-away side view of an exemplary carpet construction incorporating the primary backing of FIG. 3E';

FIG. 7Q' illustrates a cut-away side view of an exemplary carpet construction incorporating the primary backing of FIG. 3F';

FIG. 7R illustrates a cut-away side view of an exemplary carpet construction incorporating the primary backing of FIG. 3G;

FIG. 7S illustrates a cut-away side view of an exemplary carpet construction incorporating the primary backing of FIG. 3H;

FIG. 7T illustrates a cut-away side view of an exemplary carpet construction incorporating the primary backing of FIG. 3I;

FIG. 7U illustrates a cut-away side view of an exemplary carpet construction incorporating the primary backing of FIG. 3J;

FIG. 7V illustrates a cut-away side view of an exemplary carpet construction incorporating the primary backing of FIG. 3K;

FIG. 7W illustrates a cut-away side view of an exemplary carpet construction incorporating the primary backing of FIG. 4A;

FIG. 7X illustrates a cut-away side view of an exemplary carpet construction incorporating the primary backing of FIG. 4B;

FIG. 7Y illustrates a cut-away side view of an exemplary carpet construction incorporating the primary backing of FIG. 4C;

FIG. 7Z illustrates a cut-away side view of an exemplary carpet construction incorporating the primary backing of FIG. 4D;

FIG. 7AA illustrates a cut-away side view of an exemplary carpet construction incorporating the primary backing of FIG. 4E;

FIG. 7BB illustrates a cut-away side view of an exemplary carpet construction incorporating the primary backing of FIG. 4F;

FIG. 7CC illustrates a cut-away side view of an exemplary carpet construction incorporating the primary backing of FIG. 4G;

FIG. 7DD illustrates a cut-away side view of an exemplary carpet construction incorporating the primary backing of FIG. 4H;

FIG. 7EE illustrates a cut-away side view of an exemplary carpet construction incorporating the primary backing of FIG. 4I;

FIG. 7FF illustrates a cut-away side view of an exemplary carpet construction incorporating the primary backing of FIG. 4J;

FIG. 7GG illustrates a cut-away side view of an exemplary carpet construction incorporating the primary backing of FIG. 4K;

FIG. 8 illustrates a cut-away side view of an exemplary carpet construction corresponding to that shown in FIG. 7A but excluding any precoat adhesive;

FIG. 9 illustrates a side view of an exemplary processing line for the in-situ or in-line formation of a carpet construction or composite;

FIGS. 10A–10GG illustrate cut-away side views of various exemplary carpet constructions as may be formed using the processing line illustrated in FIG. 9 and incorporating various primary backings;

FIG. 10A illustrates a cut-away side view of an exemplary carpet construction incorporating the primary backing of FIG. 2A;

FIG. 10A' illustrates a cut-away side view of another exemplary carpet construction incorporating the primary backing of FIG. 2A and an added reinforcement layer;

FIG. 10" illustrates a cut-away side view of yet another exemplary carpet construction incorporating the primary backing of FIG. 2A and an added reinforcement and adhesive layer;

FIG. 10B illustrates a cut-away side view of an exemplary carpet construction incorporating the primary backing of FIG. 2B;

FIG. 10C illustrates a cut-away side view of an exemplary carpet construction incorporating the primary backing of FIG. 2C;

FIG. 10D illustrates a cut-away side view of an exemplary carpet construction incorporating the primary backing of FIG. 2D;

FIG. 10E illustrates a cut-away side view of an exemplary carpet construction incorporating the primary backing of FIG. 2E;

FIG. 10F illustrates a cut-away side view of an exemplary carpet construction incorporating the primary backing of FIG. 2F;

FIG. 10G illustrates a cut-away side view of an exemplary carpet construction incorporating the primary backing of FIG. 2G;

FIG. 10H illustrates a cut-away side view of an exemplary carpet construction incorporating the primary backing of FIG. 2H;

FIG. 10I illustrates a cut-away side view of an exemplary carpet construction incorporating the primary backing of FIG. 2I;

FIG. 10J illustrates a cut-away side view of an exemplary carpet construction incorporating the primary backing of FIG. 2J;

FIG. 10K illustrates a cut-away side view of an exemplary carpet construction incorporating the primary backing of FIG. 2K;

FIG. 10L illustrates a cut-away side view of an exemplary carpet construction incorporating the primary backing of FIG. 3A;

FIG. 10M illustrates a cut-away side view of an exemplary carpet construction incorporating the primary backing of FIG. 3B;

FIG. 10N illustrates a cut-away side view of an exemplary carpet construction incorporating the primary backing of FIG. 3C;

FIG. 10O illustrates a cut-away side view of an exemplary carpet construction incorporating the primary backing of FIG. 3D;

FIG. 10P illustrates a cut-away side view of an exemplary carpet construction incorporating the primary backing of FIG. 3E;

FIG. 10Q illustrates a cut-away side view of an exemplary carpet construction incorporating the primary backing of FIG. 3F;

FIGS. 10N'–10Q' correspond to FIGS. 10N–10Q except that the respective primary backings are those of FIGS. 3C'–3F' in place of those of FIGS. 3C–3F.

FIG. 10N' illustrates a cut-away side view of an exemplary carpet construction incorporating the primary backing of FIG. 3C';

FIG. 10O' illustrates a cut-away side view of an exemplary carpet construction incorporating the primary backing of FIG. 3D';

FIG. 10P' illustrates a cut-away side view of an exemplary carpet construction incorporating the primary backing of FIG. 3E';

FIG. 10Q' illustrates a cut-away side view of an exemplary carpet construction incorporating the primary backing of FIG. 3F';

FIG. 10R illustrates a cut-away side view of an exemplary carpet construction incorporating the primary backing of FIG. 3G;

FIG. 10S illustrates a cut-away side view of an exemplary carpet construction incorporating the primary backing of FIG. 3H;

FIG. 10T illustrates a cut-away side view of an exemplary carpet construction incorporating the primary backing of FIG. 3I;

FIG. 10U illustrates a cut-away side view of an exemplary carpet construction incorporating the primary backing of FIG. 3J;

FIG. 10V illustrates a cut-away side view of an exemplary carpet construction incorporating the primary backing of FIG. 3K;

FIG. 10W illustrates a cut-away side view of an exemplary carpet construction incorporating the primary backing of FIG. 4A;

FIG. 10X illustrates a cut-away side view of an exemplary carpet construction incorporating the primary backing of FIG. 4B;

FIG. 10Y illustrates a cut-away side view of an exemplary carpet construction incorporating the primary backing of FIG. 4C;

FIG. 10Z illustrates a cut-away side view of an exemplary carpet construction incorporating the primary backing of FIG. 4D;

FIG. 10AA illustrates a cut-away side view of an exemplary carpet construction incorporating the primary backing of FIG. 4E;

FIG. 10BB illustrates a cut-away side view of an exemplary carpet construction incorporating the primary backing of FIG. 4F;

FIG. 10CC illustrates a cut-away side view of an exemplary carpet construction incorporating the primary backing of FIG. 4G;

FIG. 10DD illustrates a cut-away side view of an exemplary carpet construction incorporating the primary backing of FIG. 4H;

FIG. 10EE illustrates a cut-away side view of an exemplary carpet construction incorporating the primary backing of FIG. 4I;

FIG. 10FF illustrates a cut-away side view of an exemplary carpet construction incorporating the primary backing of FIG. 4J;

FIG. 10GG illustrates a cut-away side view of an exemplary carpet construction incorporating the primary backing of FIG. 4K;

FIG. 11 illustrates a cut-away side view of an exemplary carpet construction corresponding generally to that shown in FIG. 10A and incorporating a multi-layer secondary backing system;

FIG. 12 illustrates a cut-away side view of an exemplary carpet construction corresponding generally to that shown in FIG. 10A and excluding any secondary backing layer; and FIG. 13 illustrates a cut-away side view of an exemplary carpet construction corresponding generally to that shown in FIG. 10A and incorporating a secondary backing including a releasable adhesive and cover sheet.

While the invention has been illustrated and will hereinafter be described and disclosed in connection with certain preferred embodiments, practices and procedures, it is by no means intended to limit the invention to such specific embodiments, practices and procedures. Rather it is intended to cover all such alternatives and modifications thereto as may fall within the true spirit and scope of the invention and all equivalents thereto as defined and limited only by the claims appended hereto.

DETAILED DESCRIPTION OF PREFERRED EMBODIMENTS

Reference will now be made to the drawings wherein like reference numerals are used to designate like components throughout the various views. In FIGS. 2A–2K there are illustrated various contemplated constructions for a dimensionally stable primary backing or precursor for use in a carpet construction. In FIG. 2A, there is illustrated a primary backing construction 122A made up of a single layer primary backing structure 114A of woven elongate fiber elements 111A. By way of example only and not limitation, it is contemplated that the elongate fiber elements 111A may be formed from materials including polypropylene, polyester, glass (including fiberglass), nylon, and the like.

One potentially preferred construction for the primary backing structure 114A is a plain weave construction of ribbon elements of stabilized polypropylene. It is to be understood that the term "ribbon element" is meant to denote a relatively flat structure or tape having a width dimension substantially greater than a height dimension. Of course round yarn structures such as spun or monofilament yarns as well as other geometries may likewise be utilized if desired. In one contemplated woven construction, stabilized polypropylene ribbon fiber is woven at a density of about 24 ends per inch×about 22 picks per inch. The ribbon fiber forming the ends has a linear density of about 1000 denier. The ribbon fiber forming the picks has a linear density of about 600 denier.

Such a stabilized polypropylene is described in U.S. patent application Ser. No. 10/036,604, filed Dec. 21, 2001, Ser. No. 10/036,834, filed Dec. 21, 2001, and Ser. No. 10/027,626, filed Dec. 21, 2001, each of which are hereby fully incorporated by reference. It is contemplated that the woven primary backing structure 114A may be used either alone or may be covered or saturated with an adhesive such as a light weight hot melt or water based adhesive so as to further distribute force across the fiber elements 111A. One contemplated arrangement incorporates a hot melt adhesive coating present at a level of about 3 to 5 ounces per square yard.

In FIG. 2B, the primary backing construction or precursor 122B is made up of a single layer primary backing structure 114B of nonwoven fiber elements 113B entangled to form a coordinated mass. By way of example only and not limitation, it is contemplated that the entangled fiber elements 113A may be formed from materials including polypropylene, polyester, glass (including fiberglass), nylon, and the like. According to one contemplated construction, the fiber elements may be polypropylene stabilized with a nucleating agent as set forth more fully hereinafter. The nonwoven primary backing structure 114B may be of any known nonwoven arrangement including a needle punched nonwoven construction, a spun bonded nonwoven construction, a hydroentangled nonwoven construction, or the like. It is contemplated that the nonwoven primary backing structure 114B may be used either alone or may be covered or saturated with an adhesive such as a light weight hot melt or water based adhesive so as to further distribute force across the fiber elements 113B. One contemplated arrangement incorporates a hot melt adhesive coating present at a level of about 3 to about 5 ounces per square yard. The nonwoven construction 122B may also include one or more binders or low melt fibers, such as ureaformaldehyde resins, phenolic resins, bone glue, polyvinyl alcohols, acrylic resins, polyvinyl acetates, styrene-butadiene latex copolymer, acrylamide, acrylic fibers, and the like.

The term "polypropylene" is intended to encompass any polymeric composition comprising propylene monomers, either alone or in mixture or copolymer with other randomly selected and oriented polyolefins, dienes, or other monomers (such as ethylene, butylene, and the like). Such a term also encompasses any different configuration and arrangement of the constituent monomers (such as syndiotactic, isotactic, and the like). Thus, the term as applied to fibers is intended to encompass actual long strands, tapes, threads, cut up segments and the like, of drawn polymer. The polypropylene may be of any standard melt flow (by testing); however, standard fiber grade polypropylene resins possess ranges of Melt Flow Indices between about 2 and 50.

The term "stabilized polypropylene" refers to polypropylene to which one or more nucleating agents have been added. The terms "nucleating agent", and "nucleating agents" are intended to generally encompass, singularly or in combination, any additive to polypropylene that produces nucleation sites for polypropylene crystals from transition from its molten state to a solid, cooled structure. Hence, since the polypropylene composition (including nucleating agent additives) must be molten to eventually extrude the fiber itself, the nucleating agent provides such nucleation sites upon cooling of the polypropylene from its molten state. Such compounds provide the necessary nucleation sites prior to polypropylene recrystallization itself. Thus, any compound that exhibits such a beneficial effect and property is included within this definition. Such nucleating agents more specifically include dibenzylidene sorbitol types, including, without limitation, dibenzylidene sorbitol (DBS), monomethyldibenzylidene sorbitol, such as 1,3:2,4-bis(p-methylbenzylidene) sorbitol (p-MDBS), dimethyl dibenzylidene sorbitol, such as 1,3:2,4-bis(3,4-dimethylbenzylidene) sorbitol (3,4-DMDBS); other compounds of this type include, again, without limitation, sodium benzoate, NA-11, and the like.

The concentration of such nucleating agents (in total) within the target polypropylene fiber is preferably at least 10 ppm, and more preferably at least 50 ppm. Thus, from about 10 to about 2000 ppm, preferably from about 50 ppm to about 1500 ppm, and most preferably from about 100 ppm to about 800 ppm.

The presence of such nucleating agents has been found to enhance the stability of the polypropylene fibers against shrinkage. Without being limited by any specific scientific theory, it appears that the nucleating agents which perform best are those which exhibit relatively high solubility within the propylene itself. Thus, compounds which are readily soluble, such as 1,3:2,4-bis(p-methylbenzylidene) sorbitol provides the lowest shrinkage rate for the desired polypropylene fibers. The DBS derivative compounds are potentially preferred due to the low crystalline sizes produced by such compounds. Other nucleators, such as NA-11, also provide acceptable stabilizing characteristics to the target polypropylene fiber. Basically, the selection criteria required of such nucleating agents are particle sizes (the lower the better for ease in handling, mixing, and incorporation with the target resin), particle dispersability within the target resin (to provide the most effective nucleation properties), and nucleating temperature (e.g., crystallization temperature, determined for resin samples through differential scanning calorimetry analysis of molten nucleated resins) generally, the higher such a temperature, the better.

It has been determined that the nucleating agents that exhibit good solubility in the target molten polypropylene resins (and thus are liquid in nature during that stage in the fiber-production process) provide effective low-shrink stabilizing characteristics. Thus, low substituted DBS compounds (including DBS, p-MDBS) appear to provide fewer manufacturing issues as well as enhanced stabilizing properties within the finished polypropylene fibers themselves. Although p-MDBS is preferred, any of the above-mentioned nucleating agents may be utilized within this invention as long as the low shrink requirements are achieved through utilization of such compounds. Mixtures of such nucleating agents may also be used during processing in order to provide such low-shrink properties as well as possible organoleptic improvements, facilitation of processing, or cost.

While a single layer primary backing of either woven or nonwoven construction may be utilized, it is also contemplated that multi-layer constructions incorporating at least one additional layer of the same or different material may also be used to form the primary backing. Various exemplary arrangements for primary backings or precursors incorporating two or more layers are illustrated in FIGS. 2C–2K.

In the arrangement illustrated in FIG. 2C, the primary backing construction 122C is formed from a composite 114C made up of an upper layer 111C of a woven construction formed from interwoven elongate fiber elements of suitable material such as polyester, glass, standard polypropylene, stabilized polypropylene, nylon, or combinations thereof as described above. Disposed at a position below the upper layer 111C is a nonwoven stabilizing glass (or fiberglass) layer 103C. The nonwoven stabilizing glass layer 103C is preferably formed by a multiplicity of entangled glass fiber elements. Such a structure may be formed by any known method including wet-laid, dry-laid, needle punching or hydroentanglement although needle punching may be preferred. The mass per unit area of the nonwoven stabilizing glass layer 103C is contemplated to be in the range of about 0.5 to about 5 ounces per square yard, preferably about 2 ounces per square yard. The glass mat 103C may be made of, for example, chopped bundles of glass fibers of about one-fourth inch to about 3 inches in length and having a diameter of about 3 to about 20 microns. It is preferred that the glass mat 103C have about 25% or less by weight binder, preferably about 20% or less, and most preferably about 10% or less. As mentioned above, the layers may be fully saturated with an adhesive such as a hot melt, urethane, or latex adhesive. Of course, the relative position of the layers may also be reversed within a carpet structure if desired.

In the arrangement illustrated in FIG. 2D, the primary backing construction or precursor 122D is formed from a composite 114D made up of a woven upper layer 111D formed from interwoven elongate fiber elements of suitable material such as polyester, glass, standard polypropylene, stabilized polypropylene, or nylon as described above. Disposed at a position below the upper layer 111D is a woven stabilizing glass layer 104D. The woven stabilizing glass layer 104D is formed by interweaving elongate glass fiber elements into a coordinated structure. Such a structure may be formed by any known weaving method as will be known to those of skill in the art. The mass per unit area of the woven stabilizing glass layer 104D is contemplated to be in the range of about 0.5 to about 5 ounces per square yard, preferably about 2 ounces per square yard. The glass fibers (or fiberglass) of the layer 104D may be the same as or similar to the glass fibers described above with respect to layer 103C. Also, one or both of the layers may be saturated with an adhesive. Of course, the relative position of the layers may also be reversed within a carpet structure if desired.

In the arrangement illustrated in FIG. 2E, the primary backing construction 122E is formed from a two layer composite 114E made up of an upper layer 113E of a nonwoven construction formed from entangled fiber elements of suitable material such as polyester, glass, standard polypropylene, stabilized polypropylene, nylon, or the like as described above in relation to FIG. 2B. Disposed at a position below the upper layer 113E is a woven stabilizing glass layer 104E. The woven stabilizing glass layer 104E is formed by interweaving elongate glass fiber elements into a coordinated structure. The mass per unit area of the woven stabilizing glass layer 104E is contemplated to be in the range of about 0.5 to about 5 ounces per square yard, preferably about 2 ounces per square yard. The glass fibers (or fiberglass) of the layer 104E may be the same as or similar to the glass fibers described above with respect to layer 103C. Also, one or both of the layers may be saturated with an adhesive. Of course, the relative position of the layers may also be reversed within a carpet structure if desired.

In the arrangement illustrated in FIG. 2F, the primary backing construction or precursor 122F is formed from a two layer composite 114F. The two layer primary backing structure is made up of an upper layer 113F formed from entangled fiber elements of suitable material such as polyester, glass, standard polypropylene, stabilized polypropylene, nylon, or the like as described above in relation to FIG. 2B and a nonwoven stabilizing glass layer 103F disposed at a position below the upper layer 113F. The nonwoven stabilizing glass layer 103F is formed by a multiplicity of entangled glass fiber elements. Such a structure may be formed by any known method including dry-laid, wet-laid, needle punching, hydroentanglement although needle punching may be preferred. The mass per unit area of the nonwoven stabilizing glass layer 103F is contemplated to be in the range of about 0.5 to about 5 ounces per square yard, preferably about 2 ounces per square yard. The glass fibers (or fiberglass) of the layer 103F may be the same as or similar to the glass fibers described above with respect to layer 103C. Also, one or both of the layers may be saturated with an adhesive. Of course, the relative position of the layers may also be reversed within a carpet structure if desired.

While each of the multi-layer constructions illustrated in FIGS. 2C–2F utilize a layer of glass across one side to enhance stability, it is likewise contemplated that multi-layer primary backing constructions may be utilized which are substantially devoid of glass. One such construction is illustrated in FIG. 2G. In the arrangement illustrated in FIG. 2G, the primary backing construction 122G is formed from a two layer composite 114G. The two layer primary backing structure or precursor is made up of an upper layer 111G formed from interwoven elongate fiber elements of suitable material such as polyester, standard polypropylene, stabilized polypropylene, or nylon as described above in relation to FIG. 2A. Disposed in adjacent juxtaposed relation to the upper layer 111G is a nonwoven layer 113G of entangled fiber elements of suitable material such as polyester, standard polypropylene, stabilized polypropylene, or nylon as described above in relation to FIG. 2B. Of course, one or both layers may be saturated with an adhesive and the relative position of the layers may also be reversed within a carpet structure if desired.

While each of the multi-layer constructions in FIGS. 2C–2G incorporates two layers, it is also contemplated that three or more layers may be utilized if desired. By way of example only and not limitation, FIGS. 2H–2K illustrate various constructions in which a layer of woven or nonwoven stabilizing glass is held in sandwiching relation between two adjacent layers.

In the arrangement illustrated in FIG. 2H, the primary backing construction or precursor 122H is formed from a composite 114H made up of a woven stabilizing glass layer 104H disposed in sandwiched relation at an intermediate position between outer layers 111H each formed from interwoven elongate fiber elements of suitable material such as polyester, glass, standard polypropylene, stabilized polypropylene, or nylon as described above. The woven stabilizing glass layer 104H is formed by interweaving elongate glass fiber elements into a coordinated structure. Such a structure may be formed by any known weaving method as will be known to those of skill in the art. The mass per unit area of the woven stabilizing glass layer 104H is contemplated to be in the range of about 0.5 to about 5 ounces per square yard, preferably about 2 ounces per square yard.

In the arrangement illustrated in FIG. 2I, the primary backing construction or precursor 122I is formed from a composite 114I made up of a nonwoven stabilizing glass layer 103I disposed in sandwiched relation at an intermediate position between nonwoven outer layers 113I formed from entangled fiber elements of suitable material such as polyester, glass, standard polypropylene, stabilized polypropylene, or nylon as described above. The nonwoven stabilizing glass layer 103I is formed by any known method including dry-laid, wet-laid, needle punching, or hydroentanglement although needle punching may be preferred. The mass per unit area of the nonwoven stabilizing glass layer 103I is contemplated to be in the range of about 0.5 to about 5 ounces per square yard, preferably about 2 ounces per square yard.

In the arrangement illustrated in FIG. 2J, the primary backing construction or precursor 122J is formed from a composite 114J made up of a nonwoven stabilizing glass layer 103J disposed in sandwiched relation at an intermediate position between outer layers 111J each formed from interwoven elongate fiber elements of suitable material such as polyester, glass, standard polypropylene, stabilized polypropylene, or nylon as described above. The nonwoven stabilizing glass layer 103J is formed by any known method including dry-laid, wet-laid, needle punching, or hydroentanglement although needle punching may be preferred. The mass per unit area of the nonwoven stabilizing glass layer 103J is contemplated to be in the range of about 0.5 to about 5 ounces per square yard, preferably about 2 ounces per square yard.

In the arrangement illustrated in FIG. 2K, the primary backing construction or precursor 122K is formed from a composite 114K made up of a woven stabilizing glass layer 104K disposed in sandwiched relation at an intermediate position between nonwoven outer layers 113K each formed from entangled fiber elements of suitable material such as polyester, glass, standard polypropylene, stabilized polypropylene, or nylon as described above. The woven stabilizing glass layer 104K is formed by interweaving elongate glass fiber elements into a coordinated structure. Such a structure may be formed by any known weaving method as will be known to those of skill in the art. The mass per unit area of the woven stabilizing glass layer 104K is contemplated to be in the range of about 0.5 to about 5 ounces per square yard, preferably about 2 ounces per square yard.

With reference again to FIGS. 2A–2K, and in accordance with at least one embodiment of the present invention, it is preferred that each of the layers 111, 113, 103, and 104 have a weight in the range of about 0.1 to about 5 ounces per square yard, preferably about 1 to about 3 ounces per square yard, and most preferably about 2 ounces per square yard.

It is to be appreciated that in any of the sandwich forming constructions of FIGS. 2H–2K, the outer layers may be of either similar or dissimilar material and/or construction. By way of example only, it is contemplated that one outer layer may be woven and the other outer layer nonwoven. Likewise, the outer layers may also be of different materials if desired, for example, one nylon, one polypropylene. Further, each layer may be of a single material or may be a combination of two or more materials, for example, a combination of polyester and polypropylene.

In each of the constructions 2C–2F and 2H–2K wherein it is indicated that a layer of stabilizing glass may be disposed, it is contemplated that such glass may be substituted with an alternative stabilizing layer if desired. By way of example only and not limitation, it is contemplated that in the embodiments incorporating nonwoven glass, such nonwoven glass may be replaced with an alternative nonwoven stabilizing layer formed from materials such as nylon, polyester, stabilized polypropylene, and other high melt, low shrink fibers as may be known to those of skill in the art. Likewise, it is contemplated that in the embodiments incorporating woven glass, such woven glass may be replaced with a suitable alternative woven stabilizing layer formed from materials such as nylon, polyester, stabilized polypropylene, and other high melt, low shrink fibers as may be known to those of skill in the art. Accordingly, a large number of variations and combinations may be utilized as may be desired. Outer layers of woven or nonwoven polyester, polypropylene, and mixtures thereof ranging from about 100 percent polypropylene to about 100 percent polyester in surrounding relation to woven or nonwoven glass may be particularly preferred in the three layer sandwich forming configurations (FIGS. 2H–2K).

It is contemplated that the individual layers may be adjoined to one another by use of physical interconnection and/or adhesive bonding. By way of example only, it is contemplated that a low weight adhesive such as a hot melt or water based adhesive or the like may be utilized between the various layers. It is also contemplated that the various layers may undergo a needling operation so as to force fibers across the interface between layers so as to establish a mechanical bond. This needing may be carried out alone or in combination with adhesive bonding. Useful adhesives may include wet adhesives as well as normally dry activatable adhesives in forms such as powders, films, scrims, fabrics, and the like as may be known to those of skill in the art. It is also contemplated that the layers may be adjoined by passing juxtaposed layers containing a relatively low melting point constituent such as acrylic or polypropylene or a low melting point polyester through a heated roll calender as will be well known to those of skill in the art to melt fuse the fibers together. According to one contemplated practice, wherein the low melting point constituent is polypropylene, such a roll calender may be operated at a temperature in the range of about 350 degrees Fahrenheit so as to cause at least a portion of the polypropylene fibers to undergo melt fusion thereby resulting in the establishment of an adjoining relation between adjacent layers.

By way of example only and not limitation, one contemplated and possible preferred sandwich forming construction for the primary backing utilizes spun bonded polyester and/or spun bonded stabilized polypropylene at a level of about 60 grams per square meter (120 grams per square meter total) as the outer layer material bounding an interior stabilizing layer of woven or nonwoven glass at about 1 to about 2 ounces per square yard. The glass layer may incorporate about 15% polyester or polypropylene fiber to match the outer layer material and an acrylic binder to facilitate adhesion.

In order to provide further dimensional stability to the primary backing and thus to the finished carpet, it is contemplated that a fibrous capping layer may be applied across at least one side of any of the constructions (precursors) illustrated and described in relation to FIGS. 2A–2K. In FIG. 3A, there is illustrated a construction practice for a multilayer primary backing construction 122A' incorporating a woven primary backing structure 114A as described in relation to FIG. 2A above in adjoined relation to a woven or nonwoven fibrous cap layer 115A. As shown, according to this practice, a pre-formed woven polypropylene primary backing structure 114A as described in relation to FIG. 2A is covered on one side with a fibrous capping material 108A such as a woven material, nonwoven material or carded web of relatively loose semi-aligned staple fibers. The capping material 108A is preferably a blend made up predominantly of polyester fibers in combination with a lower percentage of polypropylene fibers. One fiber blend which may be particularly preferred is a blend of about 80 weight percent polyester and about 20 weight percent polypropylene.

According to one potentially preferred practice incorporating a capping material of preformed nonwoven or carded web construction, the polyester and polypropylene staple fibers making up this construction are of substantially similar physical dimensions. Such staple fibers preferably have an average length in the range of about 0.5 to about 4 inches, and more preferably have an average length of about 1 to about 4 inches and most preferably have an average length of about 2 inches. Such staple fibers preferably have a filament linear density rating in the range of about 1 to about 8 denier per filament and more preferably about 3 to about 6 denier per filament and most preferably about 3 denier per filament.

The mass per unit area of the fibrous capping material is preferably in the range of about 1 to about 4 ounces per square yard and is most preferably in the range of about 2.5 ounces per square yard. In the event that the polypropylene staple fibers utilized within the fibrous capping material 108A are formed from stabilized polypropylene incorporating a nucleating agent as described above, it is contemplated that the percentage of polyester may be greatly reduced or eliminated entirely such that the fibrous capping material 108A may be up to 100 weight percent polypropylene.

As shown, the fibrous capping material 108A may be adhered to the primary backing structure 114A at a reciprocating needle bed 109A. At such a reciprocating needle bed 109A a portion of the fibers from the juxtaposed layers undergo entanglement to provide adherence. Following the needling operation the resulting structure may be passed through a heated roll calender 107A. According to one potentially preferred practice, the heated roll calender is operated at a temperature of about 350 degrees Fahrenheit so as to cause a portion of the polypropylene fibers to undergo softening and subsequent melt fusion between layers thereby further enhancing coherency. The resulting primary backing construction 122A' may be collected in roll form or may be delivered directly to a station for further processing in a manner to be described further hereinafter.

A procedure for formation of a primary backing construction incorporating a fibrous cap layer across one side of each of the constructions or precursors illustrated in FIGS. 2B–2K is illustrated respectively in FIGS. 3B–3K. Thus, in FIG. 3B there is illustrated a construction practice for a multi-layer primary backing construction 122B' incorporating a nonwoven primary backing structure as described in relation to FIG. 2B above in adjoined relation to a woven or nonwoven fibrous cap layer 15B. According to this practice, a pre-formed primary backing structure 114B as described in relation to FIG. 2B is covered on one side with a fibrous capping material 108B as described above in relation to FIG. 3A. The fibrous capping material 108B and the primary backing structure 114B may be adhered together at a reciprocating needle bed 109B. If desired, the resulting structure may thereafter be passed through a heated roll calender 107B operated at a temperature to effect melt fusion between fiber constituents in the various layers. The resulting primary backing construction 122B' may be collected in roll form or may be delivered directly to a station for further processing in a manner to be described further hereinafter.

In FIG. 3C there is illustrated a construction practice for a multi-layer primary backing construction 122C' incorporating a two layer primary backing structure 114C as described in relation to FIG. 2C above in adjoined relation to a woven or nonwoven fibrous cap layer 115C. According to this practice, a pre-formed primary backing structure 114C as described in relation to FIG. 2C is covered on one side with a fibrous capping material 108C as described above in relation to FIG. 3A. The fibrous capping material 108C and the primary backing structure 114C may be adhered together at a reciprocating needle bed 109C. If desired, the resulting structure may thereafter be passed through a heated roll calender 107C operated at a temperature to effect melt fusion between fiber constituents in the various layers. The resulting primary backing construction 122C' may be collected in roll form or may be delivered directly to a station for further processing in a manner to be described further hereinafter.

In FIG. 3D there is illustrated a construction practice for a multi-layer primary backing construction 122D' incorporating a two layer primary backing structure 114D as described in relation to FIG. 2D above in adjoined relation to a woven or nonwoven fibrous cap layer 115D. According to this practice, a pre-formed primary backing structure 114D as described in relation to FIG. 2D is covered on one side with a fibrous capping material 108B as described above in relation to FIG. 3A. The fibrous capping material 108D and the primary backing structure 114D may be adhered together at a reciprocating needle bed 109D. If desired, the resulting structure may thereafter be passed through a heated roll calender 107D operated at a temperature to effect melt fusion between fiber constituents in the various layers. The resulting primary backing construction 122D' may be collected in roll form or may be delivered directly to a station for further processing in a manner to be described further hereinafter.

In FIG. 3E there is illustrated a construction practice for a multi-layer primary backing construction 122E' incorporating a two layer primary backing structure 114E as described in relation to FIG. 2E above in adjoined relation to a woven or nonwoven fibrous cap layer 115E. According to this practice, a pre-formed primary backing structure 114E as described in relation to FIG. 2E is covered on one side with a fibrous capping material 108E as described above in relation to FIG. 3A. The fibrous capping material 108E and the primary backing structure 114E may be adhered together at a reciprocating needle bed 109E. If desired, the resulting structure may thereafter be passed through a heated roll calender 107E operated at a temperature to effect melt fusion between fiber constituents in the various layers. The resulting primary backing construction 122E' may be collected in roll form or may be delivered directly to a station for further processing in a manner to be described further hereinafter.

In FIG. 3F there is illustrated a construction practice for a multi-layer primary backing construction 122F' incorporating a two layer primary backing structure 114F as described in relation to FIG. 2F above in adjoined relation to a woven or nonwoven fibrous cap layer 115C. According to this practice, a preformed primary backing structure 114F as described in relation to FIG. 2F is covered on one side with a fibrous capping material 108F as described above in relation to FIG. 3A. The fibrous capping material 108F and the primary backing structure 114F may be adhered together at a reciprocating needle bed 109F. If desired, the resulting structure may thereafter be passed through a heated roll calender 107F operated at a temperature to effect melt fusion between fiber constituents in the various layers. If desired, the resulting structure may thereafter be passed through a heated roll calender 107F operated at a temperature to effect melt fusion between fiber constituents in the various layers. The resulting primary backing construction 122F' may be collected in roll form or may be delivered directly to a station for further processing in a manner to be described further hereinafter.

With reference to FIGS. 3C'–3F' and with reference again to FIGS. 2C–2F and FIGS. 3C–3F, it is to be understood that each of the constructions or precursors 122C–122F may be inverted prior to the addition of the fibrous cap layer. Hence, in FIGS. 3C'–3F', the layers 103C, 104D, 104E, and 103F are sandwiched between the respective layers 111C, 115C; 111D, 115D; 113E, 115E; and 113F, 115F. In the examples where layers 103C, 104D, 104E, and 103F are glass or fiberglass, it is potentially preferred to protect the glass layer by sandwiching the glass layer between two non-glass layers.

In FIG. 3G there is illustrated a construction practice for a multi-layer primary backing construction 122G' incorporating a two layer primary backing structure 114G as described in relation to FIG. 2G above in adjoined relation to a woven or nonwoven fibrous cap layer 115G. According to this practice, a pre-formed primary backing structure 114G as described in relation to FIG. 2G is covered on one side with a fibrous capping material 108G as described above in relation to FIG. 3A. The fibrous capping material 108G and the primary backing structure 114G may be adhered together at a reciprocating needle bed 109G. If desired, the resulting structure may thereafter be passed through a heated roll calender 107G operated at a temperature to effect melt fusion between fiber constituents in the various layers. The resulting primary backing construction 122G' may be collected in roll form or may be delivered directly to a station for further processing in a manner to be described further hereinafter.

In FIG. 3H there is illustrated a construction practice for a multi-layer primary backing construction 122H' incorporating a three layer sandwich construction primary backing structure 114H as described in relation to FIG. 2H above in adjoined relation to a woven or nonwoven fibrous cap layer 115H. According to this practice, a pre-formed primary backing structure 114H as described in relation to FIG. 2H is covered on one side with a fibrous capping material 108H as described above in relation to FIG. 3A. The fibrous capping material 108H and the primary backing structure 114H may be adhered together at a reciprocating needle bed 109H. If desired, the resulting structure may thereafter be passed through a heated roll calender 107H operated at a temperature to effect melt fusion between fiber constituents in the various layers. The resulting primary backing construction 122H' may be collected in roll form or may be delivered directly to a station for further processing in a manner to be described further hereinafter.

In FIG. 3I there is illustrated a construction practice for a multi-layer primary backing construction 122I' incorporating a three layer sandwich construction primary backing structure 114I as described in relation to FIG. 2I above in adjoined relation to a woven or nonwoven fibrous cap layer 115I. According to this practice, a pre-formed primary backing structure 114I as described in relation to FIG. 2I is covered on one side with a fibrous capping material 108I as described above in relation to FIG. 3A. The fibrous capping material 108I and the primary backing structure 114I may be adhered together at a reciprocating needle bed 109I. If desired, the resulting structure may thereafter be passed through a heated roll calender 107I operated at a temperature to effect melt fusion between fiber constituents in the various layers. The resulting primary backing construction 122I' may be collected in roll form or may be delivered directly to a station for further processing in a manner to be described further hereinafter.

In FIG. 3J there is illustrated a construction practice for a multi-layer primary backing construction 122J' incorporating a three layer sandwich construction primary backing structure 114J as described in relation to FIG. 2J above in adjoined relation to a woven or nonwoven fibrous cap layer 115J. According to this practice, a pre-formed primary backing structure 114J as described in relation to FIG. 2J is covered on one side with a fibrous capping material 108J as described above in relation to FIG. 3A. The fibrous capping material 108J and the primary backing structure 114J may be adhered together at a reciprocating needle bed 109J. If desired, the resulting structure may thereafter be passed through a heated roll calender 107J operated at a temperature to effect melt fusion between fiber constituents in the various layers. The resulting primary backing construction 122J' may be collected in roll form or may be delivered directly to a station for further processing in a manner to be described further hereinafter.

In FIG. 3K there is illustrated a construction practice for a multi-layer primary backing construction 122K' incorporating a three layer sandwich construction primary backing structure 114K as described in relation to FIG. 2K above in adjoined relation to a woven or nonwoven fibrous cap layer 115K. According to this practice, a pre-formed primary backing structure 114K as described in relation to FIG. 2K is covered on one side with a fibrous capping material 108K as described above in relation to FIG. 3A. The fibrous capping material 108K and the primary backing structure 114K may be adhered together at a reciprocating needle bed 109K. If desired, the resulting structure may thereafter be passed through a heated roll calender 107K operated at a temperature to effect melt fusion between fiber constituents in the various layers. The resulting primary backing construction 122K' may be collected in roll form or may be delivered directly to a station for further processing in a manner to be described further hereinafter.

In order to provide yet additional stability in a primary backing of a carpet it is contemplated that a second woven or nonwoven fibrous layer may be applied across any of the primary backing constructions or precursor in FIGS. 3A–3K or that a first and second fibrous layer may be applied to the upper and lower surfaces of the primary backing constructions or precursors of FIGS. 2A–2K such that a fibrous capping layer is disposed on either side of the resulting structure. In FIG. 4A there is illustrated a construction practice for a multi-layer primary backing construction 122A" incorporating a primary backing structure 114A as described in relation to FIG. 2A above in adjoined sandwiching relation between two opposing woven or nonwoven fibrous cap layers 115A', 115A". According to the illustrated and potentially preferred practice, a first layer of fibrous capping material 108A' such as a preformed woven material, a preformed nonwoven material or a carded web of relatively loose, semi-aligned fibers or the like is applied across one side of a preformed primary backing structure 114A as described in relation to FIG. 2A to form one of the fibrous cap layers. A second layer of fibrous capping material 108A" such as a preformed woven material, a preformed nonwoven material or a carded web of relatively loose, semi-aligned fibers or the like is deposited across the side of the primary backing structure 114A not covered by the first layer of fibrous capping material 108A' to form the second of the fibrous cap layers. The mass per unit area of each of the fibrous cap layers is preferably in the range of about 1 to about 4 ounces per square yard and will most preferably be in the range of about 2.5 ounces per square yard.

The fibrous capping material is preferably made up predominantly of polyester fiber constituents with a lower percentage of polypropylene fiber constituents. Fibrous materials with about 80 weight percent polyester and about 20 weight percent polypropylene may be particularly preferred although ratios ranging from about 100 percent polyester to about 100 percent polypropylene are likewise contemplated. The fibrous capping layers 108A', 108A" and the primary backing structure 114A may be adhered together at one or more reciprocating needle beds 109A' arranged along the line of production. If desired, the resulting structure may thereafter be passed through a heated roll calender 107A' operated at a temperature to effect melt fusion between fiber constituents in the various layers. The resulting primary backing construction 122A" may be collected in roll form or may be delivered directly to a station for further processing in a manner to be described further hereinafter.

In FIG. 4B there is illustrated a construction practice for a multi-layer primary backing construction 122B" incorporating a primary backing structure 114B as described in relation to FIG. 2B above in adjoined sandwiching relation between two opposing woven or nonwoven fibrous cap layers 115B', 115B". According to the illustrated and potentially preferred practice, a first layer of fibrous capping material 108B' such as a preformed woven material, a preformed nonwoven material or a carded web of relatively loose, semi-aligned fibers or the like is applied across one side of a pre-formed primary backing structure 114B as described in relation to FIG. 2B to form one of the fibrous cap layers. A second layer of fibrous capping material 108B" such as a preformed woven material, a preformed nonwoven material or a carded web of relatively loose, semi-aligned fibers or the like is deposited across the side of the primary backing structure 114B not covered by the first layer of fibrous capping material 108B' and form the second of the fibrous cap layers. The mass and composition of the fibrous cap layers is contemplated to be as described in relation to FIG. 4A above. The fibrous capping layers 108B', 108B" and the primary backing structure 114B may be adhered together at one or more reciprocating needle beds 109B' arranged along the line of production. If desired, the resulting structure may thereafter be passed through a heated roll calender 107B' operated at a temperature to effect melt fusion between fiber constituents in the various layers. The resulting primary backing construction 122B" may be collected in roll form or may be delivered directly to a station for further processing in a manner to be described further hereinafter.

In FIG. 4C there is illustrated a construction practice for a multi-layer primary backing construction 122C" incorporating a primary backing structure 114C as described in relation to FIG. 2C above in adjoined sandwiching relation between two opposing woven or nonwoven fibrous cap layers 115C', 115C". According to the illustrated and potentially preferred practice, a first layer of fibrous capping material 108C' such as a preformed woven material, a preformed nonwoven material or a carded web of relatively loose, semi-aligned fibers or the like is applied across one side of a pre-formed primary backing structure 114C as described in relation to FIG. 2C to form one of the fibrous cap layers. A second layer of fibrous capping material 108C" such as a preformed woven material, a preformed nonwoven material or a carded web of relatively loose, semi-aligned fibers or the like is deposited across the side of the primary backing structure 114C not covered by the first layer of fibrous capping material 108C' and form the second of the fibrous cap layers. The mass and composition of the fibrous cap layers is contemplated to be as described in relation to FIG. 4A above. The fibrous capping layers 108C', 108C" and the primary backing structure 114C may be adhered together at one or more reciprocating needle beds 109C' arranged along the line of production. If desired, the resulting structure may thereafter be passed through a heated roll calender 107C' operated at a temperature to effect melt fusion between fiber constituents in the various layers. The resulting primary backing construction 122C" may be collected in roll form or may be delivered directly to a station for further processing in a manner to be described further hereinafter.

In FIG. 4D there is illustrated a construction practice for a multi-layer primary backing construction 122D" incorporating a primary backing structure 114D as described in relation to FIG. 2D above in adjoined sandwiching relation between two opposing woven or nonwoven fibrous cap layers 115D', 115D". According to the illustrated and potentially preferred practice, a first layer of fibrous capping material 108D' such as a preformed woven material, a preformed nonwoven material or a carded web of relatively loose, semi-aligned fibers or the like is applied across one side of a pre-formed primary backing structure 114D as described in relation to FIG. 2D to form one of the fibrous cap layers. A second layer of fibrous capping material 108D" such as a preformed woven material, a preformed nonwoven material or a carded web of relatively loose, semi-aligned fibers or the like is deposited across the side of the primary backing structure 114D not covered by the first layer of fibrous capping material 108D' and form the second of the fibrous cap layers. The mass and composition of the fibrous cap layers is contemplated to be as described in relation to FIG. 4A above. The fibrous capping layers 108D', 108D" and the primary backing structure 114D may be adhered together at one or more reciprocating needle beds 109D' arranged along the line of production. If desired, the resulting structure may thereafter be passed through a heated roll calender 107D' operated at a temperature to effect melt fusion between fiber constituents in the various layers. The resulting primary backing construction 122D" may be collected in roll form or may be delivered directly to a station for further processing in a manner to be described further hereinafter.

In FIG. 4E there is illustrated a construction practice for a multi-layer primary backing construction 122E" incorporating a primary backing structure 114E as described in relation to FIG. 2E above in adjoined sandwiching relation between two opposing woven or nonwoven fibrous cap layers 115E', 115E". According to the illustrated and potentially preferred practice, a first layer of fibrous capping material 108E' such as a preformed woven material, a preformed nonwoven material or a carded web of relatively loose, semi-aligned fibers or the like is applied across one side of a pre-formed primary backing structure 114E as described in relation to FIG. 2A to form one of the fibrous cap layers. A second layer of fibrous capping material 108E" such as a preformed woven material, a preformed nonwoven material or a carded web of relatively loose, semi-aligned fibers or the like is deposited across the side of the primary backing structure 114E not covered by the first layer of fibrous capping material 108E' and form the second of the fibrous cap layers. The mass and composition of the fibrous cap layers is contemplated to be as described in relation to FIG. 4A above. The fibrous capping layers 108E', 108E" and the primary backing structure 114E may be adhered together at one or more reciprocating needle beds 109E' arranged along the line of production. If desired, the resulting structure may thereafter be passed through a heated roll calender 107E' operated at a temperature to effect melt fusion between fiber constituents in the various layers. The resulting primary backing construction 122E" may be collected in roll form or may be delivered directly to a station for further processing in a manner to be described further hereinafter.

In FIG. 4F there is illustrated a construction practice for a multi-layer primary backing construction 122F" incorporating a primary backing structure 114F as described in relation to FIG. 2F above in adjoined sandwiching relation between two opposing woven or nonwoven fibrous cap layers 115F', 115F". According to the illustrated and potentially preferred practice, a first layer of fibrous capping material 108F' such as a preformed woven material, a preformed nonwoven material or a carded web of relatively loose, semi-aligned fibers or the like is applied across one side of a pre-formed primary backing structure 114F as described in relation to FIG. 2F to form one of the fibrous cap layers. A second layer of fibrous capping material 108F" such as a preformed woven material, a preformed nonwoven material or a carded web of relatively loose, semi-aligned fibers or the like is deposited across the side of the primary backing structure 114F not covered by the first layer of fibrous capping material 108F' and form the second of the fibrous cap layers. The mass and composition of the fibrous cap layers is contemplated to be as described in relation to FIG. 4A above. The fibrous capping layers 108F', 108F" and the primary backing structure 114F may be adhered together at one or more reciprocating needle beds 109F' arranged along the line of production. If desired, the resulting structure may thereafter be passed through a heated roll calender 107F' operated at a temperature to effect melt fusion between fiber constituents in the various layers. The resulting primary backing construction 122F" may be collected in roll form or may be delivered directly to a station for further processing in a manner to be described further hereinafter.

It is contemplated that the backing constructions or precursors 114C–114F of FIGS. 4C–4F may be inverted prior to formation of the backing constructions 122C"–122F" of FIGS. 4C–4F such as is shown in FIGS. 3C'–3F'.

In FIG. 4G, there is illustrated a construction practice for a multi-layer primary backing construction 122G" incorporating a primary backing structure 114G as described in relation to FIG. 2G above in adjoined sandwiching relation between two opposing woven or nonwoven fibrous cap layers 115G', 115G". According to the illustrated and potentially preferred practice, a first layer of fibrous capping material 108G' such as a preformed woven material, a preformed nonwoven material or a carded web of relatively loose, semi-aligned fibers or the like is applied across one side of a pre-formed primary backing structure 114G as described in relation to FIG. 2G to form one of the fibrous cap layers. A second layer of fibrous capping material 108G" such as a preformed woven material, a preformed nonwoven material or a carded web of relatively loose, semi-aligned fibers or the like is deposited across the side of the primary backing structure 114G not covered by the first layer of fibrous capping material 108G' and form the second of the fibrous cap layers. The mass and composition of the fibrous cap layers is contemplated to be as described in relation to FIG. 4A above. The fibrous capping layers 108G', 108G' and the primary backing structure 114G may be adhered together at one or more reciprocating needle beds 109G' arranged along the line of production. If desired, the resulting structure may thereafter be passed through a heated roll calender 107G' operated at a temperature to effect melt fusion between fiber constituents in the various layers. The resulting primary backing construction 122G" may be collected in roll form or may be delivered directly to a station for further processing in a manner to be described further hereinafter.

In FIG. 4H there is illustrated a construction practice for a multi-layer primary backing construction 122H" incorporating a primary backing structure 114H as described in relation to FIG. 2H above in adjoined sandwiching relation between two opposing woven or nonwoven fibrous cap layers 115H', 115H". According to the illustrated and potentially preferred practice, a first layer of fibrous capping material 108H' such as a preformed woven material, a preformed nonwoven material or a carded web of relatively loose, semi-aligned fibers or the like is applied across one side of a pre-formed primary backing structure 114H as described in relation to FIG. 2H to form one of the fibrous cap layers. A second layer of fibrous capping material 108H" such as a preformed woven material, a preformed nonwoven material or a carded web of relatively loose, semi-aligned fibers or the like is deposited across the side of the primary backing structure 114H not covered by the first layer of fibrous capping material 108H' and form the second of the fibrous cap layers. The mass and composition of the fibrous cap layers is contemplated to be as described in relation to FIG. 4A above. The fibrous capping layers 108H', 108H" and the primary backing structure 114H may be adhered together at one or more reciprocating needle beds 109H' arranged along the line of production. If desired, the resulting structure may thereafter be passed through a heated roll calender 107H' operated at a temperature to effect melt fusion between fiber constituents in the various layers. The resulting primary backing construction 122H" may be collected in roll form or may be delivered directly to a station for further processing in a manner to be described further hereinafter.

In FIG. 4I there is illustrated a construction practice for a multi-layer primary backing construction 122I" incorporating a primary backing structure 114I as described in relation to FIG. 2I above in adjoined sandwiching relation between two opposing woven or nonwoven fibrous cap layers 115I', 115I". According to the illustrated and potentially preferred practice, a first layer of fibrous capping material 108I' such as a preformed woven material, a preformed nonwoven material or a carded web of relatively loose, semi-aligned fibers or the like is applied across one side of a pre-formed primary backing structure 114B as described in relation to FIG. 2I to form one of the fibrous cap layers. A second layer of fibrous capping material 108I" such as a preformed woven material, a preformed nonwoven material or a carded web of relatively loose, semi-aligned fibers or the like is deposited across the side of the primary backing structure 114I not covered by the first layer of fibrous capping material 108I' and form the second of the fibrous cap layers. The mass and composition of the fibrous cap layers is contemplated to be as described in relation to FIG. 4A above. The fibrous capping layers 108I', 108I" and the primary backing structure 114I may be adhered together at one or more reciprocating needle beds 109I' arranged along the line of production. If desired, the resulting structure may thereafter be passed through a heated roll calender 107I' operated at a temperature to effect melt fusion between fiber constituents in the various layers. The resulting primary backing construction 122I" may be collected in roll form or may be delivered directly to a station for further processing in a manner to be described further hereinafter.

In FIG. 4J there is illustrated a construction practice for a multi-layer primary backing construction 122J" incorporating a primary backing structure 114J as described in relation to FIG. 2J above in adjoined sandwiching relation between two opposing woven or nonwoven fibrous cap layers 115J', 115J". According to the illustrated and potentially preferred practice, a first layer of fibrous capping material 108J' such as a preformed woven material, a preformed nonwoven material or a carded web of relatively loose, semi-aligned fibers or the like is applied across one side of a pre-formed primary backing structure 114J as described in relation to FIG. 2J to form one of the fibrous cap layers. A second layer of fibrous capping material 108J" such as a preformed woven material, a preformed nonwoven material or a carded web of relatively loose, semi-aligned fibers or the like is deposited across the side of the primary backing structure 114J not covered by the first layer of fibrous capping material 108J' and form the second of the fibrous cap layers. The mass and composition of the fibrous cap layers is contemplated to be as described in relation to FIG. 4A above. The fibrous capping layers 108J', 108J" and the primary backing structure 114J may be adhered together at one or more reciprocating needle beds 109J' arranged along the line of production. If desired, the resulting structure may thereafter be passed through a heated roll calender 107J' operated at a temperature to effect melt fusion between fiber constituents in the various layers. The resulting primary backing construction 122J" may be collected in roll form or may be delivered directly to a station for further processing in a manner to be described further hereinafter.

In FIG. 4K there is illustrated a construction practice for a multi-layer primary backing construction 122K" incorporating a primary backing structure 114K as described in relation to FIG. 2K above in adjoined sandwiching relation between two opposing woven or nonwoven fibrous cap layers 115K', 115K". According to the illustrated and potentially preferred practice, a first layer of fibrous capping material 108K' such as a preformed woven material, a preformed nonwoven material or a carded web of relatively loose, semi-aligned fibers or the like is applied across one side of a pre-formed primary backing structure 114K as described in relation to FIG. 2K to form one of the fibrous cap layers. A second layer of fibrous capping material 108K" such as a preformed woven material, a preformed nonwoven material or a carded web of relatively loose, semi-aligned fibers or the like is deposited across the side of the primary backing structure 114K not covered by the first layer of fibrous capping material 108K' and form the second of the fibrous cap layers. The mass and composition of the fibrous cap layers is contemplated to be as described in relation to FIG. 4A above. The fibrous capping layers 108K', 108K" and the primary backing structure 114K may be adhered together at one or more reciprocating needle beds 109K' arranged along the line of production. If desired, the resulting structure may thereafter be passed through a heated roll calender 107K' operated at a temperature to effect melt fusion between fiber constituents in the various layers. The resulting primary backing construction 122K" may be collected in roll form or may be delivered directly to a station for further processing in a manner to be described further hereinafter.

It is to be understood that while the fibrous cap layers in each of the described embodiments may preferably be formed of materials such as polyester, polypropylene or mixtures thereof, it is likewise contemplated that any number of other materials or combinations of materials including natural and/or synthetic fibers may also be utilized. In the event that the fibrous cap layers are of a generally nonwoven construction it is contemplated that such a construction may be of a needle punched construction, a hydroentangled construction, a pneumatically entangled construction, a spunbonded construction or such other nonwoven construction as may be desired. It is contemplated that a spunbonded construction wherein the fiber elements are adhered to one another at multiple points of connection through the structure may be useful in dispersing force.

It is to be understood that while the adhesion of the fibrous cap layers to the adjacent structure has been illustrated as being carried out using one or more reciprocating needle beds, other attachment mechanisms may likewise be used. By way of example only and not limitation, it is contemplated that adhesives such as hot melt adhesives, water based adhesives and the like may be used to affix the layers together. It is also contemplated that normally dry adhesives in forms such as activatable powder adhesives, scrims, fabrics, films, and the like may also be used. The use of adhesive bonding may be particularly beneficial in instances where the fibrous cap is formed from a preformed woven or nonwoven material.

As will be appreciated from the foregoing description, the primary backing structure may range from a relatively simple single layer structure of woven or nonwoven construction to a multi-layer structure incorporating one or more layers of additional stabilizing material. Once the desired primary backing construction has been obtained, a pile forming yarn is secured to the primary backing to form a primary pile fabric. A representative process for forming such a primary pile fabric is illustrated in FIG. 5A.

As shown in FIG. 5A, a primary backing designated generally as 122 which may be of any construction as shown in FIGS. 2A–2K, 3A–3K or 4A–4K as well as other suitable constructions of substantial stability is delivered to a yarn application station 117 such as a tufting station, bonding station, flocking station or the like. At the yarn application station 117 pile forming yarns 120 are attached in substantially secure relation to the primary backing 122 so as to form a pile fabric 112.

As illustrated in FIG. 5B, once the pile forming yarns are applied, the pile fabric 112 may thereafter be conveyed to a precoater 118 at which a layer of sealing precoat adhesive or tuft lock 121 such as latex, hot melt, or the like is applied across the underside. The latex or other adhesive may be cured at a curing station 119. As will be appreciated, while the precoater 118 is illustrated as a lick roller, it is contemplated that virtually any adhesive applicator may be utilized including a different roll coater, spray coater, knife coater, or the like as will be well known to those of skill in the art. It is also contemplated that the pile fabric 112 may be substantially free of any sealing precoat. Likewise, while the precoating operation is illustrated as being carried out in a separate processing line from yarn application, it is also contemplated that these processes may be performed in a continuous operation and delivered directly to a station for further processing such as jet dyeing or printing, attachment of cushion backing, cutting into carpet tiles, and the like.

It is contemplated that the backing constructions 122A–122K, 122A'–122K', and 122A"–122K" of FIGS. 2A–2K, 3A–3K, and 4A–4K may be inverted from the position shown in each of FIGS. 2A–2K, 3A–3K, 4A–4K prior to tufting as shown in FIG. 5A.

In the event that the pile fabric 112 is a tufted pile fabric, it is contemplated that a pile forming yarn 120 may be tufted through the primary backing 122 utilizing tufting techniques as are well known to those of skill in the art (FIG. 7A). The pile forming yarns 120 may assume virtually any suitable construction including by way of example only, a textured or non-textured loop pile, cut pile, or cut and loop pile construction. In a tufted construction, the pile forming yarns 120 are preferably tufted through the primary backing 122 at a stitch density of about 6 to about 18 stitches per inch, and more preferably about 9 to about 13 stitches per inch, and most preferably about 12 to about 13 stitches per inch. The pile forming yarns 120 preferably establish a pile height in the range of about 0.1 inches to about 0.6 inches, and more preferably in the range of about 0.2 inches to about 0.5 inches, and most preferably in the range of about 0.2 inches to about 0.35 inches.

In a bonded construction, the pile forming yarns are preferably present at a fold density of about 7 to about 12 folds per inch, and more preferably about 8 to about 9 folds per inch, and most preferably about 9 folds per inch. In a bonded construction, the pile height is preferably in the range of about 0.1 to about 0.4 inches, and is more preferably in the range of about 0.2 to about 0.3 inches. In a flocked surface construction, the pile forming yarn 120 is in the form of disperse elements spread across the primary backing 122 in a substantially standing orientation. In such a construction, it is contemplated that the flocked yarn elements are present at a level of about 6 to about 16 ounces per square yard with a pile height of about 0.05 to about 0.2 inches.

Once the pile fabric 112 is formed with any desired precoat, it may be used to form the upper surface of a carpet such as broadloom, area rug, runner, or the like or as the upper surface of a carpet or carpet tile such as a hard back or cushion back carpet or tile and disposed in bonded relation to a hard backing or cushioning underlayer using any number of manual or automated formation techniques. By way of example only and not limitation, in FIG. 6 there is illustrated one process for carpet formation incorporating a base or cushioning underlayer 178 such as preformed foam or other shock absorbing material such as felt, layers of fabric, or the like. According to the illustrated process, the pile fabric 112 incorporating a primary backing 122 of any of the previously described primary constructions with or without a sealing precoat adhesive 121 is bonded to the single or multi-layer underlayer 178. As shown, in this process a preformed layer of cushioning material such as polymeric cushioning foam either with or without a nonwoven or woven secondary backing layer of felt or the like is conveyed along a travel path to a coating station 193 at which a coating of adhesive material 160 such as a resilient adhesive like hot melt or latex is applied. If desired, a coating station 193' may also be incorporated to apply an adhesive 160' such as a resilient adhesive or precoat across the underside of the pile fabric. As will be appreciated, the coating stations 193, 193' may be operated either independently or in conjunction with one another to effect desired adhesive application or lamination. Likewise, the adhesives 160, 160' may be either the same or different in composition. By way of example only and not limitation, potentially preferred resilient adhesives may include hot melt adhesives such as bitumen based hot melt adhesives, polyurethane adhesives, polyethylene adhesives, thermoplastic polyolefin compositions, and combinations thereof.

Also, it is contemplated that one or both of the coating stations 193, 193' may be replaced with flame lamination equipment to effect flame lamination of the underlayer 178 to the carpet fabric 112. Further, it is to be understood that one or both of the coating stations 193, 193' may be replaced with adhesive laminating stations such as stations to apply dry adhesives, scrims, low melt fibers, films, or the like and as needed to apply liquids and/or heat to effect the desired adhesion or lamination.

The preformed pile fabric 112 as previously described is thereafter applied in overlying relation to the adhesive coated cushioning underlayer 178 at a mating calender 194 such that the adhesive material 160, 160' establishes a bond extending between the underlayer 178 and the underside of the pile fabric 112. Although the application of the adhesive material 160 is shown as being carried out using a spray coating operation, it is contemplated that the application of the adhesive material 160 may be carried out by any appropriate application system as may be known to those of skill in the art including by way of example only and not limitation, knife coating, roll coating or manual application. The joinder of the pile fabric 112 to the underlayer 178 results in the formation of a cushioned carpet designated generally as 110. The actual configuration of the cushioned carpet will, of course, depend upon the construction of the pile fabric 112 and the underlayer 178. Following the joinder of the pile fabric 112 to the underlayer 178 the cushioned carpet 110 may be subjected to any number of different operations including by way of example only, heating, cooling, steaming and dyeing or printing to impart desired appearance and physical character.

By way of example only, various carpet constructions 110A–110GG incorporating an underlayer or base 178 of preformed foam or other cushioning material including textiles and the like adhesively joined to a pile fabric 112 by an adhesive 160 are illustrated in FIGS. 7A–7GG. In each of FIGS. 7A–7GG, the pile fabric 112 includes a sealing precoat adhesive 121. However, as illustrated through reference to FIG. 8 which corresponds generally to FIG. 7A, it is likewise contemplated that in any of the configurations of FIGS. 7A–7GG the sealing precoat adhesive may be eliminated if desired. The adhesive 160 of FIG. 8 serves as the precoat and adhesive layer. While each of the constructions have been illustrated as incorporating a pile fabric of tufted loop construction, it will be appreciated that the pile fabric may likewise be of cut pile, loop and cut pile, bonded or flocked construction if desired. Likewise, while each of the constructions has been illustrated as incorporating a secondary backing 170 across the underside of the underlayer 178, it is to be appreciated that the underlayer 178 may be free of such a secondary backing if desired (FIG. 12). Alternatively, the illustrated single layer secondary backing may be replaced with a multi-layer secondary backing such as a releasable adhesive and backing sheet (FIG. 13).

The embodiment 110A illustrated in FIG. 7A with the precoat and the corresponding embodiment 110' in FIG. 8 with no precoat each incorporate a primary backing corresponding to that illustrated and described above in relation to FIG. 2A. More specifically, in the embodiment illustrated in FIGS. 7A and 8, the pile fabric 112 incorporates a single layer primary backing 122A of woven construction such as woven polyester, glass, polypropylene, stabilized polypropylene, nylon, or combinations thereof as previously described in relation to FIG. 2A.

In FIG. 7A', the carpet 110A' is of the same general configuration as that of FIG. 7A with the exception that a secondary layer of stabilizing material 118 such as woven or nonwoven glass or other stabilizing material such as woven or nonwoven polyester, woven or nonwoven nylon or woven or nonwoven stabilized polypropylene is disposed substantially at the interface between the cushioning underlayer 178 and the adhesive 160. While this arrangement is illustrated only in relation to a carpet construction incorporating a pile fabric having a single layer primary backing 122A it is to be understood that such an arrangement may be utilized in combination with carpet constructions incorporating any of the primary backings 122A–122K, 122A'–122K' and 122A"–122K", and the like. By way of example only, such a construction may arise if the cushioning underlayer is a preformed foam cast across the secondary layer of stabilizing material 118 during formation or the layers 118 and 170 may be flame laminated to the foam 178.

In FIG. 7A", the carpet 110A" is of the same general configuration as that of FIG. 7A with the exception that a secondary layer of stabilizing material 118 such as woven or nonwoven glass is disposed above the cushioning underlayer 178 in substantially embedded relationship within the adhesive 160. In this arrangement, the secondary layer of stabilizing material 118 is preferably of a nonwoven construction and is most preferably a nonwoven glass although other constructions and materials including woven or nonwoven polyester, woven or nonwoven nylon, woven or nonwoven stabilized polypropylene, and the like may also be used. While this arrangement is illustrated only in relation to a carpet construction incorporating a pile fabric having a single layer primary backing 122A it is to be understood that such an arrangement may likewise be utilized in combination with carpet constructions incorporating any of the primary backings 122A–122K, 122A'–122K', 122A"–122K", and the like. As an example, the layer 118 may be joined to the foam 178 by an adhesive 160 such as a hot melt adhesive.

In FIG. 7A''', the carpet 110A''' is of the same general configuration as that of FIG. 7A" with the exception that the backing or release layer 170 is joined to the foam 178 by an adhesive 160' such as a resilient adhesive, hot melt, or the like, and the cushioning underlayer 178A is preferably formed from so-called "rebonded" foam wherein pieces of preferably recycled foam are bonded together in a coordinated mass by a resilient polymeric binding material. Such material is described in copending U.S. patent application Ser. No. 09/993,158, filed Nov. 16, 2001, the contents of which are hereby incorporated by reference. While this arrangement is illustrated only in relation to a carpet construction incorporating a pile fabric having a single layer primary backing 122A and a secondary stabilizing layer 118 disposed in embedded relation within the adhesive 160, it is to be understood that such an underlayer of rebond foam may likewise be utilized in combination with carpet constructions incorporating any of the primary backings 122A–122K, 122A'–122K', 122A"–122K", and the like either with or without a secondary stabilizing layer. In like manner, if a secondary stabilizing layer is used it may be located at any suitable position within the carpet structure including immediately adjacent the rebond underlayer in a position substantially as illustrated in FIG. 7A'.

Although the carpet 110A''' of FIG. 7A''' is shown with a rebond foam layer 178 such as a rebond polyurethane foam, it is to be understood that the foam or cushion of each of FIGS. 7A–7GG may be a preformed rebond foam, virgin foam, or filled foam such as polyurethane foam described in above mentioned U.S. Pat. No. 6,203,881 or a rebond polyurethane foam described in patent application Ser. No. 09/993,158, or another preformed closed or open cell foam such as polyethylene, SBR, PVC, or the like. Also, the foam layer or base 178 may contain two or more layers of the same or of different foam or cushion materials.

The various embodiments illustrated in FIGS. 7B–7K incorporate the primary backing structures as described in relation to FIGS. 2B–2K respectively. In FIG. 7B, the pile fabric 112 incorporates a single layer primary backing 122B of nonwoven construction as previously described in relation to FIG. 2B. In FIG. 7C, the pile fabric 112 incorporates a primary backing construction 122C as described in relation to FIG. 2C above. In FIG. 7D, the pile fabric 112 incorporates a primary backing construction 122D as described in relation to FIG. 2D above. In FIG. 7E, the pile fabric 112 incorporates a primary backing construction 122E as described in relation to FIG. 2E above. In FIG. 7F, the pile fabric 112 incorporates a primary backing construction 122F as described in relation to FIG. 2F above. In FIG. 7G, the pile fabric 112 incorporates a multi-layer primary backing 122G as previously described in relation to FIG. 2G. In FIG. 7H, the pile fabric 112 incorporates a multi-layer primary backing 122H as previously described in relation to FIG. 2H. In FIG. 7I, the pile fabric 112 incorporates a multi-layer primary backing 122I as previously described in relation to FIG. 2I. In FIG. 7J, the pile fabric 112 incorporates a multi-layer primary backing 122J as previously described in relation to FIG. 2J. In FIG. 7K, the pile fabric 112 incorporates a multi-layer primary backing 122K as previously described in relation to FIG. 2K. Of course it is to be understood that the primary backing may be inverted and that in any embodiment incorporating a multi-layer primary backing it is contemplated that the relative position of the primary backing components may be reversed if desired.

The embodiments illustrated in FIGS. 7L–7V incorporate primary backings including a fibrous cap of fibrous woven or nonwoven material across one side as illustrated and described in relation to FIGS. 3A–3K respectively. More specifically, in the embodiment illustrated in FIG. 7L, the pile fabric 112 incorporates a primary backing construction 122A' as described in relation to FIG. 3A above. In the embodiment illustrated in FIG. 7M, the pile fabric 112 incorporates a primary backing construction 122B' as described in relation to FIG. 3B above. In the embodiment illustrated in FIG. 7N, the pile fabric 112 incorporates a primary backing construction 122C' as described in relation to FIG. 3C above. In the embodiment illustrated in FIG. 7O, the pile fabric 112 incorporates a primary backing construction 122D' as described in relation to FIG. 3D above. In the embodiment illustrated in FIG. 7P, the pile fabric 112 incorporates a primary backing construction 122E' as described in relation to FIG. 3E. In the embodiment illustrated in FIG. 7Q, the pile fabric 112 incorporates a primary backing construction 122F' as described in relation to FIG. 3F. In the embodiment illustrated in FIG. 7N', the pile fabric 112 incorporates a primary backing construction 122C' as described in relation to FIG. 3C' above. In the embodiment illustrated in FIG. 7O', the pile fabric incorporates a primary backing construction 122D' as described in relation to FIG. 3D' above. In the embodiment illustrated in FIG. 7P', the pile fabric 112 incorporates a primary backing construction 122E' as described in relation to FIG. 3E'. In the embodiment illustrated in FIG. 7Q', the pile fabric 112 incorporates a primary backing construction 122F' as described in relation to FIG. 3F'. In the embodiment illustrated in FIG. 7R, the pile fabric 112 incorporates a primary backing construction 122G' as described in relation to FIG. 3G. In the embodiment illustrated in FIG. 7S, the pile fabric 112 incorporates a primary backing construction 122H' as described in relation to FIG. 3H. In the embodiment illustrated in FIG. 7T, the pile fabric 112 incorporates a primary backing construction 122I' as described in relation to FIG. 3I. In the embodiment illustrated in FIG. 7U, the pile fabric 112 incorporates a primary backing construction 122J' as described in relation to FIG. 3J. In the embodiment illustrated in FIG. 7V, the pile fabric 112 incorporates a primary backing construction 122K' as described in relation to FIG. 3K. Of course it is to be understood that the primary backing may be inverted and that in any embodiment incorporating a multi-layer primary backing it is contemplated that the relative position of the primary backing components may be reversed if desired.

The embodiments illustrated in FIGS. 7W–7GG incorporate primary backings including a fibrous cap of fibrous woven or nonwoven material across two sides as illustrated and described in relation to FIGS. 4A–4K respectively.

More specifically, in the embodiment illustrated in FIG. 7W, the pile fabric 112 incorporates a primary backing construction 122A" as described in relation to FIG. 4A above. In the embodiment illustrated in FIG. 7X, the pile fabric 112 incorporates a primary backing construction 122B" as described in relation to FIG. 4B above. In the embodiment illustrated in FIG. 7Y, the pile fabric 112 incorporates a primary backing construction 122C" as described in relation to FIG. 4C above. In the embodiment illustrated in FIG. 7Z, the pile fabric 112 incorporates a primary backing construction 122D" as described in relation to FIG. 4D above. In the embodiment illustrated in FIG.

7AA, the pile fabric 112 incorporates a primary backing construction 122E" as described in relation to FIG. 4E. In the embodiment illustrated in FIG. 7BB, the pile fabric 112 incorporates a primary backing construction 122F" as described in relation to FIG. 4F. In the embodiment illustrated in FIG. 7CC, the pile fabric 112 incorporates a primary backing construction 122G" as described in relation to FIG. 4G. In the embodiment illustrated in FIG. 7DD, the pile fabric 112 incorporates a primary backing construction 122H" as described in relation to FIG. 4H. In the embodiment illustrated in FIG. 7EE, the pile fabric 112 incorporates a primary backing construction 122I" as described in relation to FIG. 4I. In the embodiment illustrated in FIG. 7FF, the pile fabric 112 incorporates a primary backing construction 122J" as described in relation to FIG. 4J. In the embodiment illustrated in FIG. 7GG the pile fabric 112 incorporates a primary backing construction 122K" as described in relation to FIG. 4K. Of course it is to be understood that the primary backing may be inverted and that in any embodiment incorporating a multi-layer primary backing it is contemplated that the relative position of the primary backing components may be reversed if desired.

While carpet constructions including those illustrated in FIGS. 7A–7GG either with or without a precoat layer may be formed utilizing relatively simple assembly processes such as illustrated and described above in relation to FIG. 6, it is contemplated that in some instances a degree of efficiency may be realized by utilizing in-situ or in-line processes for formation of the cushioning foam layers and adherence to the pile fabric. Referring to FIG. 9, an apparatus 100 for forming a cushion backed carpet or composite is shown. According to the illustrated exemplary process, a primary carpet fabric in the form of a pile fabric designated generally as 112 formed from pile forming yarn held in place at a primary backing as previously described in relation to any of FIGS. 2A–2K, 3A–3K and 4A–4K is laid into a mass of a polymeric foam-forming polymer 178 to form a carpet construction designated generally as 210.

As illustrated, during formation the pile fabric 112 is conveyed by means of a plurality of rolls through an accumulator 150 and on to a mating roll 180. If desired, a roll coater 181 may be used to apply a layer of adhesive 121 or 160 as previously described. Thus, it is to be appreciated that while various embodiments will hereinafter be illustrated as having only a single precoat layer 121 below the primary backing, that one or more additional layers of adhesive may extend away from the primary backing of the pile fabric 112 to the cushioning underlayer.

Simultaneous with the conveyance of the primary carpet fabric 112 to the mating roll 180, a woven or nonwoven secondary backing material 170 in the form of a single layer or multi-layer composite is passed through a scray 172 to a polymer application unit 175 which preferably includes a polymer discharge unit 176 and a doctor blade 177. The backing material 170 is coated with a mass of a foam forming polymer 178 such as a polyurethane-forming composition as disclosed more fully below.

According to one exemplary practice, the secondary backing material 170 is woven or nonwoven textile sheet including, for example, about 0% to 100% polyester with the remainder being polypropylene. Most preferably the secondary backing is a 50% polyester, 50% polypropylene nonwoven fibrous material or felt. While this represents the backing material of preference, it is to be understood that any number of alternative compositions may likewise be utilized as dictated by requirements regarding shrinkage and installation. Alternative secondary backing materials include woven or nonwoven polyester, polyester and polypropylene blends, polypropylene, or stabilized polypropylene. By way of example only, in instances where very little or no shrinkage may be tolerated, the backing material may be up to 100% polyester or 100% stabilized polypropylene. Further, while a nonwoven backing material may be preferred, it is contemplated that either woven or nonwoven constructions may be utilized as can materials other than the polyester/polypropylene mix such as nylon, fiberglass, and the like.

As indicated, in the illustrated practice, the polymer application unit 175 applies a deposit of a foam forming polymer 178 to the backing material 170 after which the height of the polymer is doctored to a desired level. According to one practice and as described in above mentioned U.S. Pat. No. 6,203,881, the polymer applied is a polyurethane-forming composition based on a so-called soft segment pre-polymer of MDI (diphenylmethane diisocyanate) or an MDI derivative. The polyurethane-forming composition also preferably incorporates a silicone surfactant to improve both the frothability and stability of the polyurethane layer or "puddle" which is spread across the surface of the backing material 170. The foam density is preferably in the range of about 6 to about 20 lbs. per cubic foot (most preferably about 15 lbs. per cubic foot) with a thickness of about 0.04 to about 0.20 inches (preferably about 0.1 inches). However, it is contemplated that such levels may vary greatly depending upon desired product characteristics.

It is contemplated that the foam forming polymer material may be the subject of a broad range of alternatives. By way of example only and not limitation, at least four options or examples of the foam forming polymer are believed to be viable to yield commercially acceptable foam products using polyurethane.

1) Use of a standard filled Polyurethane system. One polyurethane foam contains 110 parts of filler such as calcium carbonate and is applied at a density of about 15 lbs/cu. ft. If the thickness is in the range of 0.04–0.12 and we determine polymer weight only, using the density and filler levels above, the weight range of the polymer would be in the rang of about 4.3 oz/sq yd to about 13.00 oz/sq yd.

2) A second option is to increase the filler level to about 190 parts and reduce the density to about 13 lbs/cu. ft. At the same thickness limits the polymer weights would then be in the range of about 2.7 oz/sq.yd. to about 8.2 oz/sq. yd.

3) A third option is to use an unfilled polyurethane (Prime urethane) system. High densities such as above are not possible with prime however, they perform because of the wall structure and the fact that no filler is present. A prime having a density of 6 lbs/cu. ft. applied at the thickness levels set forth above yields a polymer weight in the range of about 2.9 oz/sq.yd. to about 8.6 oz/sq. yd.

4) A fourth option is to utilize a polyurethane system believed to be available from available from Textile Rubber and Chemical Company under the trade designation KANGAHIDE which has only 15 parts of a filler material and is applied at 6–9 lb/cu. ft. density, if a polymer calculation is again made at the described thickness limits it would be in the range of about 4.3–13.0 oz/sq. yd.

Although the above examples have to do with chemically blown polyurethane, it is contemplated that a water based foam system can also be used.

One potential polyurethane-forming composition for use in the present invention is disclosed in U.S. Pat. No. 5,104,693 to Jenkines the teachings of which are incorporated herein by reference. Specifically, the preferred polyurethane-forming composition which is applied across the surface of the secondary backing material 170 includes:

A. At least one isocyanate-reactive material having an average equivalent weight of about 1000 to about 5000;
B. An effective amount of blowing agent; and
C. A polyisocyanate in an amount to provide an isocyanate index of between about 90 and about 130, wherein at least 30 percent by weight of such polyisocyanate is a soft segment pre-polymer reaction product of a stoichiometric excess of diphenylmethane diisocyanate (MDI) or a derivative thereof and an isocyanate-reactive organic polymer having an equivalent weight of from about 500 to about 5,000 and wherein the prepolymer has an NCO content of about 10 to about 30 percent by weight.

The polyurethane-forming composition also preferably contains a silicone surfactant to improve frothability and stability in the form of an Organo-silicone polymer such as disclosed generally in U.S. Pat. No. 4,022,941 to Prokai et al. the teachings of which are incorporated herein by reference. Specifically, the preferred surfactant is preferably a linear siloxanepolyoxyalkylene (AB) block copolymer and specifically a polyalkyleneoxidemethylsiloxane copolymer. One such silicone surfactant which is particularly useful is available under the trade designation L-5614 from OSI Specialties, Inc. whose business address is believed to be 6525 Corners Parkway, Suite 311, Norcross, Ga. 30092.

A sufficient level of the silicone surfactant is used to stabilize the cells of the foaming reaction mixture until curing occurs to allow the pile fabric 112 forming the primary carpet fabric to be laid into the uncured polyurethane-forming composition puddle without destabilizing the layer of such polyurethane-forming composition disposed across the surface of the secondary backing material 170. In general, the silicone surfactants are preferably used in amounts ranging from about 0.01 to about 2 parts per hundred parts by weight of component (A) and more preferably from about 0.35 parts to about 1.0 parts by weight of component (A) and most preferably from about 0.4 to 0.75 parts per hundred parts by weight of component (A).

As previously indicated, after disposition of the polyurethane-forming polymer across the secondary backing material 170 the layer or "puddle" of the polymer deposited is preferably doctored to a pre-determined height by means of a doctor blade 177 located at the polymer application unit 175. While a simple mechanical doctor blade is illustrated, alternative equivalent means such as an air knife or the like may also be used. Such an air knife is disclosed, for example, in U.S. Pat. No. 4,512,831 to Tillotson (incorporated by reference herein).

As illustrated, according to one practice it is contemplated that the pile fabric 112 can be laid directly into the polyurethane-forming composition immediately after it is doctored to the appropriate level (FIG. 10A). Accordingly, the pile fabric 112 and the secondary backing material 170 with the applied polyurethane-forming composition may be simultaneously delivered at room temperature to the mating roll 180 immediately following the application and doctoring of the polyurethane-forming composition. As will be appreciated, this avoidance of lag time between formation of the components of the cushioned carpet composite permits highly efficient processing readily controllable either manually or by computer control means (not shown) as are well known to those of skill in the art. If desired, it is contemplated that the underside of the pile fabric 112 may be slightly preheated to improve operating control during lamination and curing but such preheat is not essential to formation of the desired product.

Once the pile fabric 112 has been laid into the doctored layer of foam forming polymer 178, the resulting composite 168 may be heated in a heating unit or oven 182 by means of conduction, radiant, or convection heaters as are well known in the art. Contact conduction heaters may be preferred. Such heating may be carried out at a temperature of between about 250° F. and about 325° F. for between about 2 minutes and 8 minutes.

Following the heat curing operation, the final cushioned carpet composite that is formed may be cooled at a cooling unit 185 to fix dimensional character. The resultant carpet composite 210 that is formed may thereafter be rolled and used in a broadloom form or cut to a tile geometry for stacking on pallets and subsequent installation.

By way of example only and not limitation, it is contemplated that the production process as illustrated in FIG. 9 may be used in the production of carpet incorporating surface forming pile fabrics incorporating any of the stabilized primary backings previously described. It is also contemplated that such carpet may incorporate secondary backings of a number of different configurations or no secondary backing at all.

By way of example, in FIGS. 10A, 10A' and 10A" there is illustrated a series of carpet constructions 210A, 210A' and 210A" corresponding respectively to those illustrated in FIGS. 7A, 7A' and 7A" but which have been preferably formed by an in-situ or in-line process such as shown in FIG. 9. More specifically, in the embodiment illustrated in FIG. 10A, the pile fabric 112 within the carpet 210A incorporates a single layer primary backing 122A of woven construction such as woven polyester, glass, polypropylene, stabilized polypropylene, nylon, or combinations thereof as previously described in relation to FIG. 2A. In FIG. 10A' the carpet 210A' is of the same general configuration as that of FIG. 10A with the exception that a secondary layer of stabilizing material 118 such as woven or nonwoven glass or other stabilizing material such as woven or nonwoven polyester, woven or nonwoven nylon or woven or nonwoven stabilized polypropylene is disposed substantially at the surface of the cushioning underlayer 178 and the adhesive 160. The carpet construction or composite 210A' may be formed, for example, as described in above mentioned U.S. Pat. No. 6,203,881, by placing the foam composition on the backing 170, adhering the stabilizing material 118 to the carpet 112 using adhesive 121, and then curing the composite with the stabilizing layer 118 in contact with the foam composition. Also, a layer of adhesive 160 may be added between precoat 121 and stabilizing layer 118. Alternatively, the carpet 210A' may be formed by placing the foam composition on backing 170, laying the stabilizing layer 118 into the foam composition, at least partially curing the foam composition, and then joining the carpet 112 to the stabilizing material 118 with precoat 121 and/or an adhesive layer 160. While this arrangement is illustrated only in relation to a carpet construction incorporating a pile fabric having a single layer primary backing 122A it is to be understood that such an arrangement may be utilized in combination with carpet constructions incorporating any of the primary backings 122A–122K, 122A'–122K', 122A"–122K" and the like.

In FIG. 10A", the carpet 210A" is of the same general configuration as that of FIG. 10A with the exception that a secondary layer of stabilizing material 118 such as woven or nonwoven glass is disposed above the cushioning underlayer 178 in substantially embedded relationship within an adhesive layer 160. In this arrangement, the secondary layer of stabilizing material 118 is preferably of a nonwoven construction and is most preferably a nonwoven glass although other constructions and materials including woven or nonwoven polyester, woven or nonwoven nylon, woven or nonwoven stabilized polypropylene, and the like may also be used. While this arrangement is illustrated only in relation to a carpet construction incorporating a pile fabric having a single layer primary backing 122A it is to be understood that such an arrangement may likewise be utilized in combination with carpet constructions incorporating any of the primary backings 122A–122K, 122A'–122K', 122A"–122K", and the like.

The various embodiments illustrated in FIGS. 10B–10K incorporate the primary backing structures as described in relation to FIGS. 2B–2K respectively. In FIG. 10B, the pile fabric 112 incorporates a single layer primary backing 122B of nonwoven construction as previously described in relation to FIG. 2B. In FIG. 10C, the pile fabric 112 incorporates a primary backing construction 122C as described in relation to FIG. 2C above. In FIG. 10D, the pile fabric 112 incorporates a primary backing construction 122D as described in relation to FIG. 2D above. In FIG. 10E, the pile fabric 112 incorporates a primary backing construction 122E as described in relation to FIG. 2E above. In FIG. 10F, the pile fabric 112 incorporates a primary backing construction 122F as described in relation to FIG. 2F above. In FIG. 10G, the pile fabric 112 incorporates a multi-layer primary backing 122G as previously described in relation to FIG. 2G. In FIG. 10H, the pile fabric 112 incorporates a multi-layer primary backing 122H as previously described in relation to FIG. 2H. In FIG. 10I, the pile fabric 112 incorporates a multi-layer primary backing 122I as previously described in relation to FIG. 2I. In FIG. 10J, the pile fabric 112 incorporates a multi-layer primary backing 122J as previously described in relation to FIG. 2J. In FIG. 10K, the pile fabric 112 incorporates a multi-layer primary backing 122K as previously described in relation to FIG. 2K. Of course it is to be understood that the primary backing may be inverted and that in any embodiment incorporating a multi-layer primary backing it is contemplated that the relative position of the primary backing components may be reversed if desired. Likewise it is to be understood that one or more layers of adhesive such as a hot melt adhesive or the like may extend between the primary backing and the cushioning underlayer.

The embodiments illustrated in FIGS. 10L–10V incorporate primary backings including a fibrous cap of fibrous woven or nonwoven material across one side as illustrated and described in relation to FIGS. 3A–3K respectively. More specifically, in the embodiment illustrated in FIG. 10L, the pile fabric 112 incorporates a primary backing construction 122A' as described in relation to FIG. 3A above. In the embodiment illustrated in FIG. 10M, the pile fabric 112 incorporates a primary backing construction 122B' as described in relation to FIG. 3B above. In the embodiment illustrated in FIG. 10N, the pile fabric 112 incorporates a primary backing construction 122C' as described in relation to FIG. 3C above. In the embodiment illustrated in FIG. 10O, the pile fabric 112 incorporates a primary backing construction 122D' as described in relation to FIG. 3D above. In the embodiment illustrated in FIG. 10P, the pile fabric 112 incorporates a primary backing construction 122E' as described in relation to FIG. 3E. In the embodiment illustrated in FIG. 10Q, the pile fabric 112 incorporates a primary backing construction 122F' as described in relation to FIG. 3F. In the embodiment illustrated in FIG. 10N', the pile fabric 112 incorporates a primary backing construction 122C' as described in relation to FIG. 3C' above. In the embodiment illustrated in FIG. 10O', the pile fabric 112 incorporates a primary backing construction 122D' as described in relation to FIG. 3D' above. In the embodiment illustrated in FIG. 10P', the pile fabric 112 incorporates a primary backing construction 122E' as described in relation to FIG. 3E'. In the embodiment illustrated in FIG. 10Q', the pile fabric 112 incorporates a primary backing construction 122F' as described in relation to FIG. 3F'. In the embodiment illustrated in FIG. 10R, the pile fabric 112 incorporates a primary backing construction 122G' as described in relation to FIG. 3G. In the embodiment illustrated in FIG. 10S, the pile fabric 112 incorporates a primary backing construction 122H' as described in relation to FIG. 3H. In the embodiment illustrated in FIG. 10T, the pile fabric 112 incorporates a primary backing construction 122I' as described in relation to FIG. 3I. In the embodiment illustrated in FIG. 10U, the pile fabric 112 incorporates a primary backing construction 122J' as described in relation to FIG. 3J. In the embodiment illustrated in FIG. 10V, the pile fabric 112 incorporates a primary backing construction 122K' as described in relation to FIG. 3K. Of course it is to be understood that the primary backing may be inverted and that in any embodiment incorporating a multi-layer primary backing it is contemplated that the relative position of the primary backing components may be reversed if desired. Likewise it is to be understood that one or more layers of adhesive such as a hot melt adhesive or the like may extend between the primary backing and the cushioning underlayer.

The embodiments illustrated in FIGS. 10W–10GG incorporate primary backings including a fibrous cap of fibrous woven or nonwoven material across two sides as illustrated and described in relation to FIGS. 4A–4K respectively. More specifically, in the embodiment illustrated in FIG. 10W, the pile fabric 112 incorporates a primary backing construction 122A" as described in relation to FIG. 4A above. In the embodiment illustrated in FIG. 10X, the pile fabric 112 incorporates a primary backing construction 122B" as described in relation to FIG. 4B above. In the embodiment illustrated in FIG. 10Y, the pile fabric 112 incorporates a primary backing construction 122C" as described in relation to FIG. 4C above. In the embodiment illustrated in FIG. 10Z, the pile fabric 112 incorporates a primary backing construction 122D" as described in relation to FIG. 4D above. In the embodiment illustrated in FIG. 10AA, the pile fabric 112 incorporates a primary backing construction 122E" as described in relation to FIG. 4E. In the embodiment illustrated in FIG. 10BB, the pile fabric 112 incorporates a primary backing construction 122F" as described in relation to FIG. 4F. In the embodiment illustrated in FIG. 10CC, the pile fabric 112 incorporates a primary backing construction 122G" as described in relation to FIG. 4G. In the embodiment illustrated in FIG. 10DD, the pile fabric 112 incorporates a primary backing construction 122H" as described in relation to FIG. 4H. In the embodiment illustrated in FIG. 10EE, the pile fabric 112 incorporates a primary backing construction 122I" as described in relation to FIG. 4I. In the embodiment illustrated in FIG. 10FF, the pile fabric 112 incorporates a primary backing construction 122J" as described in relation to FIG. 4J. In the embodiment illustrated in FIG. 10GG the pile fabric 112 incorporates a primary backing construction 122K" as described in relation to FIG. 4K. Of course it is to be understood that the primary backing may be inverted and that in any embodiment incorporating a multi-layer primary backing it is contemplated that the relative position of the primary backing components may be reversed if desired. Likewise it is to be understood that one or more layers of adhesive such as a hot melt adhesive or the like may extend between the primary backing and the cushioning underlayer.

For any of the constructions illustrated in FIGS. 7A–7GG and 10A–10GG, it is contemplated that the adhesive precoat 121 may be eliminated if desired provided that an adequate locking relation has been established between the pile forming yarns 120 and the primary backing (FIG. 8). By way of example only, it is contemplated that such an adequate locking relationship may be established by use of spunbonded or other nonwoven constituents within the primary backing. It is also contemplated that such a locking relationship may be obtained by melt fusing a portion of the fiber constituents within the primary backing to the yarns 120. This melt fusion may be effected by passing the face forming pile fabric through a heating unit prior to application of the foam underlayer thereby anchoring the yarns in place. Such melt fusion may be facilitated by the incorporation of polypropylene constituent fibers, low melt polyester fibers, low melt acrylic fibers, or other relatively low melting point constituents such as powders, scrims, films, or the like within the primary backing due to the fact that the low melting point of such material which is substantially below that of standard pile forming nylon 6,6 yarn. Thus, melt fusion may be carried out by heating the pile fabric to a temperature above the melting point of the polypropylene constituent fibers but below the melting point of the yarn such that the yarn is locked in place without being damaged at the outer pile face.

As previously indicated, in addition to the ability to construct the face forming pile fabric to incorporate various primary backings with or without a precoat adhesive, it is also contemplated that the underside of the carpet may be the subject of a wide range of alternative constructions. By way of example only, in FIG. 11, there is illustrated a carpet construction 310 corresponding generally to that illustrated in FIG. 10A but including a secondary adhesive layer 171 of hot melt or other suitable resilient adhesives located intermediate the cushioning underlayer 178 and a secondary backing 170 as previously described. The thickness of such adhesive 171 is preferably not greater than about 0.05 inches and will most preferably be about 0.015 inches or less. As will be appreciated, such a construction may be useful in the event that the cushioning underlayer 178 is in the form of a polymeric foam cast as an independent element separate from the secondary backing.

In the embodiment illustrated in FIG. 11, the pile fabric 112 includes yarns 120 tufted through a primary backing 122 formed exclusively of a single layer primary backing construction as described in relation to FIG. 2A. However, it is to be understood that any of the stable primary backing constructions as illustrated and described in relation to any of FIGS. 2A–2K, 3A–3K and 4A–4K may likewise be utilized either with or without a precoat adhesive and/or an additional adhesive layer if desired.

In FIG. 12, there is illustrated a simplified carpet construction 410 corresponding generally to that illustrated in FIG. 8 or FIG. 10A but excluding any secondary backing. As will be appreciated, such a construction may be useful in a so called "free lay" or adhesive free installation where the underside of the cushioning underlayer 178 is in contacting relation with the flooring surface being covered. In the embodiment illustrated in FIG. 12, the pile fabric 112 includes yarns 120 tufted through a primary backing 122 formed exclusively of a single layer primary backing as described above in relation to FIG. 2A. However, it is to be understood that any of the stable primary backing constructions as illustrated and described in relation to any of FIGS. 2A–2K, 3A–3K, and 4A–4K may likewise be utilized either with or without a precoat adhesive 121 and/or an additional adhesive layer if desired.

In FIG. 13, there is illustrated yet another exemplary carpet construction 510 corresponding generally to that illustrated in FIG. 10A but including a releasable adhesive layer 187 disposed at a position below the secondary backing 170 such that the secondary backing 170 is disposed intermediate the foam or other cushioning underlayer 178 and the releasable adhesive layer. The releasable adhesive layer 187 may be accessed by a peel away strip, film or sheet 189 of a material such as paper, plastic, or the like. As will be appreciated, the releasable adhesive is relatively weak when subjected to shear forces thereby permitting the peel away strip to be readily removed during installation. However, upon placement of the carpet construction 510 such as a carpet tile across a flooring surface, the releasable adhesive layer 187 is nonetheless of sufficient strength to prevent undesired slippage. The thickness of such releasable adhesive is preferably not greater than about 0.03 inches and will most preferably be about 0.01 inches or less. In the embodiment illustrated in FIG. 13, the pile fabric 112 includes yarns 120 tufted through a primary backing 122 formed exclusively of a single layer primary backing as described in relation to FIG. 2A. However, it is to be understood that any of the stable primary backing constructions as illustrated and described in relation to any of FIGS. 2A–2K, 3A–3K, and 4A–4K may likewise be utilized ether with or without a precoat adhesive 121 and/or an additional adhesive layer if desired.

While the formation process and related equipment has been illustrated and described in terms of a series of substantially discrete processes carried out at different locations, it is contemplated that the apparatus of the present invention may include the entire assembly process from forming the primary backing, applying the pile forming yarn to the primary backing, precoating the resulting pile fabric, foam coating the secondary backing, laminating the pile fabric to the foam, heating or curing the laminate, and cutting the resultant carpet composite into carpet tiles, runners, area rugs, or the like and packaging the resulting products. Also, it is contemplated that in accordance with the present invention the process may be broken down into its respective steps and done in a batch rather than a continuous mode, although the continuous mode of operation may be preferred. Further, the overall process may include jet dyeing (whether direct or indirect jet) or printing to produce a color, design and/or pattern on the carpet face. The carpet may be dyed or printed in broadloom form following tufting or following backing, and/or in piece form following the cutting of the backed composite into piece goods such as individual carpet tiles. Still further, the color, design and/or pattern may be tufted into the carpet using solution dyed yarns, yarn dyed yarns, graphics tufting, textured tufting, over dyeing, flood dyeing, and/or the like. If the yarn of the face of the carpet is to be dyed or printed, it is preferred that the yarn be white, off white, a light color, spaced dyed, multi-colored, or the like.

It has been found that a composite carpet constructions as illustrated and described is characterized by excellent dimensional stability. For example, as described in above mentioned U.S. patent applications Ser. Nos. 10/036,604, 10/038,8334, and 10/027,626, a primary backing of low-shrink stabilized polypropylene provides a structure with substantially no shrinkage. Such dimensional stability of the primary backing relieves the necessity for a second stabilizing layer in the carpet construction or composite. A primary backing having dimensional stability with respect to bow, bias, skew, shrinkage, stretch, elongation, and the like is provided in accordance with selected examples or embodiments of the present invention. For example, a preferred primary backing includes at least one layer of woven or nonwoven stabilized polypropylene, glass (or fiberglass), nylon, polyester, and/or the like. Further, it is more preferred that the primary backing have at least one layer of nonwoven stabilized polypropylene, glass, nylon, polyester, and/or the like.

In accordance with at least one embodiment of the present invention, there is provided a primary backing or tufting substrate of one or more woven or nonwoven layers and which performs as a tufting substrate, provides dimensional stability at least as stable as conventional products, provides for tuft lock at least as strong as conventional products, provides for tufting without undue harm to the tufting yarn, allows for graphics tufting, allows for jet dyeing or screen printing of the resultant carpet, and/or the like. By way of example only, a carpet incorporating a stabilized primary backing with glass held in sandwiched relation between layers of stabilized polypropylene as illustrated in relation to FIG. 7J is characterized by substantially no shrinkage and by bow and bias deformation of less than about ⅛ inch per 36 inches.

In accordance with one example, it is preferred for the primary backing to have substantially no shrinkage, bow, bias, stretch, elongation, and/or skew. In accordance with another example of the present invention, it is preferred for the primary backing to have a shrinkage, bow, bias, stretch, elongation, and/or skew of less than 5%, more preferably less than 3%, and most preferably less than 1%, when subjected to processing, testing, and/or use, for example, when subjected to jet dyeing and associated humidity and heat.

It is, of course, to be appreciated that while several potentially preferred embodiments, procedures and practices have been shown and described, the invention is in no way to be limited thereto, since modifications may be made and other embodiments of the principles of this invention will occur to those skilled in the art to which this invention pertains. Therefore, it is contemplated by the appended claims to cover any such modifications and other embodiments as may incorporate the features of this invention within the true spirit and scope thereof.

What is claimed is:

1. A carpet construction or composite including a surface forming pile fabric, wherein the pile fabric comprises:
    a pile surface formed from a plurality of yarn elements; and
a primary backing disposed in underlying relation to the pile surface, wherein at least a portion of the yarn elements are tufted through the primary backing and wherein the primary backing comprises a multi-layer composite structure of sandwich construction comprising a pair of opposing layers of nonwoven construction and at least one additional layer disposed intermediate the opposing layers wherein at least one of the opposing layers is a spun bonded nonwoven construction and wherein said at least one additional layer comprises woven stabilized polypropylene containing a nucleating agent.

2. The carpet as recited in claim 1, wherein at least one of the opposing layers is a spun bonded nonwoven construction of intermingled fiber elements of polyester and including a plurality of fusion bonding points between the intermingled fiber elements.

3. The carpet as recited in claim 1, wherein at least one of the opposing layers is a spun bonded nonwoven construction of intermingled fiber elements of stabilized polypropylene containing a nucleating agent and including a plurality of fusion bonding points between the intermingled fiber elements.

4. The carpet as recited in claim 1, wherein said carpet is a carpet tile.

5. The carpet as recited in claim 4, wherein the carpet tile comprises a foam cushion layer disposed at a position below the primary backing.

6. The carpet as recited in claim 5, wherein the foam cushion layer comprises rebond foam.

7. The carpet recited in claim 5, wherein a bonding layer consisting essentially of at least one adhesive extends in bridging relation between the primary backing and the foam cushion layer such that the bonding layer directly contacts the primary backing and the foam cushion layer.

8. The carpet as recited in claim 5 wherein a bridging composite is disposed between the primary backing and the foam cushion layer, wherein the bridging composite comprises at least one layer of adhesive and a glass stabilizing layer.

9. The carpet as recited in claim 8, wherein the glass stabilizing layer is disposed in contacting relation with an upper surface of the foam cushion layer.

10. The carpet as recited in claim 8, wherein the glass stabilizing layer is substantially encapsulated within said at least one layer of adhesive at a position intermediate the primary backing and the foam cushion layer.

11. A carpet construction or composite including a surface forming pile fabric, wherein the pile fabric comprises:
    a pile surface formed from a plurality of yarn elements; and
a primary backing disposed in underlying relation to the pile surface, wherein at least a portion of the yarn elements are tufted through the primary backing and wherein the primary backing comprises a multi-layer composite structure of sandwich construction comprising a pair of opposing layers of nonwoven construction and at least one additional layer disposed intermediate the opposing layers wherein at least one of the opposing layers is a spun bonded nonwoven construction and wherein said at least one additional layer comprises nonwoven stabilized polypropylene containing a nucleating agent.

12. The carpet as recited in claim 11, wherein at least one of the opposing layers is a spun bonded nonwoven construction of intermingled fiber elements of polyester and including a plurality of fusion bonding points between the intermingled fiber elements.

13. The carpet as recited in claim 11, wherein at least one of the opposing layers is a spun bonded nonwoven construction of intermingled fiber elements of stabilized polypropylene containing a nucleating agent and including a plurality of fusion bonding points between the intermingled fiber elements.

14. The carpet as recited in claim 11, wherein said carpet is a carpet tile.

15. The carpet as recited in claim 14, wherein the carpet tile comprises a foam cushion layer disposed at a position below the primary backing.

16. The carpet as recited in claim 15, wherein the foam cushion layer comprises rebond foam.

17. The carpet as recited in claim 15, wherein a bonding layer consisting essentially of at least one adhesive extends in bridging relation between the primary backing and the foam cushion layer such that the bonding layer directly contacts the primary backing and the foam cushion layer.

18. The carpet as recited in claim 15 wherein a bridging composite is disposed between the primary backing and the foam cushion layer, wherein the bridging composite comprises at least one layer of adhesive and a glass stabilizing layer.

19. The carpet as recited in claim 18, wherein the glass stabilizing layer is disposed in contacting relation with an upper surface of the foam cushion layer.

20. The carpet as recited in claim 18, wherein the glass stabilizing layer is substantially encapsulated within said at least one layer of adhesive at a position intermediate the primary backing and the foam cushion layer.

21. A carpet construction or composite including a surface forming pile fabric, wherein the pile fabric comprises:

a pile surface formed from a plurality of yarn elements; and a primary backing disposed in underlying relation to the pile surface, wherein at least a portion of the yarn elements are tufted through the primary backing and wherein the primary backing comprises a multi-layer composite structure of sandwich construction comprising a pair of opposing layers of nonwoven construction and at least one additional layer of glass disposed intermediate the opposing layers and wherein at least one of the opposing layers is a spun bonded nonwoven construction of intermingled fiber elements of stabilized polypropylene containing a nucleating agent and including a plurality of fusion bonding points between the intermingled fiber elements.

22. The carpet as recited in claim 21, wherein said at least one additional layer comprises nonwoven glass.

23. The carpet as recited in claim 21, wherein said carpet is a carpet tile.

24. The carpet as recited in claim 23, wherein the carpet tile comprises a foam cushion layer disposed at a position below the primary backing.

25. The carpet as recited in claim 24, wherein the foam cushion layer comprises rebond foam.

26. The carpet as recited in claim 24, wherein a bonding layer consisting essentially of at least one adhesive extends in bridging relation between the primary backing and the foam cushion layer such that the bonding layer directly contacts the primary backing and the foam cushion layer.

27. The carpet as recited in claim 24 wherein a bridging composite is disposed between the primary backing and the foam cushion layer, wherein the bridging composite comprises at least one layer of adhesive and a glass stabilizing layer.

28. The carpet as recited in claim 27, wherein the glass stabilizing layer is disposed in contacting relation with an upper surface of the foam cushion layer.

29. The carpet as recited in claim 27, wherein the glass stabilizing layer is substantially encapsulated within said at least one layer of adhesive at a position intermediate the primary backing and the foam cushion layer.

* * * * *